US009294188B2

(12) United States Patent
Oshima et al.

(10) Patent No.: US 9,294,188 B2
(45) Date of Patent: Mar. 22, 2016

(54) INFORMATION COMMUNICATION DEVICE

(71) Applicant: PANASONIC CORPORATION, Osaka (JP)

(72) Inventors: Mitsuaki Oshima, Kyoto (JP); Koji Nakanishi, Osaka (JP); Hideki Aoyama, Osaka (JP); Chikara Yoshida, Osaka (JP); Shigehiro Iida, Osaka (JP); Shinsuke Ogata, Osaka (JP); Kengo Miyoshi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/219,137

(22) Filed: Mar. 19, 2014

(65) Prior Publication Data
US 2015/0139659 A1 May 21, 2015

Related U.S. Application Data

(60) Provisional application No. 61/907,026, filed on Nov. 21, 2013.

(51) Int. Cl.
*H04B 10/00* (2013.01)
*H04B 10/116* (2013.01)
(52) U.S. Cl.
CPC ................................ *H04B 10/116* (2013.01)
(58) Field of Classification Search
CPC .................................................. H04B 10/116
USPC .................... 398/172, 118–120, 126–131
See application file for complete search history.

(56) References Cited

U.S. PATENT DOCUMENTS

| | | | | |
|---|---|---|---|---|
| 6,186,630 B1* | 2/2001 | Miyashita | ........................ | 353/42 |
| 6,792,280 B1* | 9/2004 | Hori et al. | ...................... | 455/517 |
| 8,620,154 B2* | 12/2013 | Li et al. | ............................. | 398/1 |
| 8,699,887 B1* | 4/2014 | Rothenberg | .................. | 398/172 |
| 8,942,570 B2* | 1/2015 | Schenk et al. | ................. | 398/172 |
| 2002/0167701 A1* | 11/2002 | Hirata | ........................... | 359/172 |
| 2006/0239675 A1* | 10/2006 | Iizuka et al. | .................. | 396/287 |
| 2009/0027511 A1* | 1/2009 | Kouno | ....................... | 348/222.1 |

(Continued)

FOREIGN PATENT DOCUMENTS

| | | | | |
|---|---|---|---|---|
| JP | 2002-290335 | | 10/2002 | |
| JP | 2006-012369 | * | 1/2006 | ............. G11B 20/10 |

(Continued)

OTHER PUBLICATIONS

International Search Report, mailed May 13, 2014, in corresponding International Application No. PCT/JP2014/001542.

*Primary Examiner* — Li Liu
(74) *Attorney, Agent, or Firm* — Greenblum & Bernstein, P.L.C.

(57) ABSTRACT

An information communication method includes: determining whether conflict over use of a light receiving unit will occur between a first program for performing visible light communication and a second program for performing processing different from the visible light communication; notifying a user that the conflict will occur if it is determined that the conflict will occur; permitting one of the first program and the second program to use the light receiving unit in response to an operation by the user; and causing, by the first program, a computer to execute visible light communication according to light detected by the light receiving unit if the first program is permitted to use the light receiving unit.

11 Claims, 71 Drawing Sheets

(56) References Cited

U.S. PATENT DOCUMENTS

| | | | |
|---|---|---|---|
| 2012/0244803 A1* | 9/2012 | Sudou | H04M 1/7253 455/41.1 |
| 2014/0092002 A1* | 4/2014 | Manzari | G06F 3/04845 345/156 |
| 2015/0022444 A1* | 1/2015 | Ooi | G06F 3/011 345/156 |

FOREIGN PATENT DOCUMENTS

| | | | | |
|---|---|---|---|---|
| JP | 2008-139914 | * | 6/2008 | ................ G05F 9/48 |
| JP | 2010-147993 | * | 7/2010 | ............. H04N 5/225 |
| JP | 2010-217962 | * | 9/2010 | ............. G06F 3/042 |
| JP | 2010-278573 | | 12/2010 | |
| JP | 2011-250231 | | 12/2011 | |
| WO | 2013/161732 | | 10/2013 | |

\* cited by examiner

FIG. 3

(a) Example of light-receiving-unit use information of program which uses light receiving unit

C0501, C0502, C0503, C0504

| Program ID | Program name | Whether program uses light receiving unit | Used light receiving unit ID |
|---|---|---|---|
| ID001 | PortalApp001 | Using | 0 |

(b) Example of light-receiving-unit use information of program which uses light receiving unit, different from (a)

C0505, C0506, C0507, C0508

| Program ID | Program name | Whether program uses light receiving unit | Used light receiving unit ID |
|---|---|---|---|
| ID002 | CameraApp | Using | 0 |

FIG. 4

| Program ID | Program name | Used light receiving unit ID |
|---|---|---|
| ID001 | PortalApp001 | 0 |

C1701 — Program ID
C1702 — Program name
C1703 — Used light receiving unit ID

List of programs using light receiving unit

FIG. 5

| Program ID | Program name | Use status of light receiving unit | Used light receiving unit ID |
|---|---|---|---|
| ID001 | PortalApp001 | Being used | 0 |
| ID002 | CameraApp | Use request made | 0 |

C0301  C0302  C0303  C0304

Light-receiving-unit conflict use information

FIG. 8

(a) Example of light-receiving-unit use information of program which uses light receiving unit

C0601  C0602  C0603  C0604  C0605

| Program ID | Program name | Whether program uses light receiving unit | Used light receiving unit ID | Operation mode |
|---|---|---|---|---|
| ID001 | PortalApp001 | Using | 0 | Background |

(b) Example of light-receiving-unit use information of program which uses light receiving unit, different from (a)

C0606  C0607  C0608  C0609  C0610

| Program ID | Program name | Whether program uses light receiving unit | Used light receiving unit ID | Operation mode |
|---|---|---|---|---|
| ID002 | CameraApp | Using | 0 | Foreground |

FIG. 9

| Program ID | Program name | Used light receiving unit ID | Operation mode |
|---|---|---|---|
| ID001 | PortalApp001 | 0 | Background |

C0701, C0702, C0703, C0704

List of programs using light receiving unit

FIG. 10

| Program ID | Program name | Use status of light receiving unit | Used light receiving unit ID | Operation mode |
|---|---|---|---|---|
| ID001 | PortalApp 001 | Being used | 0 | Background |
| ID002 | CameraApp | Use request made | 0 | Foreground |

Light-receiving-unit conflict use information

| Light receiving unit ID | Side of terminal on which light receiving unit is provided | Use status of light receiving unit |
|---|---|---|
| 0 | Front | Being used |
| 1 | Back | Not being used |

C1001, C1002, C1003

Light receiving unit list

FIG. 18
Signboard emitting light C1320
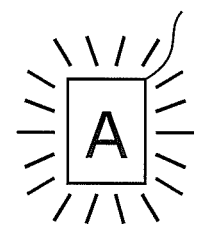
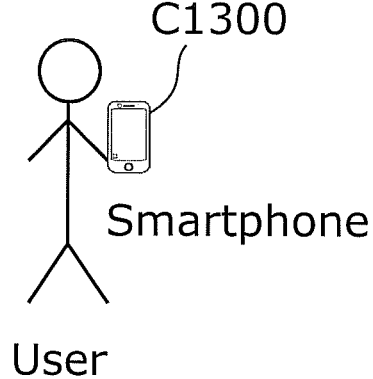
C1300
Smartphone
User

FIG. 30

| Decoded data |
|---|
| 1000 |

Installed application list

FIG. 35

| Application ID | Data-usable decoded data |
|---|---|
| APP001 | 1000 |
| | 145 |
| | 34 |
| APP002 | 1000 |
| | 145 |
| APP003 | 145 |
| | 34 |
| APP004 | 1000 |

C5401 / C5402

Information in data-application association DB

FIG. 38

| Decoded data | Data-usable application information ||
| --- | --- | --- |
| | Application ID | Application Name |
| 1000 | APP001 | Gourmet coupon application A |
| | APP002 | Gourmet coupon application B |
| | APP004 | Word-of-mouth gourmet information application B |
| | APP005 | Game application A |

C7501
C7502
C7503

Data-usable application list

FIG. 39

| Application ID | Application name |
|---|---|
| APP001 | Gourmet coupon application A |
| APP003 | Word-of-mouth gourmet information application A |
| APP004 | Word-of-mouth gourmet information application B |
| APP006 | Game application B |

C7601
C7602
Installed application list

FIG. 41

|  C7401 | C7402 | C7403 |
|---|---|---|
| Application ID | Application name | Usable decoded data |
| APP001 | Gourmet coupon application A | 1000 |
|  |  | 145 |
|  |  | 34 |
| APP002 | Gourmet coupon application B | 1000 |
|  |  | 145 |
| APP003 | Word-of-mouth gourmet information application A | 145 |
|  |  | 34 |
| APP004 | Word-of-mouth gourmet information application B | 1000 |
| APP005 | Game application A | 1000 |

Information in data-application association DB

FIG. 49

| Gesture operation | Light reception mode |
|---|---|
| Hold up | Taxi |
| Shake | Cancel |
| ⋮ | ⋮ |

B0801 — Gesture operation
B0802 — Light reception mode

Gesture-mode association table

FIG. 50

| B0901 | B0902 | B0903 | B0904 | B0905 | B0906 |
|---|---|---|---|---|---|
| Light reception mode | First group ID | Name of visible light transmission device | Second group ID | Whether to display detailed information | Whether to obtain information from server |
| Taxi | TAXIAA1 | Roof lamp | XX001 | Necessary | Necessary |
|  |  | Headlight | HR001 | Unnecessary | Unnecessary |
| : |  | : |  | : | : |

ID handling table

FIG. 51

| Visible light ID | Visible light ID associated information |
|---|---|
| TAXIAA1-XX001-0001 | http://example.com/indexA.html |
| TAXIAA1-XX001-0002 | http://example.com/indexB.html |
| TAXIAA1-XX001-0003 | http://example.com/indexC.html |
| TAXIAA1-XX001-0004 | http://example.com/indexD.html |
| TAXIAA1-HR001-0001 | http://example.com/infoA.html |
| TAXIAA1-HR001-0002 | http://example.com/infoC.html |
| ⋮ | ⋮ |

B1001 — B1002

ID associated information table

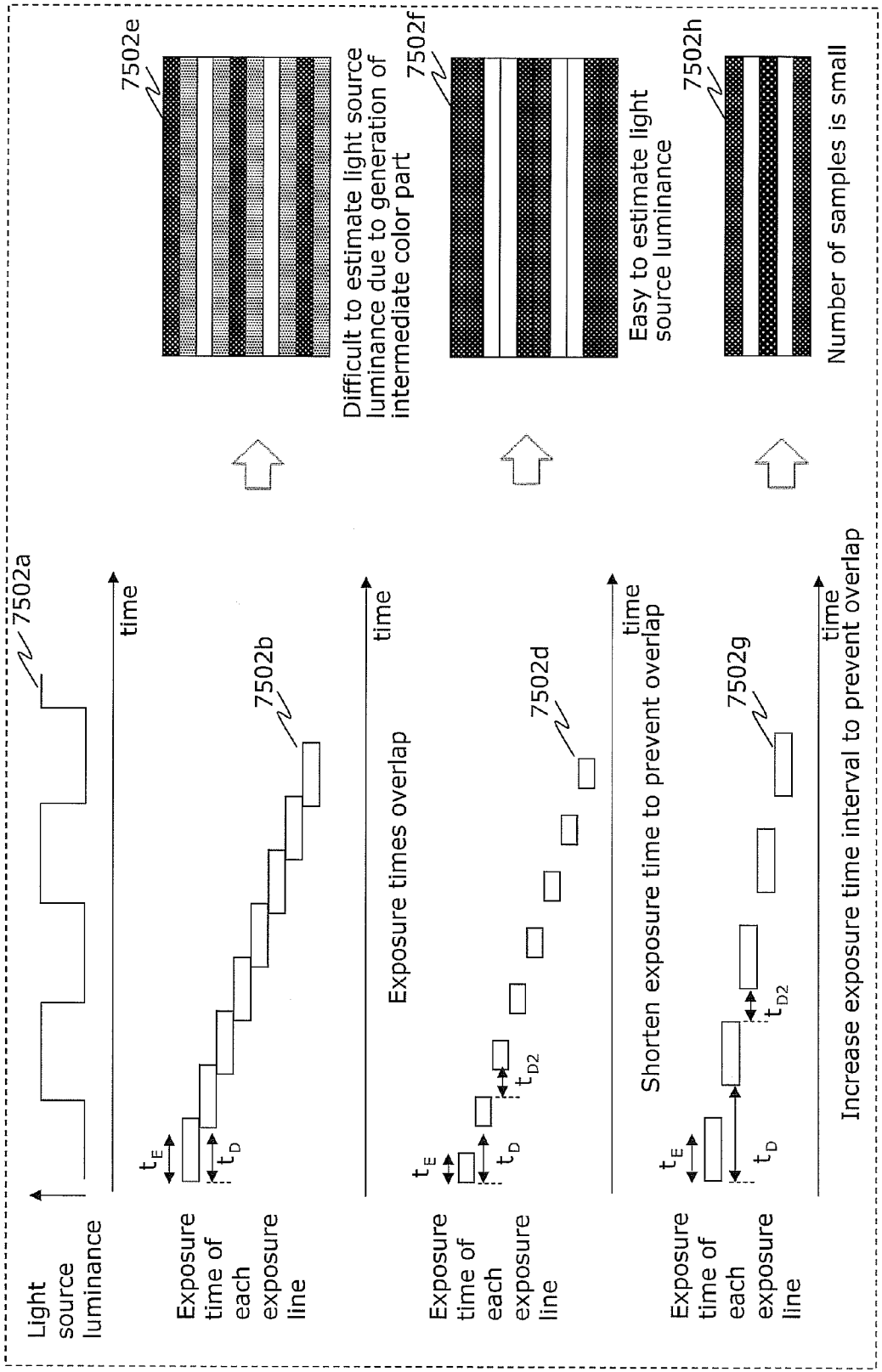

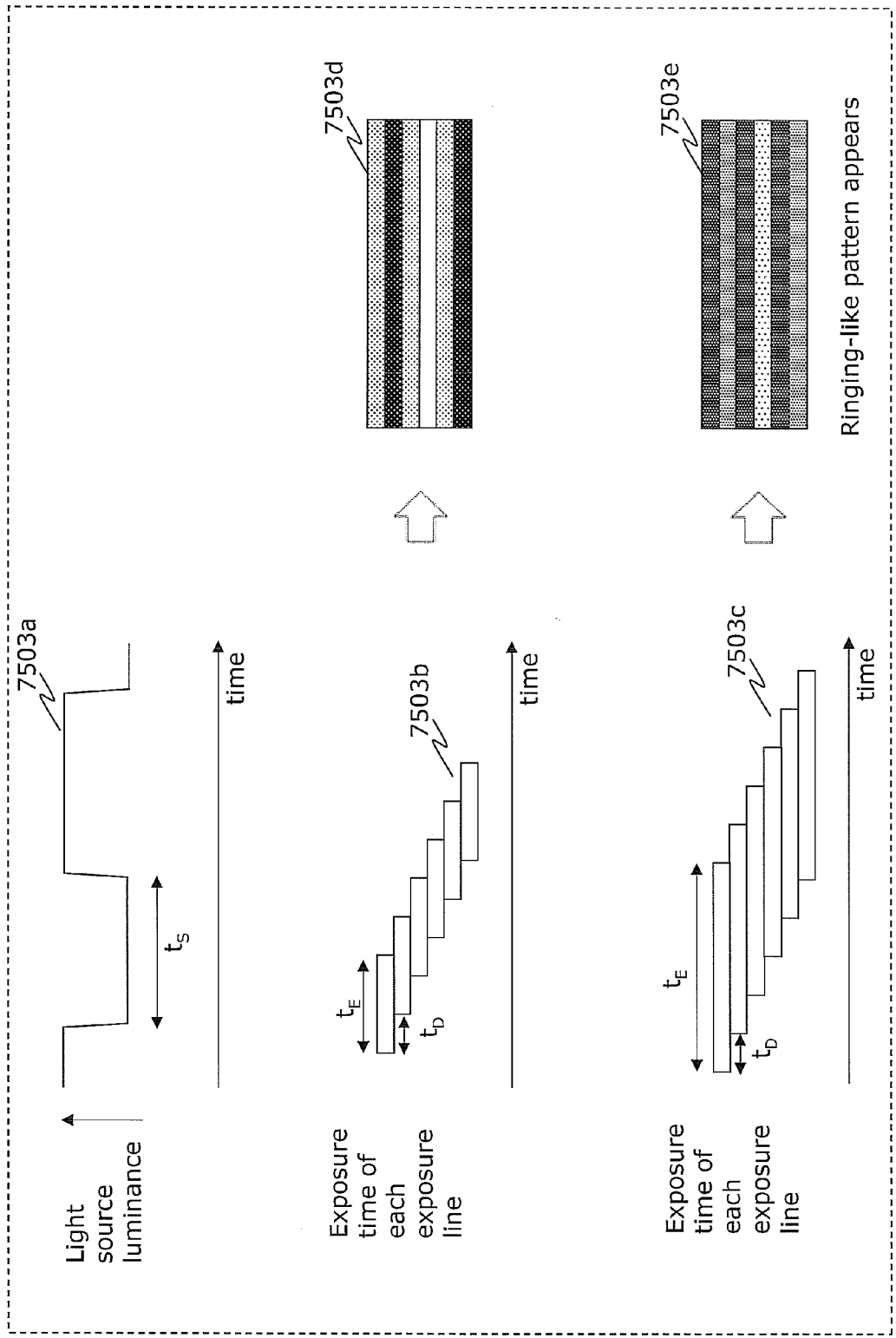

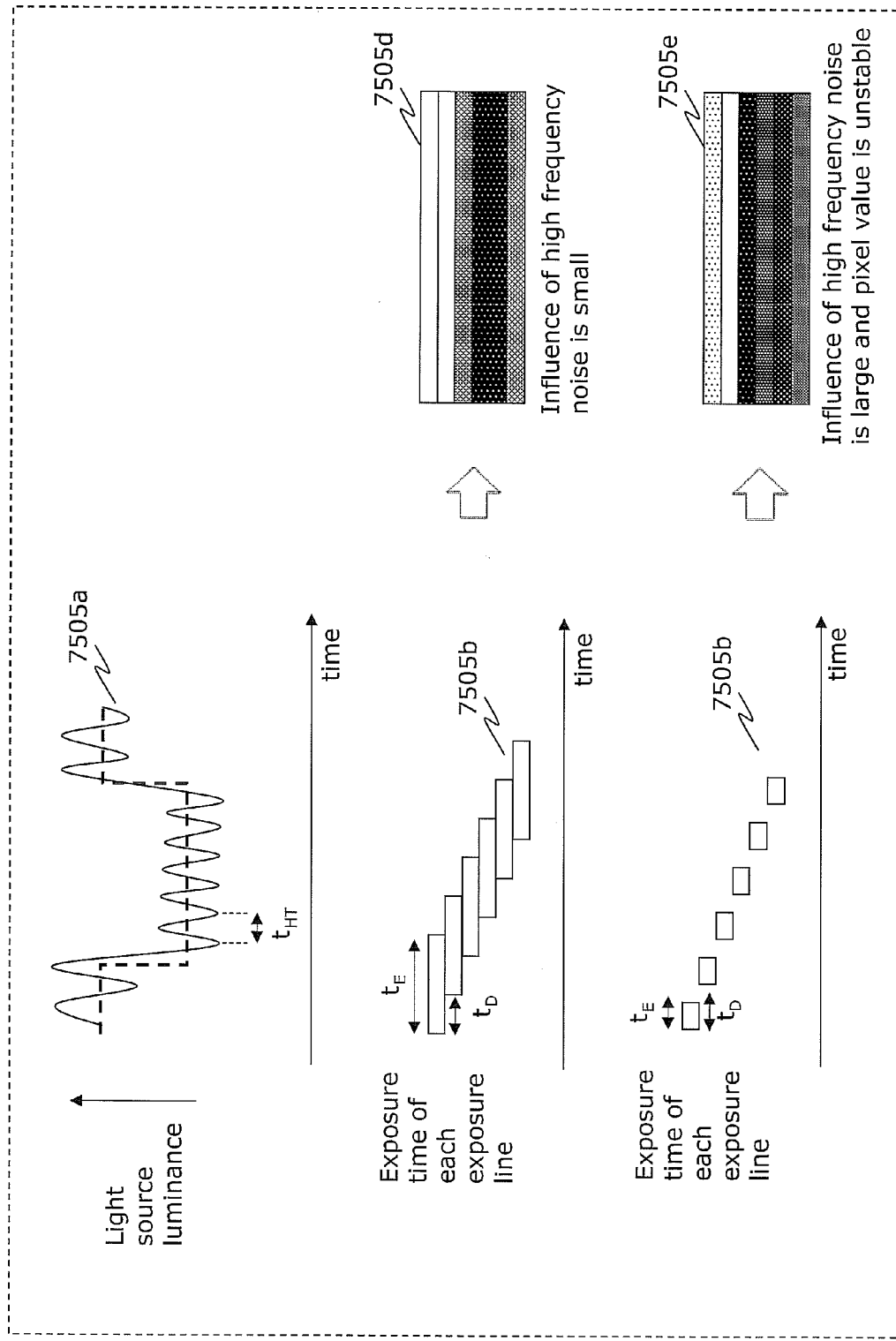

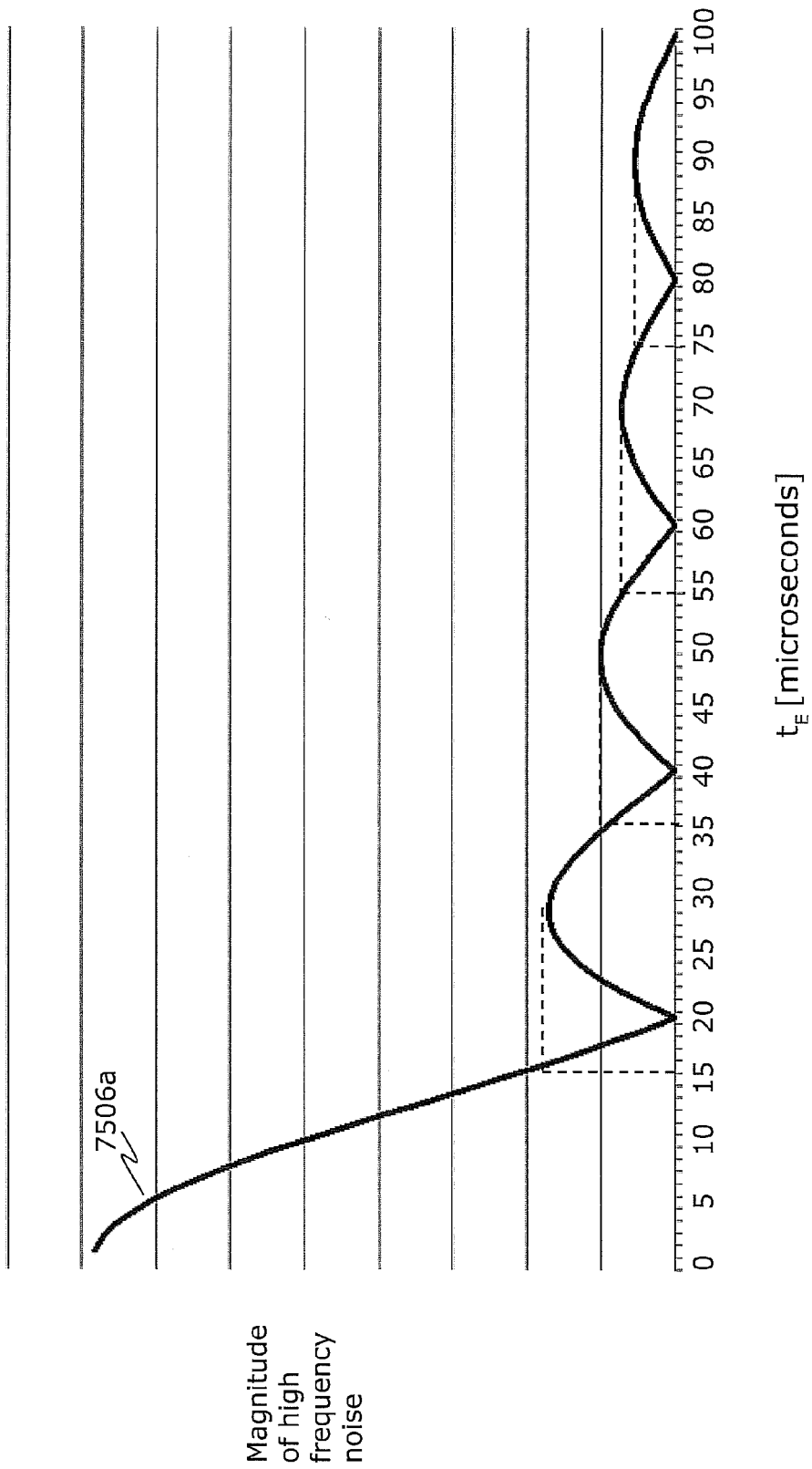

INFORMATION COMMUNICATION DEVICE

CROSS REFERENCE TO RELATED APPLICATION

The present application claims the benefit of U.S. Provisional Patent Application No. 61/907,026 filed on Nov. 21, 2013. The entire disclosure of the above-identified application, including the specification, drawings, and claims is incorporated herein by reference in its entirety.

FIELD

The present disclosure relates to a method for communication between mobile terminals and home electric appliances, the mobile terminals including a smartphone, a tablet terminal, and a mobile phone, the home electric appliances including an air-conditioner, a lighting device, and a rice cooker.

BACKGROUND

In recent years, a home-electric-appliance cooperation function has been introduced for a home network, with which various home electric appliances are connected to a network by a home energy management system (HEMS) having a function of managing power usage for addressing an environmental issue, turning power on/off from outside a house, and the like, in addition to cooperation of AV home electric appliances by internet protocol (IP) connection using Ethernet (registered trademark) or wireless local area network (LAN). However, there are home electric appliances whose computational performance is insufficient to have a communication function and home electric appliances which do not have a communication function due to a matter of cost.

In order to solve such a problem, Patent Literature (PTL) 1 discloses a technique of efficiently establishing communication between devices among limited optical spatial transmission devices which transmit information to free space using light, by performing communication using plural single color light sources of illumination light.

CITATION LIST

Patent Literature

[PTL 1] Japanese Unexamined Patent Application Publication No. 2002-290335

SUMMARY

Technical Problem

However, a conventional information communication method using light has a problem that a user of a terminal which receives light is required to perform extra operation since a user interface is insufficient.

In view of this, one non-limiting and exemplary embodiment provides an information communication method which achieves improvement in a user interface and a reduction of a burden on a user.

Solution to Problem

An information communication method according to an aspect of the present disclosure is an information communication method for performing visible light communication, the information communication method including: (a) determining whether conflict over use of a light receiving unit which detects light will occur between a first program for performing visible light communication using the light receiving unit and a second program for performing processing different from the visible light communication, using the light receiving unit; (b) notifying a user of the light receiving unit that the conflict will occur if it is determined that the conflict will occur; (c) permitting one of the first program and the second program to use the light receiving unit in response to an operation by the user; and (d) causing, by the first program, a computer to execute visible light communication according to light detected by the light receiving unit if the first program is permitted to use the light receiving unit.

It should be noted that these general and specific aspects may be implemented using a system, a method, an integrated circuit, a computer program, a computer-readable recording medium such as a CD-ROM, or any combination of systems, methods, integrated circuits, computer programs, and recording media.

Additional benefits and advantages of the disclosed embodiments will be apparent from the specification and the drawings. The benefits and/or advantages may be individually obtained by the various embodiments and features of the specification and the drawings which need not all be provided in order to obtain one or more of the benefits and/or advantages.

Advantageous Effects

The present disclosure achieves an information communication method which can improve a user interface and reduce burden on a user.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 illustrates an example of light-receiving-unit use information according to Embodiment 1.

FIG. 4 illustrates an example of a list of programs using a light receiving unit stored in a program-using-light-receiving-unit information store unit according to Embodiment 1.

FIG. 5 illustrates an example of light-receiving-unit conflict use information according to Embodiment 1.

FIG. 8 illustrates an example of the light-receiving-unit use information of a program according to Variation 1 of Embodiment 1.

FIG. 9 illustrates an example of a list of programs using a light receiving unit according to Variation 1 of Embodiment 1.

FIG. 10 illustrates an example of light-receiving-unit conflict use information according to Variation 1 of Embodiment 1.

FIG. 13 illustrates an example of a light receiving unit list stored by a light reception control unit according to Variation 2 of Embodiment 1.

FIG. 18 illustrates an example of use of a receiver according to Embodiment 2.

FIG. 30 illustrates an example of decoded data according to Embodiment 3.

FIG. 35 illustrates an example of information stored in a data-application association DB according to Embodiment 3.

FIG. 38 illustrates an example of a data-usable application list according to the variation of Embodiment 3.

FIG. 39 illustrates an example of information (installed application list) stored in an installed application DB according to the variation of Embodiment 3.

FIG. 41 illustrates an example of information stored in a data-application association DB according to the variation of Embodiment 3.

FIG. 49 illustrates an example of a gesture-mode association table stored by a received ID determination unit according to Embodiment 4.

FIG. 50 illustrates an example of an ID handling table stored by the received ID determination unit according to Embodiment 4.

FIG. 51 illustrates an example of an ID associated information table stored by an ID associated information data store unit according to Embodiment 4.

FIG. 57D illustrates an example of an observation method of luminance of a light emitting unit in Embodiment 5.

FIG. 57E illustrates an example of an observation method of luminance of a light emitting unit in Embodiment 5.

FIG. 57G illustrates an example of an observation method of luminance of a light emitting unit in Embodiment 5.

FIG. 57H illustrates an example of an observation method of luminance of a light emitting unit in Embodiment 5.

DESCRIPTION OF EMBODIMENTS

Figure 1:
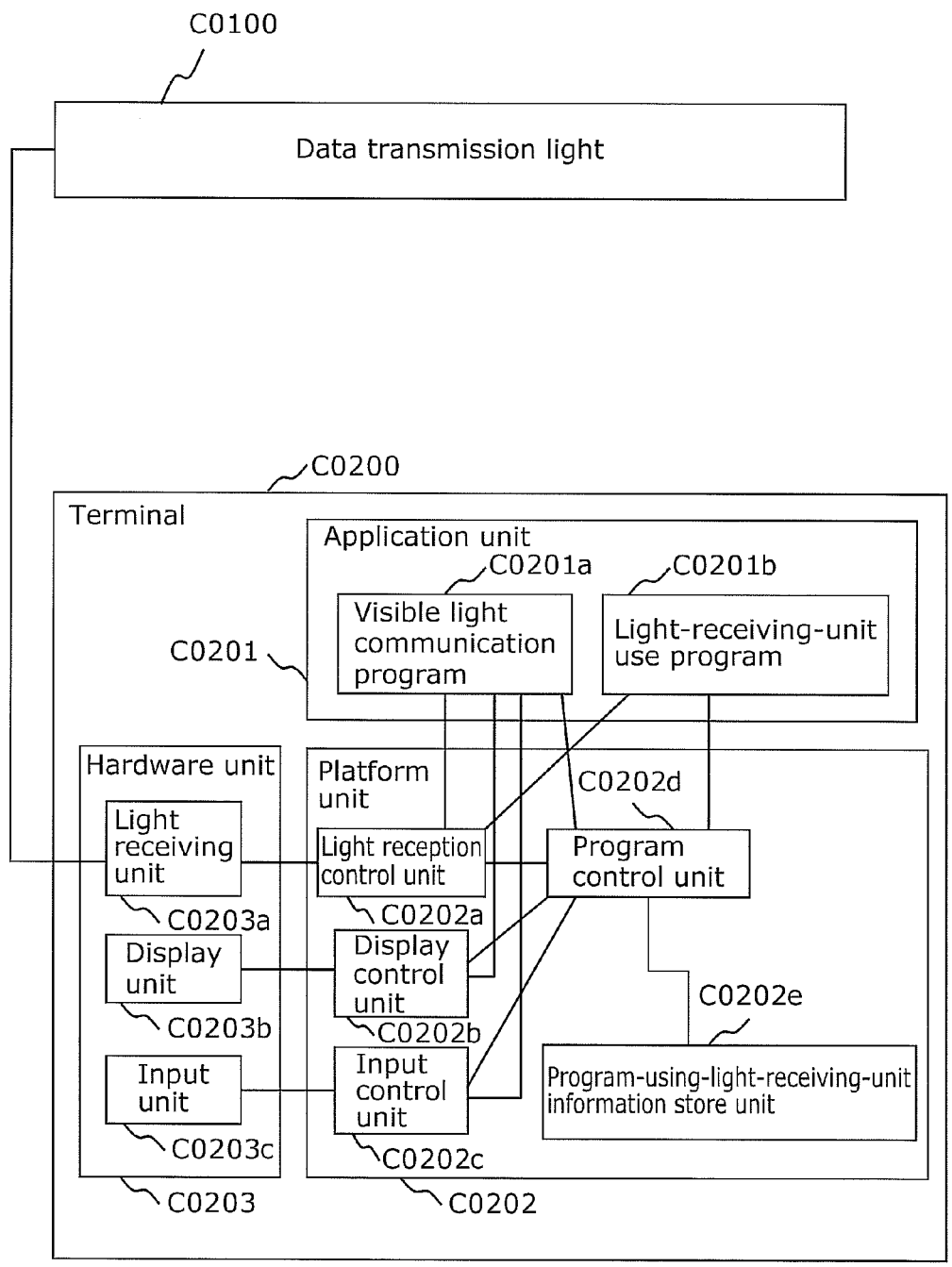
FIG. 1 illustrates a system configuration according to Embodiment 1.

In visible light communication performed using a terminal such as a smartphone, data is received using a light receiving unit such as a camera included in the terminal. Here, a conceivable case is that since it is not necessary to show a user of the terminal an image captured by the light receiving unit, the image captured by the light receiving unit is not shown to the user, and a visible light communication program is caused to run in the background. It should be noted that a program for performing processing using a light receiving unit is hereinafter referred to as a light-receiving-unit use program. A visible light communication program is a type of the light-receiving-unit use program, and is a program for performing visible light communication using a light receiving unit.

Here, if another light-receiving-unit use program (a shooting application program, for example) is activated later while the visible light communication program is caused to run in the background, conflict over use of the light receiving unit occurs between those programs. At this time, the light-receiving-unit use program activated later cannot reserve the light receiving unit already reserved by the visible light communication program, and thus may be forced to terminate. Specifically, if a user activates later another light-receiving-unit use program that he/she desires to use without being aware of the visible light communication program running in the background, that other light-receiving-unit use program is forced to terminate. Thus, the user thinks that the terminal has something wrong due to an unknown cause, and performs various operations on the terminal. In this manner, according to a conventional information communication method, a user interface is insufficient, which causes the user to perform extra operations.

In order to address such problems, an information communication method according to an aspect of the present disclosure is an information communication method for performing visible light communication, the information communication method including: (a) determining whether conflict over use of a light receiving unit which detects light will occur between a first program for performing visible light communication using the light receiving unit and a second program for performing processing different from the visible light communication, using the light receiving unit; (b) notifying a user of the light receiving unit that the conflict will occur if it is determined that the conflict will occur; (c) permitting one of the first program and the second program to use the light receiving unit in response to an operation by the user; and (d) causing, by the first program, a computer to execute visible light communication according to light detected by the light receiving unit if the first program is permitted to use the light receiving unit.

For example, the first program is a visible light communication program, and the second program is a light-receiving-unit use program. In this manner, if conflict over use of the light receiving unit will occur, the user of the light receiving unit is notified that the conflict will occur, and a user operation permits one of the programs to use the light receiving unit, and thus the user can understand with ease the status in a terminal which includes the light receiving unit. Furthermore, the user understands the status thereof, and then can manipulate the terminal. Consequently, conflict over use of the light receiving unit can be easily solved without extra operation. As a result, improvement in a user interface can be achieved and burden on a user can be reduced.

In step (b), a selection screen for selecting one of the first program and the second program which use the light receiving unit may be further displayed, and in step (c), if one of the first program and the second program is selected in response to an operation on the selection screen by the user, the selected one of the first program and the second program may be permitted to use the light receiving unit.

In this manner, the user can select a program to be permitted to use the light receiving unit by his/her operation, and thus a desired one of the programs is allowed to use the light receiving unit, irrespective of the order of activating plural programs which use the light receiving unit. In addition, in order to allow a program activated later to use the light receiving unit, a user does not need to intentionally perform operation for terminating a program activated earlier and using the light receiving unit. Thus, user operation can be further reduced.

It should be noted that the present disclosure may be an information providing method as below. In other words, this information providing method is for providing a display unit with information with which a user can select a program permitted to use a light receiving unit if a program which uses the light receiving unit is activated in a state where another program which has reserved the light receiving unit is running, the information providing method including: an activation step of activating a program for which an instruction is received from the user; a determination step of determining whether a program which is using the light receiving unit is present; a reservation step of reserving the light receiving unit if the light receiving unit can be used; a record step of making a record indicating that the light receiving unit has been reserved; a conflict information creation step of creating conflict use information of the light receiving unit to be presented to the user if the light receiving unit cannot be reserved; a display step of displaying the created conflict information; an execution program update step of activating a program selected by the user from the displayed conflict information and terminating a program not selected.

In step (b), the selection screen may be displayed which includes information indicating whether the first program runs in background and whether the second program runs in background.

This notifies the user whether programs that are to use the light receiving unit run in the background, and thus the user allows an appropriate program to use the light receiving unit.

In step (c), another light receiving unit may be assigned to one of the first program and the second program in response to the operation by the user, and in step (d), the first program may cause the computer to execute visible light communication according to light detected by the other light receiving unit if the other light receiving unit is assigned to the first program.

This permits the first and second programs each to use a different one of the light receiving unit or the other light receiving unit, thus allowing the programs to be running simultaneously without terminating one of the programs. As a result, visible light communication and processing different from the visible light communication can be executed in parallel, thereby achieving a reduction in processing time.

In step (d), data may be obtained by executing the visible light communication, and the information communication method may further include: (e) displaying an application selection screen for selecting one of plural application programs for which the obtained data is usable; and (f) if one of the plural application programs is selected in response to an operation on the application selection screen by the user, causing, by the selected one of the application programs, the computer to execute processing performed using the data.

This allows an appropriate application program to process data obtained through visible light communication.

The information communication method may further include: (g) continuously capturing an image of a subject which transmits a signal by changing luminance, with an image sensor which is the light receiving unit; (h) displaying a captured image which includes a box and a subject image for identifying the subject, while continuously updating a position of the subject image on the captured image, according to a positional relationship between the image sensor and the subject established when the image of the subject is captured; and (i) determining whether the subject image is in the box, wherein in step (d), when it is determined that the subject image is in the box, the first program may cause the computer to receive the signal transmitted by the subject.

In this manner, even if plural subjects which transmit signals by changing luminance are present being gathered, by merely putting a subject image of a desired object in a box, a signal only from the object can be easily received.

The information communication method may further include: (j) capturing images of plural subjects each of which transmits a signal by changing luminance, with an image sensor which is the light receiving unit; (k) displaying a captured image which includes the images of the plural subjects and is obtained in step (j); and (l) determining whether a terminal device which includes the image sensor has been shaken, wherein in step (d), the first program may cause the computer to receive the signals transmitted by the plural subjects, and in step (k), an information notification image generated according to a signal from one of the plural subjects among the signals transmitted by the plural subjects and received, and showing information regarding the subject is superimposed on the captured image in a state where the information notification image may be associated with the image of the subject, and if it is determined that the terminal device has been shaken, another information notification image generated according to a signal from another one of the plural subjects which is in a direction in which the terminal device has been shaken, and showing information regarding the other subject may be superimposed on the captured image in a state where the other information notification image is associated with the image of the other subject.

In this manner, for example, an information notification image having a balloon in which information regarding a subject (detailed information) is stated is displayed in association with the subject, and thus a user can understand information regarding the subject appropriately. In addition, a subject whose information notification image is to be displayed can be easily switched by shaking a terminal device. Furthermore, such a subject can be switched to another subject in a direction in which the terminal device has been shaken, and thus the user can make the switch intuitively, and a user interface can further be improved.

In step (k), for an image of each of one or more remaining subjects other than the image of the one or the other one of the plural subjects that is associated with the information notification image or the other information notification image, an information-presentable notification image for notifying that information regarding the remaining subject is further presentable may be superimposed on the captured image.

In this manner, for an image of a subject for which an information notification image (another information notification image) is not displayed, for example, a data-presentable notification image having a small balloon shape in which detailed information is not described is displayed, and thus a user can determine that information regarding the subject (detailed information) can be displayed as an information notification image, by shaking a terminal device.

The information communication method may further include (m) obtaining first image data by performing capturing with a first exposure time so that exposure starts sequentially for a plurality of exposure lines in the image sensor each at a different time and each of the plurality of exposure lines partially overlaps in exposure time an adjacent one of the plurality of exposure lines, wherein in step (d), second image data may be obtained by performing capturing with a second exposure time shorter than the first exposure time so that exposure starts sequentially for the plurality of exposure lines each at a different time and each of the plurality of exposure lines partially overlaps in exposure time an adjacent one of the plurality of exposure lines, and information may be obtained by demodulating a bright line pattern that appears in the second image data and corresponds to the plurality of exposure lines, and in step (d), the bright line pattern may be caused to appear in the second image data by setting the second exposure time to be less than or equal to $1/480$ second.

In this manner, as described in Embodiment 5 below, setting a second exposure time to be $1/480$ seconds or less causes an appropriate bright line pattern to appear in image data, and allows high-speed signal transmission.

The information communication method may further include: (n) performing processing of receiving a request to distribute information from a requester; (o) distributing the requested information as associated information associated with a signal received through the visible light communication performed by the first program; and (p) performing information processing for charging the requester according to the distribution of the information.

In this manner, as described in Embodiment 6 below, appropriate charging processing can be performed when providing information through visible light communication.

It should be noted that these general and specific aspects may be implemented using a system, a method, an integrated circuit, a computer program, a computer-readable recording medium such as a CD-ROM, or any combination of systems, methods, integrated circuits, computer programs or recording media.

The following specifically describes embodiments, with reference to the drawings.

The embodiments described below each show a general or specific example. The numerical values, shapes, materials, constituent elements, the arrangement and connection of the constituent elements, steps, the processing order of the steps, and the like described in the following embodiments are mere examples, and thus are not intended to limit the present disclosure. Therefore, among the constituent elements in the following exemplary embodiments, constituent elements not recited in any of the independent claims defining the most generic part of the inventive concept are described as arbitrary constituent elements.

Embodiment 1

An information communication method according to the present embodiment is a method for allowing a user to select a program permitted to use a light receiving unit if conflict over use of a light receiving unit occurs due to activating another light-receiving-unit use program in a state where a visible light communication program that is a type of a light-receiving-unit use program has already activated.

FIG. 1 illustrates a system configuration according to the present embodiment.

A data transmission light C0100 transmits data using light. In other words, a data transmission light is a lighting device which performs visible light communication and transmits a signal by changing luminance.

A terminal C0200 includes a hardware unit C0203, a platform unit C0202, and an application unit C0201. The hardware unit C0203 includes: a light receiving unit C0203a which receives (detects) light emitted by the data transmission light C0100 and furthermore, can change the shutter speed (exposure time) when receiving light; a display unit C0203b which shows information to a user; and an input unit C0203c which receives input from the user. The terminal C0200 may include a plurality of the light receiving units C0203a. The platform unit C0202 includes: a light reception control unit C0202a having a function of controlling the start and end of light reception by the light receiving unit C0203a and the shutter speed of the light receiving unit C0203a; a display control unit C0202b which controls the display unit C0203b; an input control unit C0202c which controls the input unit C0203c; a program control unit C0202d which controls a program that the application unit C0201 has; and a program-using-light-receiving-unit information store unit C0202e which stores information on a program that is using the light receiving unit C0203a.

The application unit C0201 has a visible light communication program C0201a, and a light-receiving-unit use program C0201b different from the visible light communication program C0201a. The visible light communication program C0201a has a function of changing the shutter speed of the light receiving unit C0203a, using the light reception control unit C0202a. In addition, the visible light communication program C0201a has a function of obtaining data according to light emitted by the data transmission light C0100, from the light receiving unit C0203a via the light reception control unit C0202a. In addition, the visible light communication program C0201a may have a function of, based on data obtained from the data transmission light C0100, making an inquiry to a Web server and obtaining further additional information from the Web server. In addition, the terminal C0200 may include a plurality of the visible light communication programs C0201a and a plurality of the light-receiving-unit use programs C0201b.

Figure 2:
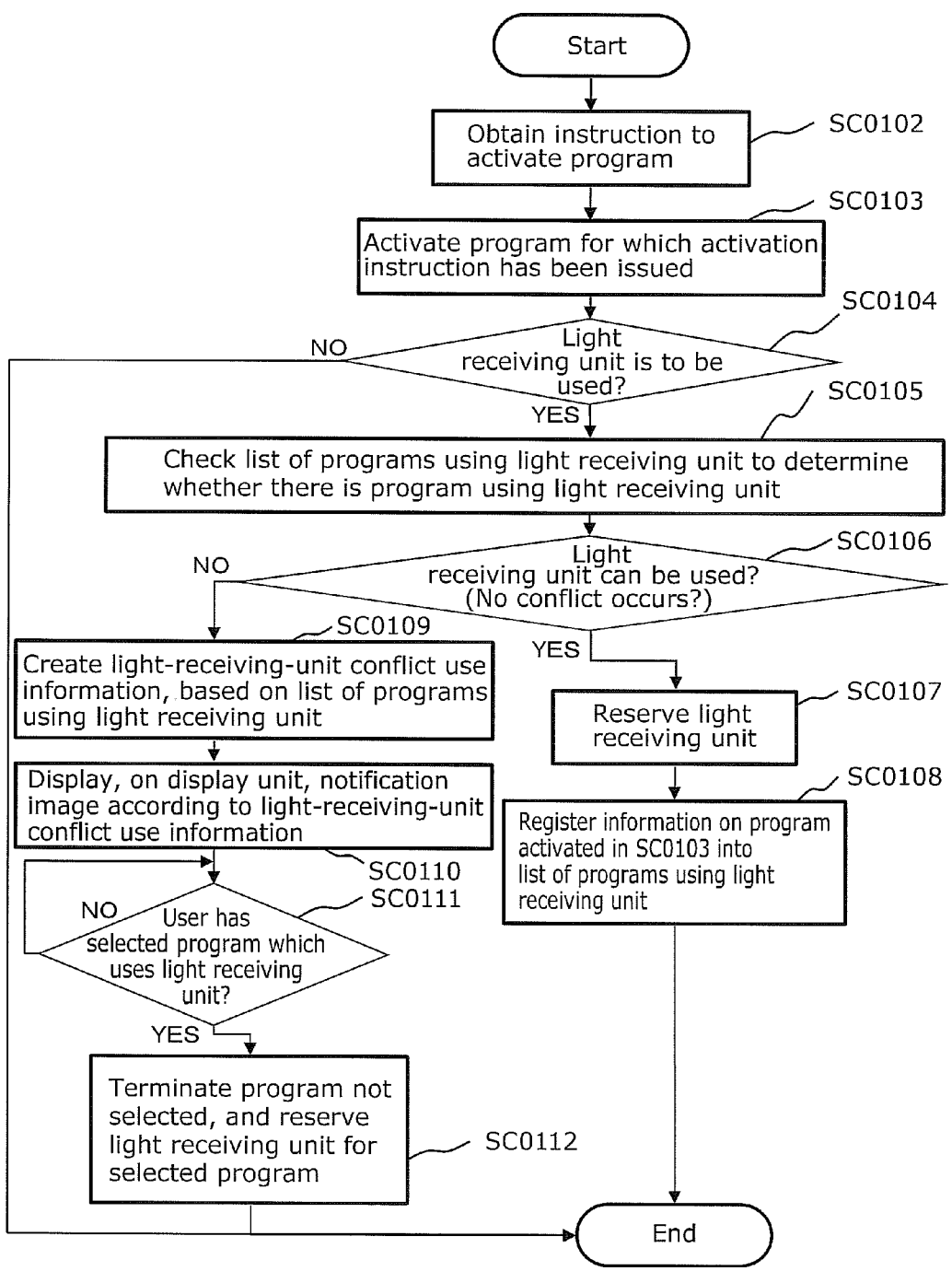
FIG. 2 is a flowchart illustrating processing operation of a terminal which activates a program according to Embodiment 1.

FIG. 2 is a flowchart illustrating processing operation of the terminal C0200 which activates a program.

First, the input unit C0203c of the terminal C0200 receives an instruction to activate the visible light communication program C0201a or the light-receiving-unit use program C0201b (activation instruction or program activation instruction) (step SC0102). The program control unit C0202d receives an activation instruction from a user and activates the program for which the activation instruction has been issued, via the input control unit C0202c (step SC0103). Next, the program control unit C0202d determines whether the activated program uses the light receiving unit C0203a, based on information indicating whether the light receiving unit is to be used, which is included in light-receiving-unit use information of the program (step SC0104).

FIG. 3 illustrates an example of light-receiving-unit use information.

As illustrated in (a) of FIG. 3, light-receiving-unit use information of a program includes: a program ID_ID0501; a program name C0502 which is a name of the program identified by the program ID_ID0501; information C0503 which indicates whether the program uses a light receiving unit (whether the light receiving unit is to be used); and a used light receiving unit ID_C0504 for identifying a light receiving unit used by the program. In addition, as illustrated in (b) of FIG. 3, light-receiving-unit use information of another program includes: a program ID_ID0505; a program name C0506 which is a name of the program identified using the program ID_ID0505; information C0507 which indicates whether the program uses a light receiving unit (whether a light receiving unit is to be used); and a used light receiving unit ID_C0508 for identifying the light receiving unit to be used by the program.

It should be noted that the program IDs (C0501, C0505) illustrated in FIG. 3 may be each represented using one or more numbers only, one or more characters only, one or more symbols only, a combination of one or more numbers and one or more symbols, a combination of one or more characters or one or more symbols, or a combination of one or more numbers, one or more characters, and one or more symbols, rather than a combination of characters and numbers. In addition, the program names (C0502, C0506) illustrated in FIG. 3 may be each represented using one or more characters only, a combination of one or more characters and one or more numbers, one or more numbers only, one or more symbols only, a combination of one or more numbers and one or more symbols, a combination of one or more characters and one or more symbols, or a combination of one or more numbers, one or more characters, and one or more symbols. Information (C0503, C0507) which indicates whether a light receiving unit is to be used illustrated in FIG. 3 may be represented using one or more numbers only, one or more symbols only, a combination of one or more characters and one or more numbers, a combination of one or more numbers and one or more symbols, a combination of one or more characters and one or more symbols, or a combination of one or more numbers, one or more characters, and one or more symbols, rather than characters. A used light receiving unit ID (C0504, C0508) illustrated in FIG. 3 may be represented using one or more characters only, one or more symbols only, a combination of one or more characters and one or more numbers, a combination of one or more numbers and one or more symbols, a combination of one or more characters and one or more symbols, or a combination of one or more numbers, one or more characters, and one or more symbols, rather than a number.

In step SC0104 illustrated in FIG. 2, if it is determined that the activated program is to use the light receiving unit C0203a, or in other words, the light-receiving-unit use information of the activated program clearly indicates that a light receiving unit is to be used (YES in step SC0104), the program control unit C0202d checks a list of programs using a light receiving unit stored by the program-using-light-receiving-unit information store unit C0202e, in order to determine whether there is any program currently using the light receiving unit C0203a, or in other words, in order to determine whether conflict over use of the light receiving unit C0203a will occur (step SC0105). Based on the check result, the program control unit C0202d determines whether conflict over use of the light receiving unit C0203a will occur due to the visible light communication program C0201a for performing visible light communication using the light receiving unit C0203a which detects light and the light-receiving-unit use program C0201b for performing, using the light receiving unit C0203a, processing different from visible light communication (step SC0106). Here, if it is determined that the conflict does not occur, or in other words, if it is determined that there is no program using the light receiving unit C0203a (YES in step SC0106), the program control unit C0202d reserves the light receiving unit C0203a via the light reception control unit C0202a (step SC0107). After that, the program control unit C0202d registers information on the activated program into the list of programs using a light receiving unit stored in the program-using-light-receiving-unit information store unit C0202e.

FIG. 4 illustrates an example of a list of programs using a light receiving unit stored in the program-using-light-receiving-unit information store unit C0202e.

As illustrated in FIG. 4, the list of programs using a light receiving unit includes: a program ID_C1701 for identifying a program using the light receiving unit C0203a; a program name C1702 which is a name of the program; and a used light receiving unit ID_C1703 for identifying the light receiving unit C0203a being used. It should be noted that the program ID_C1701 illustrated in FIG. 4 may be represented using one or more numbers only, one or more characters only, one or more symbols only, a combination of one or more numbers and one or more symbols, a combination of one or more characters and one or more symbols, or a combination of one or more numbers, one or more characters, and one or more symbols, rather than a combination of numbers and characters. In addition, the program name C1702 illustrated in FIG. 4 may be represented using one or more numbers only, one or more characters only, one or more symbols only, a combination of one or more numbers and one or more symbols, a combination of one or more characters and one or more symbols, or a combination of one or more numbers, one or more characters, and one or more symbols, rather than a combination of numbers and characters. In addition, the used light receiving unit ID_C1703 illustrated in FIG. 4 may be represented using one or more characters only, one or more symbols only, a combination of one or more numbers and one or more characters, a combination of one or more numbers and one or more symbols, or a combination of one or more numbers, one or more characters, and one or more symbols, rather than a number.

If it is determined in step SC0106 illustrated in FIG. 2 that conflict will occur, or in other words, if a program using the light receiving unit C0203a is registered in the list of programs using a light receiving unit (NO in step SC0106), the program control unit C0202d creates light-receiving-unit conflict use information, using the list of programs using a light receiving unit (step SC0109). Furthermore, the program control unit C0202d displays a notification image based on the light-receiving-unit conflict use information, on the display unit C0203b via the display control unit C0202b (step SC0110).

FIG. 5 illustrates an example of light-receiving-unit conflict use information.

As illustrated in FIG. 5, light-receiving-unit conflict use information includes, for each program that is to use the light receiving unit C0203a, a program ID_C0301 of the program, a program name C0302 of the program, information C0303 indicating use status of the light receiving unit C0203a that is used by the program, and a used light receiving unit ID_C0304 for identifying the light receiving unit C0203a to be used by the program. It should be noted that the program ID_C0301 illustrated in FIG. 5 may be represented using one or more numbers only, one or more characters only, one or more symbols only, a combination of one or more numbers and one or more symbols, a combination of one or more characters and one or more symbols, or a combination of one or more numbers, one or more characters, and one or more symbols, rather than a combination of numbers and characters. In addition, the program name C0302 illustrated in FIG. 5 may be represented using one or more numbers only, one or more characters only, one or more symbols only, a combination of one or more numbers and one or more symbols, a combination of one or more characters and one or more symbols, or a combination of one or more numbers, one or more characters, and one or more symbols, rather than a combination of numbers and characters. In addition, the information C0303 indicating the use status of a light receiving unit illustrated in FIG. 5 may be represented using one or more numbers only, one or more symbols only, a combination of one or more numbers and one or more characters, a combination of one or more numbers and one or more symbols, a combination of one or more characters and one or more symbols, or a combination of one or more numbers, one or more characters, and one or more symbols, rather than characters. In addition, the used light receiving unit ID C0304 illustrated in FIG. 5 may be represented using one or more characters only, one or more symbols only, a combination of one or more numbers and one or more characters, a combination of one or more numbers and one or more symbols, a combination of one or more characters and one or more symbols, or a combination of one or more numbers, one or more characters, and one or more symbols, rather than a number.

Figure 6:
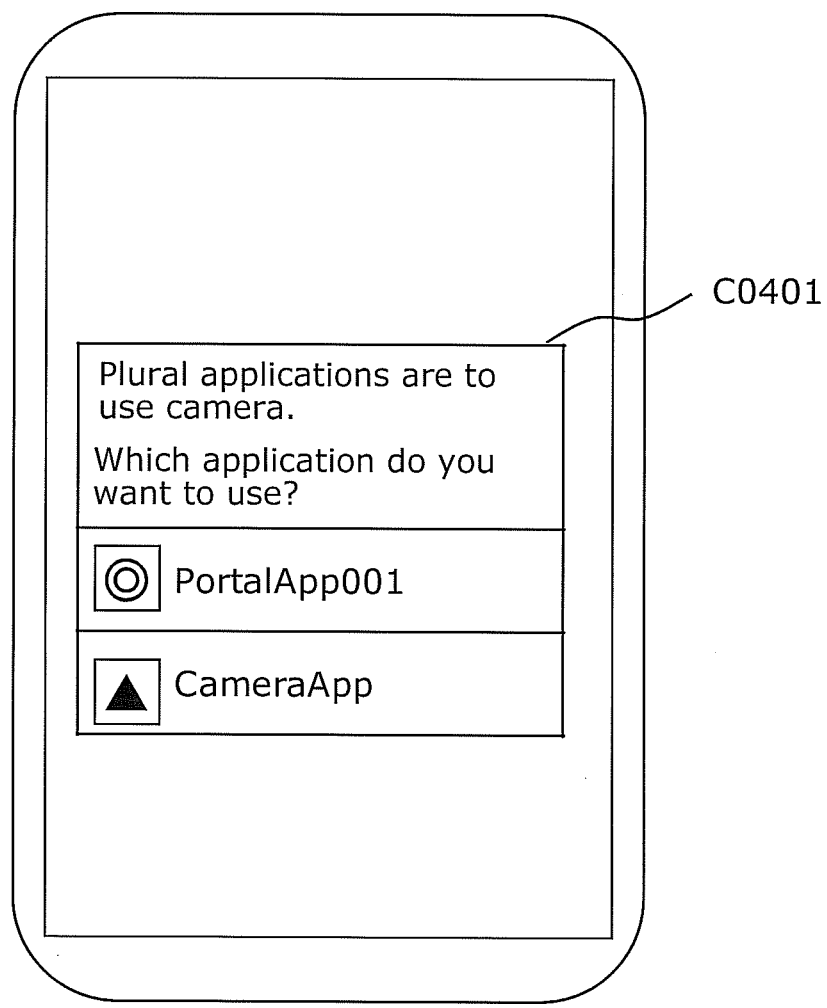
FIG. 6 illustrates an example of a notification image displayed on a display unit, based on light-receiving-unit conflict use information, according to Embodiment 1.

FIG. 6 illustrates an example of a notification image displayed on the display unit C0203b, based on light-receiving-unit conflict use information.

The display unit C0203b displays, as a notification image, an image C0401 for allowing a user to select a program which is to use a light receiving unit, since plural programs (application programs) use the light receiving unit (for example, camera). The display of such a notification image notifies a user of the terminal C0200 which includes the light receiving unit C0203a, that conflict will occur. In addition, this notification image serves as a selection screen for selecting one of the visible light communication program C0201a and the light-receiving-unit use program C0201b which are to use the light receiving unit C0203a.

After step SC0110 illustrated in FIG. 2, if a user inputs the result of selecting one of the programs which uses the light receiving unit to the input unit C0203c (YES in step SC0111), the program control unit C0202d receives the result of user selection via the input control unit C0202c, terminates the program not selected, and reserves the light receiving unit for the selected program (step SC01112).

Figure 7:
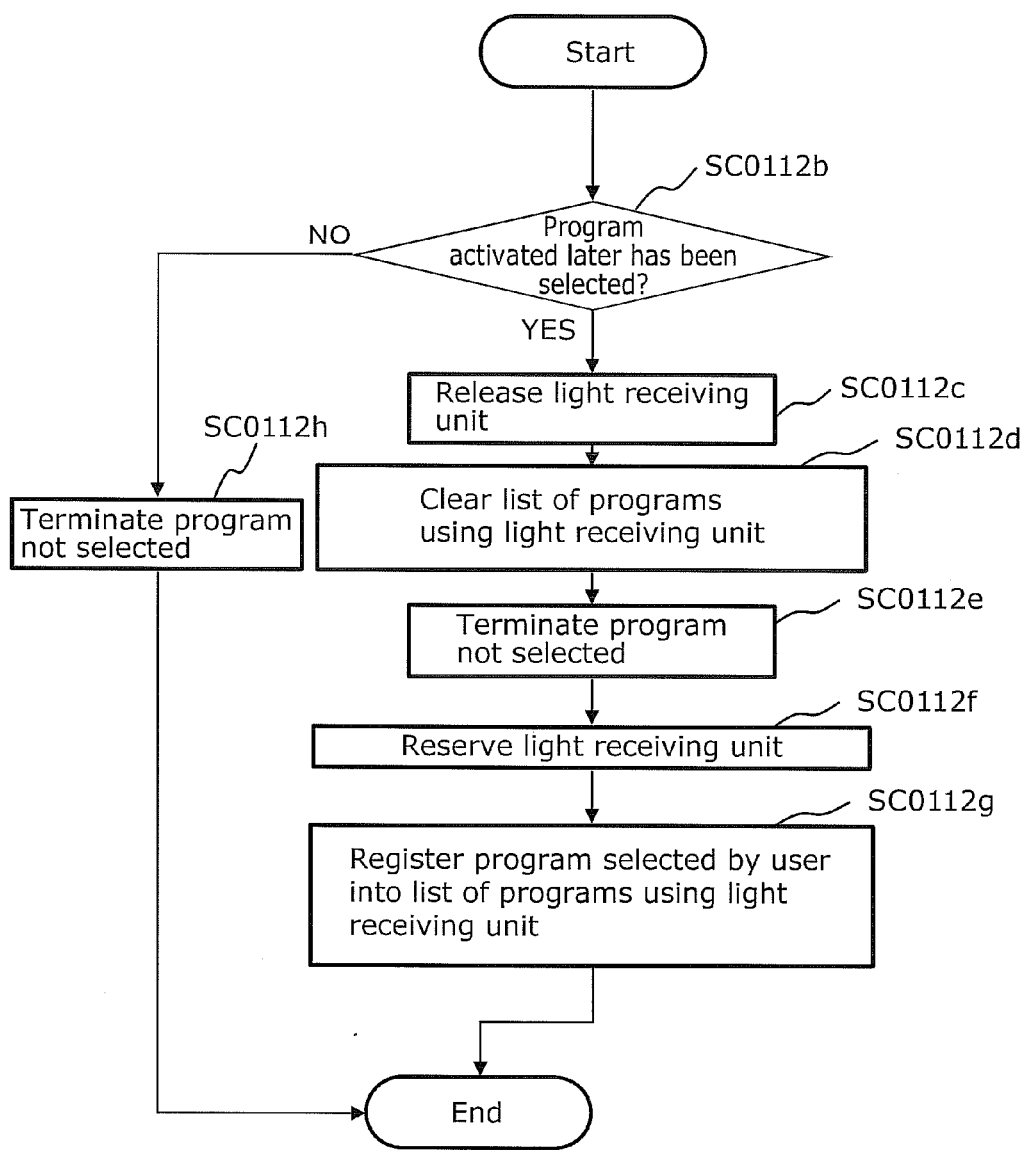
FIG. 7 is a flowchart illustrating detailed processing operation in step SC0112 illustrated in FIG. 2 according to Embodiment 1.

FIG. 7 is a flowchart illustrating detailed processing operation in step SC0112 illustrated in FIG. 2.

The program control unit C0202d first determines whether a program activated later is selected by a user (step SC0112b). Here, if the program control unit C0202d determines that a program activated earlier is selected (NO in step SC0112b), the program control unit C0202d terminates the program activated later (step SC0112h). On the other hand, if the program control unit C0202d determines that the program activated later is selected (YES in step SC0112b), the program control unit C0202d releases the light receiving unit C0203a reserved by the program activated earlier (step SC0112c), and clears the list of programs using a light receiving unit stored by the program-using-light-receiving-unit information store unit C0202e (step SC0112d). Then, the program control unit C0202d terminates the program not selected (step SC0112e). Then, the program control unit C0202d reserves the light receiving unit C0203a via the light reception control unit C0202a (step SC0112f). Finally, the program control unit C0202d registers the program selected by the user into the list of programs using a light receiving unit stored in the program-using-light-receiving-unit information store unit C0202e (step SC0112g).

It should be noted that in step SC0111 illustrated in FIG. 2, if the visible light communication program C0201a is selected, the program control unit C0202d permits the visible light communication program C0201a to use the light receiving unit C0203a in step SC0112. The visible light communication program C0201a permitted to use the light receiving unit C0203a causes a computer of the terminal C0200 to execute visible light communication according to light detected by the light receiving unit C0203a reserved by the program itself.

According to the present embodiment as described above, if conflict over use of the light receiving unit C0203a will occur, a user of the light receiving unit C0203a is notified of the occurrence of the conflict, and a user operation permits one of the programs to use the light receiving unit C0203a. Thus, the user can understand with ease the status in the terminal C0200 which includes the light receiving unit C0203a. Furthermore, the user understands the status thereof, and then can manipulate the terminal C0200. Consequently, conflict over use of the light receiving unit C0203a can be easily solved without extra operation. As a result, improvement in a user interface can be achieved and burden on a user can be reduced.

Variation 1

An information communication method according to this variation is for a user to select a program permitted to use a light receiving unit, using information indicating whether a light-receiving-unit use program runs in the background or foreground if conflict over use of a light receiving unit will occur. It should be noted that a repeated description of the drawings already described in Embodiment 1 is avoided.

FIG. 8 illustrates an example of the light-receiving-unit use information of a program according to this variation. It should be noted that the light-receiving-unit use information is used to determine whether to use the light receiving unit C0203a in step SC0104 of the flowchart illustrated in FIG. 2, as well as the light-receiving-unit use information illustrated in FIG. 3.

As illustrated in (a) and (b) of FIG. 8, the light-receiving-unit use information according to this variation includes information indicating an operation mode (C0605, C0610), unlike the light-receiving-unit use information illustrated in FIG. 3. Information indicating this operation mode indicates that a focused light-receiving-unit use program runs in the foreground that is a mode in which a screen according to the program is always displayed on the display unit C0203b or in the background that is a mode in which such a screen is not displayed on the display unit C0203b (the user of the terminal C0200 cannot see the screen).

It should be noted that program IDs (C0601, C0606) illustrated in FIG. 8 may be each represented using one or more numbers only, one or more characters only, one or more symbols only, a combination of one or more numbers and one or more symbols, a combination of one or more characters and one or more symbols, or a combination of one or more numbers, one or more characters, and one or more symbols, rather than a combination of characters and numbers. In addition, program names (C0602, C0607) illustrated in FIG. 8 may be each represented using one or more characters only, a combination of one or more characters and one or more numbers, one or more numbers only, one or more symbols only, a combination of one or more numbers and one or more symbols, a combination of one or more characters and one or more symbols, or a combination of one or more numbers, one or more characters, and one or more symbols. Information (C0603, C0608) which indicates whether the light receiving unit is to be used illustrated in FIG. 8 may be represented using one or more numbers only, one or more symbols only, a combination of one or more characters and one or more numbers, a combination of one or more numbers and one or more symbols, a combination of one or more characters and one or more symbols, or a combination of one or more numbers, one or more characters, and one or more symbols, rather than characters. Used light receiving unit IDs (C0604, C0609) illustrated in FIG. 8 may be each represented using one or more characters only, one or more symbols only, a combination of one or more characters and one or more numbers, a combination of one or more numbers and one or more symbols, a combination of one or more characters and one or more symbols, or a combination of one or more numbers, one or more characters, and one or more symbols, rather than a number. In addition, information (C0605, C0610) indicating an operation mode illustrated in FIG. 8 may be represented using one or more numbers, one or more symbols, a combination of one or more numbers and one or more characters, a combination of one or more numbers and one or more symbols, a combination of one or more characters and one or more symbols, or a combination of one or more numbers, one or more characters, and one or more symbols, rather than characters.

FIG. 9 illustrates an example of a list of programs using a light receiving unit according to this variation.

In step SC0108 of the flowchart illustrated in FIG. 2, the program control unit C0202d according to this variation registers the list of programs using a light receiving unit illustrated in FIG. 9 into the program-using-light-receiving-unit information store unit C0202e, using the light-receiving-unit use information in the format illustrated in FIG. 8.

The list of programs using a light receiving unit according to this variation includes information C0704 indicating an operation mode, unlike the list of programs using a light receiving unit illustrated in FIG. 4. The information C0704 indicating an operation mode indicates whether a light-receiving-unit use program which reserves the light receiving unit C0203a runs in the foreground that is a mode in which a screen according to the program is always displayed on the display unit C0203b or runs in the background that is a mode in which such a screen is not displayed on the display unit C0203b (a user of the terminal C0200 cannot see the screen).

It should be noted that a program ID_C0701 illustrated in FIG. 9 may be represented using one or more numbers only, one or more characters only, one or more symbols only, a combination of one or more numbers and one or more symbols, a combination of one or more characters and one or more symbols, or a combination of one or more numbers, one or more characters, and one or more symbols, rather than a combination of characters and numbers. In addition, a program name C0702 illustrated in FIG. 9 may be represented using one or more numbers only, one or more symbols only, a combination of one or more numbers and one or more symbols, a combination of one or more characters and one or more symbols, or a combination of one or more numbers, one or more characters, and one or more symbols, rather than characters only or a combination of characters and numbers. A used light receiving unit ID_C0703 illustrated in FIG. 9 may be represented using one or more characters only, one or more symbols only, a combination of one or more characters and one or more numbers, a combination of one or more numbers and one or more symbols, a combination of one or more characters and one or more symbols, or a combination of one or more numbers, one or more characters, and one or more symbols, rather than a number. In addition, information C0704 indicating an operation mode illustrated in FIG. 9 may be represented using one or more numbers, one or more symbols, a combination of one or more numbers and one or more characters, a combination of one or more numbers and one or more symbols, a combination of one or more characters and one or more symbols, or a combination of one or more numbers, one or more characters, and one or more symbols, rather than characters.

FIG. 10 illustrates an example of light-receiving-unit conflict use information according to this variation.

The program control unit C0202d according to this variation creates light-receiving-unit conflict use information illustrated in FIG. 10 in step SC0109 of the flowchart illustrated in FIG. 2, using the list of programs using a light receiving unit in the format illustrated in FIG. 9.

Unlike the light-receiving-unit conflict use information illustrated in FIG. 5, light-receiving-unit conflict use information according to this variation includes information C0805 indicating an operation mode. The information C0805 indicating an operation mode indicates whether a program which is to concurrently use the light receiving unit C0203a runs in the foreground or background. It should be noted that a program ID_C0801 illustrated in FIG. 10 may be represented using one or more numbers only, one or more characters only, one or more symbols only, a combination of one or more numbers and one or more symbols, a combination of one or more characters and one or more symbols, or a combination of one or more numbers, one or more characters, and one or more symbols, rather than a combination of characters and numbers. In addition, a program name C0802 illustrated in FIG. 10 may be represented using one or more numbers only, one or more characters only, one or more symbols only, a combination of one or more numbers and one or more symbols, a combination of one or more characters and one or more symbols, or a combination of one or more numbers, one or more characters, and one or more symbols, rather than a combination of numbers and characters. In addition, information C0803 indicating light receiving unit use status illustrated in FIG. 10 may be represented using one or more numbers only, one or more symbols only, a combination of one or more numbers and one or more characters, a combination of one or more numbers and one or more symbols, a combination of one or more characters and one or more symbols, or a combination of one or more numbers, one or more characters, and one or more symbols, rather than characters. A used light receiving unit ID_C0804 illustrated in FIG. 10 may be represented using one or more characters only, one or more symbols only, a combination of one or more numbers and one or more characters, a combination of one or more numbers and one or more symbols, a combination of one or more characters and one or more symbols, or a combination of one or more numbers, one or more characters, and one or more symbols, rather than a number. Information C0805 indicating an operation mode illustrated in FIG. 10 may be represented using one or more numbers, one or more symbols, a combination of one or more numbers and one or more characters, a combination of one or more numbers and one or more symbols, a combination of one or more characters and one or more symbols, or a combination of one or more characters and one or more symbols, or a combination of one or more numbers, one or more characters, and one or more symbols, rather than characters.

Figure 11:
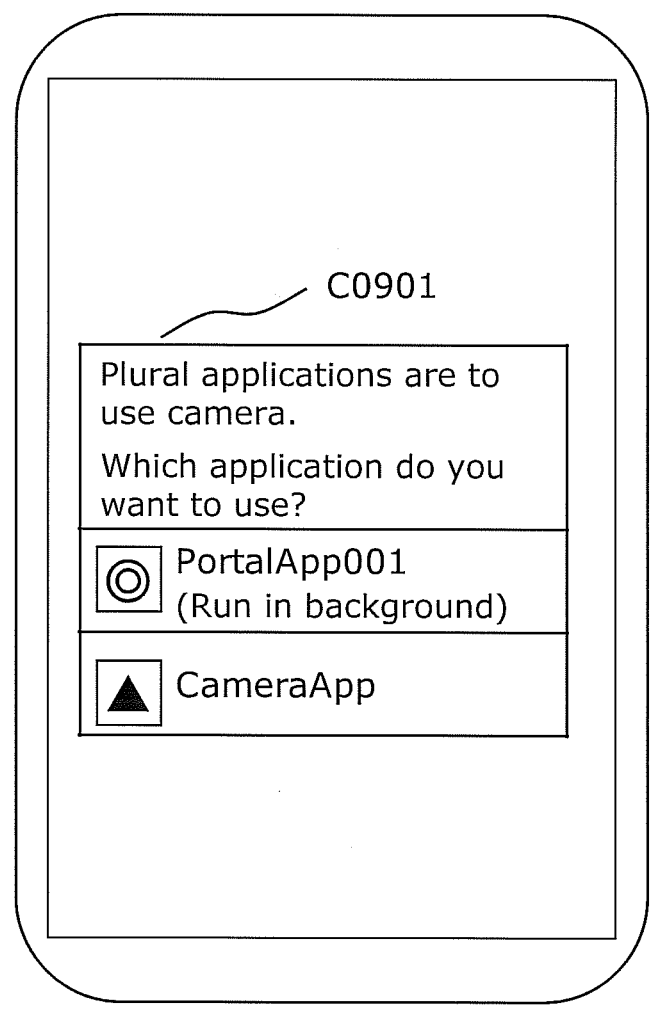
FIG. 11 illustrates an example of a notification image according to Variation 1 of Embodiment 1.

FIG. 11 illustrates an example of a notification image according to this variation.

If the light-receiving-unit conflict use information illustrated in FIG. 10 is used, the display unit C0203b displays a notification image C0901 illustrated in FIG. 11 in step SC0110 of the flowchart illustrated in FIG. 2. This notification image C0901 clearly shows a text "operating in background" to indicate a light-receiving-unit use program which runs in the background, unlike the notification image C0401 illustrated in FIG. 6. Such a text is clearly shown to indicate that the light-receiving-unit use program is to operate in the background, which allows a user to determine which light-receiving-unit use program can be executed simultaneously with a program which does not use the light receiving unit C0203a, and then to select which light-receiving-unit use program is to be used. It should be noted that the notification image C0901 illustrated in FIG. 11 is an example displayed using the light-receiving-unit conflict use information illustrated in FIG. 10, and may show whether the program can be executed simultaneously with a program which does not use the light receiving unit C0203a, instead of showing whether the program runs in the background. In addition, the notification image C0901 may show that a light-receiving-unit use program which runs in the foreground is to run in the foreground, rather than a light-receiving-unit use program which runs in the background. In addition, the notification image C0901 may show that a light-receiving-unit use program which runs in the foreground cannot be executed simultaneously with another program which does not use the light receiving unit C0203a. In addition, in order to notify a user whether a program can be executed simultaneously with another program which does not use the light receiving unit C0203a, the character color of a text of a program name, the background color of a portion where the program name is written, and giving a mark in the portion where the program name is written may be used in addition to a text description.

As described above, in this variation, a user is notified whether the programs each of which is to use the light receiving unit C0203a operate in the background, and thus the user can allow an appropriate program to use the light receiving unit C0203.

Variation 2

An information communication method according to this variation is a method for allowing a user to select which program is permitted to use which light receiving unit if conflict over use of a light receiving unit will occur in a terminal in which one or plural programs can simultaneously use plural light receiving units. It should be noted that a repeated description of the drawings already described in Embodiment 1 and Variation 1 thereof is avoided. In addition, a terminal C0200 according to this variation includes, for example, two light receiving units C0203a, one of the light receiving units C0203a is disposed on the front side of the terminal C0200, whereas the other of the light receiving units C0203a is disposed on the back side of the terminal C0200.

Figure 12:
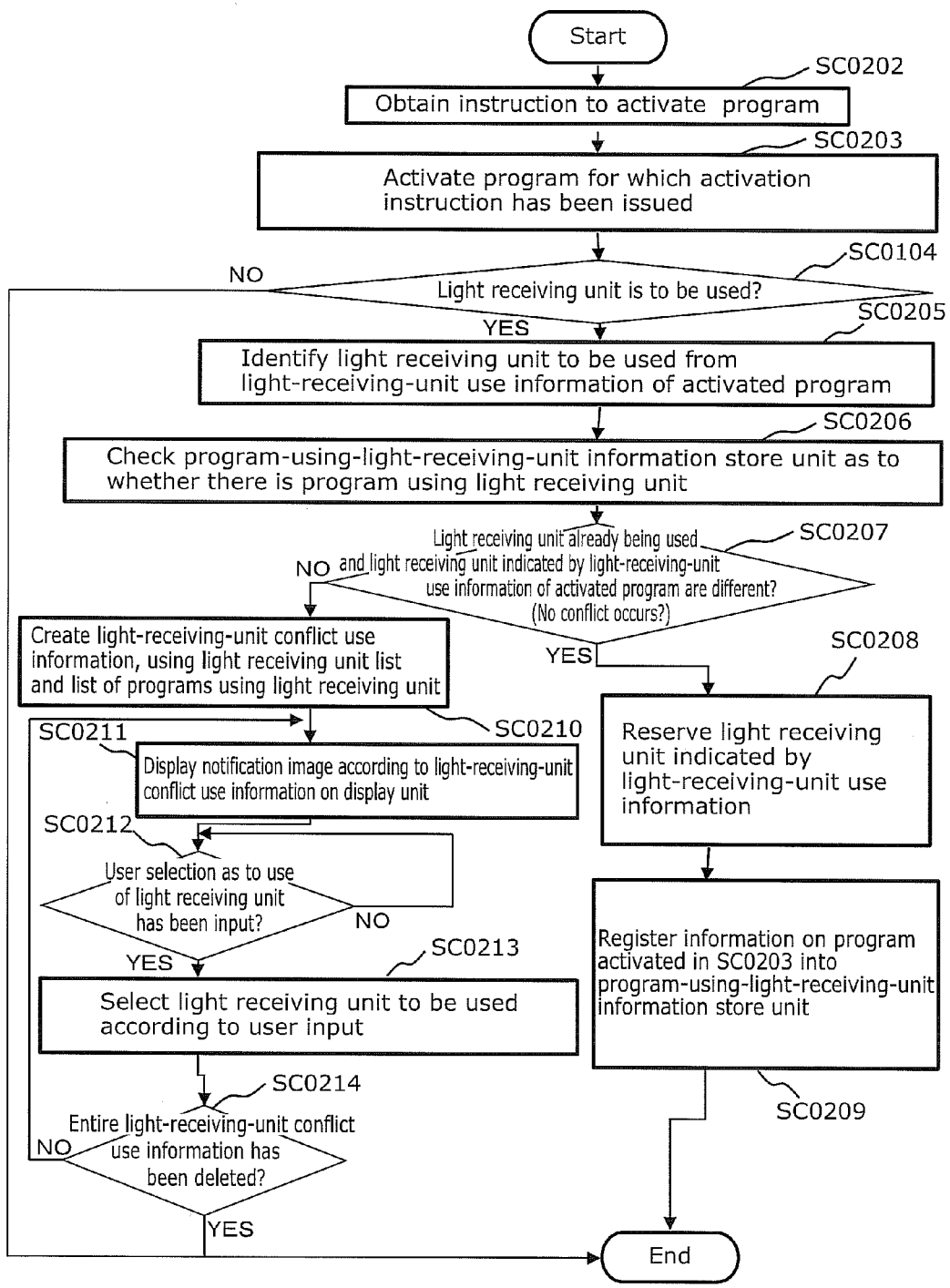
FIG. 12 is a flowchart illustrating an example of processing operation by a terminal in which plural light receiving units can be simultaneously used to activate a light-receiving-unit use program according to Variation 2 of Embodiment 1.

FIG. 12 is a flowchart illustrating an example of processing operation by the terminal C0200 in which plural light receiving units can be simultaneously used to activate a light-receiving-unit use program.

The processing operation by the terminal C0200 according to this variation differs from the processing operation illustrated in FIG. 2 in the following points. The different points are that: a light receiving unit to be used is identified from light-receiving-unit use information of an activated program (step SC0205); it is determined whether a currently used light receiving unit on a list of programs using a light receiving unit stored in a program-using-light-receiving-unit information store unit C0202e and a light receiving unit indicated by light-receiving-unit use information of a program activated later are the same (step SC0207); a light receiving unit list is used to create light-receiving-unit conflict use information, in addition to the list of programs using a light receiving unit (SC0210); and two types of input from a user are a selection of, for each of programs, a light receiving unit assigned to the program, and an instruction to terminate a program (steps SC0212, SC0213, SC0214).

In step SC0207 in FIG. 12, a program control unit C0202d determines whether a currently used light receiving unit (used light receiving unit ID) on the list of programs using a light receiving unit stored in the program-using-light-receiving-unit information store unit C0202e and a light receiving unit indicated by the light-receiving-unit use information of a program activated later (used light receiving unit ID) are the same. In other words, the program control unit C0202d determines whether conflict over use of a light receiving unit will occur. Here, if it is determined that the light receiving units are not the same (YES in step SC0207), or in other words, if it is determined that conflict does not occur, a program activated later can use a light receiving unit indicated by a used light receiving unit ID included in light-receiving-unit use information. Thus, the program control unit C0202d reserves a light receiving unit indicated by the used light receiving unit ID included in the light-receiving-unit use information (step SC0208), and registers information on the activated program into the program-using-light-receiving-unit information store unit C0202e (step SC0209).

If it is determined that a currently used light receiving unit (used light receiving unit ID) on the list of programs using a light receiving unit stored in the program-using-light-receiving-unit information store unit C0202e and a light receiving unit indicated in light-receiving-unit use information of a program activated later (used light receiving unit ID) are the same (NO in step SC0207), or in other words, if it is determined that conflict will occur, the program activated later cannot use the light receiving unit indicated by the used light receiving unit ID included in the light-receiving-unit use information. Consequently, the program control unit C0202d creates light-receiving-unit conflict use information, using the light receiving unit list stored by a light reception control unit C0202a and the list of programs using a light receiving unit registered in the program-using-light-receiving-unit information store unit C0202e (step SC0210). Furthermore, the program control unit C0202d causes a display unit C0203b to display a notification image based on the light-receiving-unit conflict use information, via a display control unit C0202b (step SC0211).

FIG. 13 illustrates an example of a light receiving unit list stored by the light reception control unit C0202a. For each light receiving unit included in the terminal C0200, the light receiving unit list includes a light receiving unit ID_C1001 for identifying the light receiving unit, information C1002 indicating a side of the terminal C0200 on which the light receiving unit is provided, and information C1003 indicating the use status of the light receiving unit at this point in time. It should be noted that the light receiving unit ID_C1001 illustrated in FIG. 13 may be represented using one or more characters only, one or more symbols only, a combination of one or more characters and one or more numbers, a combination of one or more numbers and one or more symbols, a combination of one or more characters and one or more symbols, or a combination of one or more numbers, one or more characters, and one or more symbols, rather than a number. In addition, the information C1002 indicating the side of the terminal on which the light receiving unit is provided in FIG. 13 may be represented using only one or more characters indicating a side of a terminal, only one or more symbols indicating a side of a terminal, a combination of one or more characters and one or more numbers indicating a side of a terminal, a combination of one or more numbers and one or more symbols indicating a side of a terminal, a combination of one or more characters and one or more symbols indicating a side of a terminal, or a combination of one or more numbers, one or more characters, and one or more symbols indicating a side of a terminal, rather than characters. In addition, the information C1003 indicating the use status of the light receiving unit illustrated in FIG. 13 may be represented using only one or more numbers indicating the use status of a light receiving unit, only one or more symbols indicating the use status of a light receiving unit, a combination of one or more characters and one or more numbers indicating the use status of a light receiving unit, a combination of one or more numbers and one or more symbols indicating the use status of a light receiving unit, a combination of one or more characters and one or more symbols indicating the use status of a light receiving unit, or a combination of one or more numbers, one or more characters, and one or more symbols indicating the use status of a light receiving unit, rather than characters.

Figure 14:
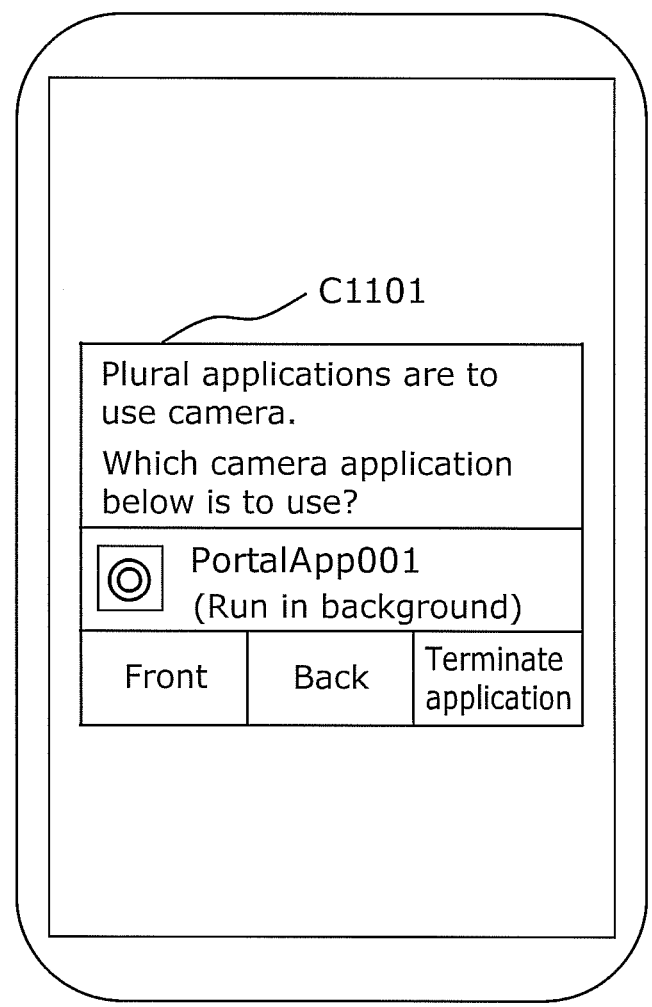
FIG. 14 illustrates an example of a notification image displayed in step SC0211 illustrated in FIG. 12, according to Variation 2 of Embodiment 1.

FIG. 14 illustrates an example of a notification image displayed in step SC0211 illustrated in FIG. 12. A notification image C1101 notifies a user that there are plural programs which are to use the light receiving unit C0203a and furthermore, facilitates the user to select one of the light receiving units C0203a (on the front or back side) that is to be used by a focused program or to terminate the program (application program).

If the notification image C1101 is displayed in step SC0211 in FIG. 12, the user of the terminal C0200 selects which of the light receiving units C0203a is to be assigned to a program that causes conflict over use of the light receiving unit C0203a or selects to terminate a program that causes conflict over use of the light receiving unit C0203a. Thereafter, the selection result is input to an input unit C0203c. The program control unit C0202d determines whether the result of the user selection has been input, via an input control unit C0202c (step SC0212). Here, the program control unit C0202d receives the selection result if it is determined that the result has been input (YES in step SC0212), and selects a light receiving unit to be used, according to the selection result (step SC0213).

Figure 15:
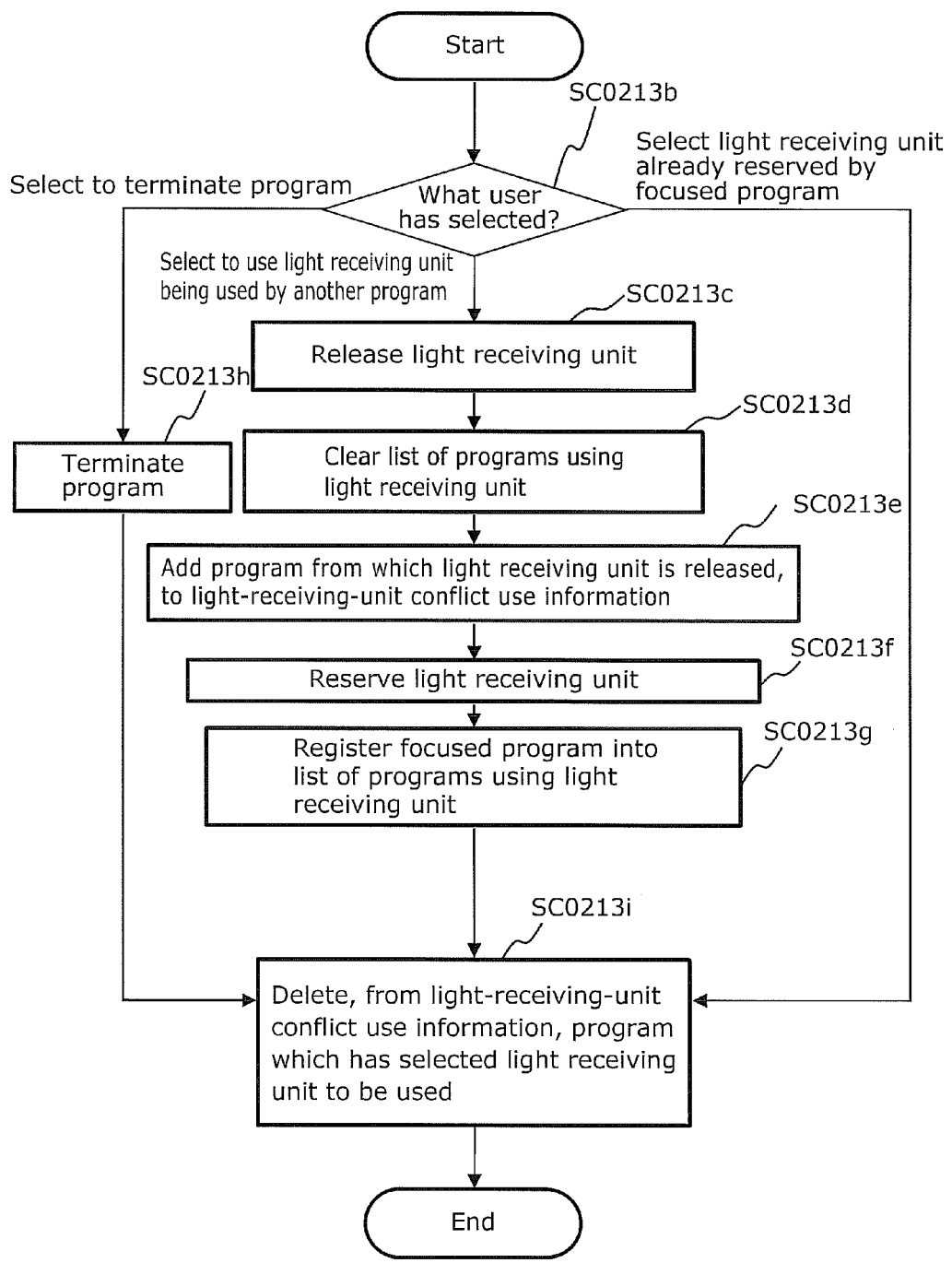
FIG. 15 is a flowchart illustrating detailed processing operation of step SC0213 illustrated in FIG. 12, according to Variation 2 of Embodiment 1.

FIG. 15 is a flowchart illustrating detailed processing operation of step SC0213 illustrated in FIG. 12. First, the program control unit C0202d determines what the user has selected for a focused program (step SC0213b). Here, if it is determined that a light receiving unit being used by another program is selected for the focused program, the program control unit C0202d releases the light receiving unit C0203a already reserved by the other program (step SC0213c), and clears, from the list of programs using a light receiving unit, information on that other program registered in the program-using-light-receiving-unit information store unit C0202e (step SC0213d). Then, the program control unit C0202d adds information on the program (other program) from which the reserved light receiving unit is released, to the light-receiving-unit conflict use information (step SC0213e). Then, the program control unit C0202d reserves the light receiving unit for the focused program via the light reception control unit C0202a (step SC0213f). Finally, the program control unit C0202d registers information on the focused program into the list of programs using a light receiving unit in the program-using-light-receiving-unit information store unit C0202e (step SC0213g).

In step SC0213b, if it is determined that the user has selected to terminate the program, the program control unit C0202d terminates the focused program (step SC0213h). In addition, if it is determined in step SC0213b that the user has selected the light receiving unit reserved by the focused program, the program control unit C0202d skips steps of the processing.

After executing the above processing, the program control unit C0202d deletes, from the light-receiving-unit conflict use information, information on a program which has selected the light receiving unit C0203a or the terminated program (step SC0213i).

Then, in step SC0214 illustrated in FIG. 12, the program control unit C0202d determines whether the entire information included in the light-receiving-unit conflict use information has been deleted (step SC0214). Here, if the light-receiving-unit conflict use information still includes information on conflict over use of the light receiving unit C0203a, the program control unit C0202d executes, on the remaining information, processing from step SC0211 illustrated in FIG. 12. In other words, the program control unit C0202d changes a focused program, and executes processing from step SC0211 on the changed focused program. If the entire information included in the light-receiving-unit conflict use information is deleted, the program control unit C0202d terminates the processing.

According to this variation as described above, in response to the operation by a user, for example, the light receiving unit C0203a on the back side of the terminal C0200 is assigned to one of a visible light communication program C0201a and a light-receiving-unit use program C0201b which will cause conflict over use of the light receiving unit C0203a on the front side of the terminal C0200, thereby eliminating the conflict. Then, if the light receiving unit C0203a on the back side is assigned to the visible light communication program C0201a, the visible light communication program C0201a causes a computer to execute visible light communication according to the light detected by the light receiving unit C0203a on the back side.

In this manner, the visible light communication program C0201a and the light-receiving-unit use program C0201b are each allowed to use a different one of the light receiving unit C0203a on the back side and the light receiving unit C0203a on the front side, and thus both the programs are allowed to be activated simultaneously, without terminating either of the programs. Consequently, visible light communication and processing different from visible light communication can be executed in parallel, which achieves a reduction in a processing time.

Variation 3

An information communication method according to this variation is a method for notifying, if the conflict over use of a light receiving unit occurs, a user of occurrence of the conflict, and also terminating a light-receiving-unit use program activated later, after obtaining user's consent. It should be noted that a repeated description of the drawings already described in Embodiment 1 and Variations 1 and 2 thereof is avoided.

Figure 16:
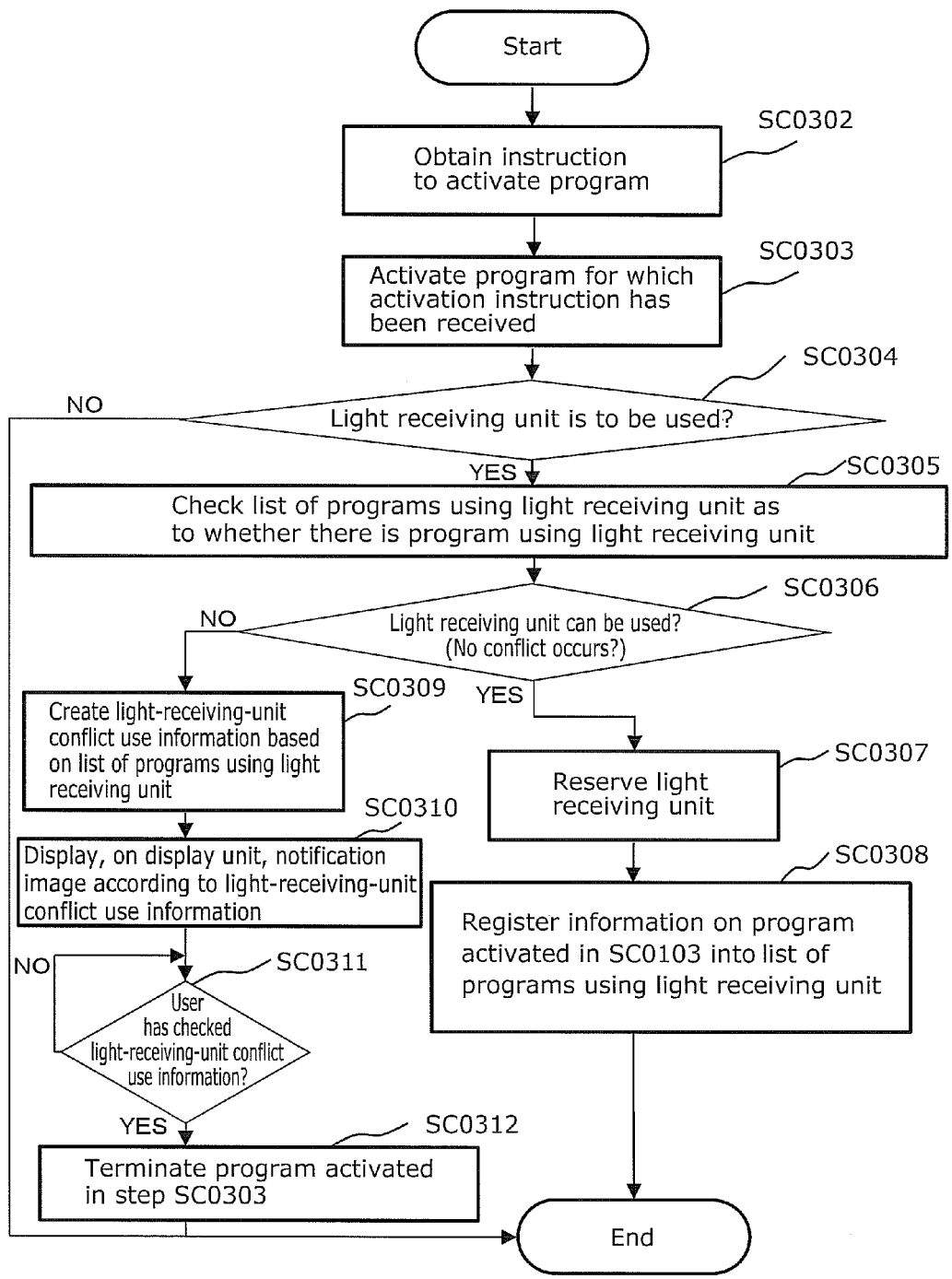
FIG. 16 is a flowchart illustrating processing operation by a terminal according to Variation 3 of Embodiment 1.

FIG. 16 is a flowchart illustrating processing operation by a terminal C0200 according to this variation.

Processing operation of the terminal C0200 according to this variation differs from the processing operation illustrated in FIG. 2 in that information indicating whether light-receiving-unit conflict use information has been checked is received (step SC0311), as input from a user in response to a notification image displayed on a display unit C0203b, rather than which program is permitted to use a light receiving unit.

In step SC0306 illustrated in FIG. 16, if conflict over use of the light receiving unit C0203a is detected, the program control unit C0202d creates light-receiving-unit conflict use information based on a list of programs using a light receiving unit (step SC0309). Furthermore, the program control unit C0202d causes the display unit C0203b to display a notification image according to the light-receiving-unit conflict use information, via the display control unit C0202b.

Figure 17:
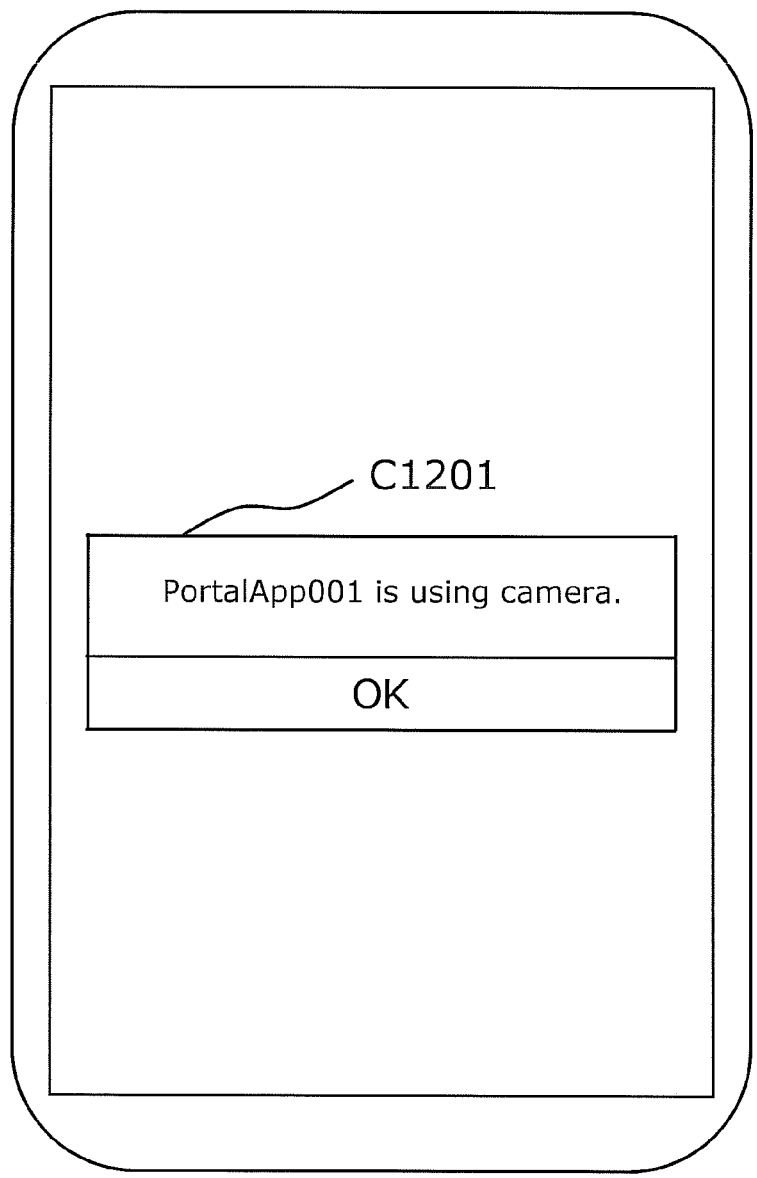
FIG. 17 illustrates an example of a notification image displayed on a display unit according to Variation 3 of Embodiment 1.

FIG. 17 illustrates an example of a notification image displayed on the display unit C0203b according to this variation. A notification image C1201 notifies a user that there are plural programs which are to use the light receiving unit C0203a, and furthermore, facilitates the user to check termination of a program activated later. The display of such a notification image notifies the user of the terminal C0200 which includes the light receiving unit C0203a, that the conflict will occur.

The program control unit C0202d terminates a program activated in step SC0303 (program activated later) after receiving input indicating that the user has checked via the input unit C0203c and the input control unit C0202c (step SC0312).

Also in this variation as described, as with Embodiment 1, if conflict over use of the light receiving unit C0203a occurs, the user of the light receiving unit C0203a is notified of occurrence of the conflict, and a user operation permits a program activated earlier to use the light receiving unit. Thus, the user can understand with ease the status occurring in the terminal C0200 that includes the light receiving unit C0203a. Furthermore, the user understands the status, and then can manipulate the terminal C0200. Thus, without performing extra operation, the user can solve with ease conflict over use of the light receiving unit C0203a. As a result, improvement in a user interface can be achieved and burden on a user can be reduced.

Embodiment 2

An information communication method according to the present embodiment is a method for obtaining, based on an image obtained by, for example, a receiver achieved as a smartphone (multifunctional mobile phone) capturing an image of a subject that changes luminance, information indicated by the luminance change. Here, the receiver obtains information indicated by the luminance change of the subject if a mark indicating a position of the subject is in a predetermined box in an image obtained by imaging.

Figure 19:
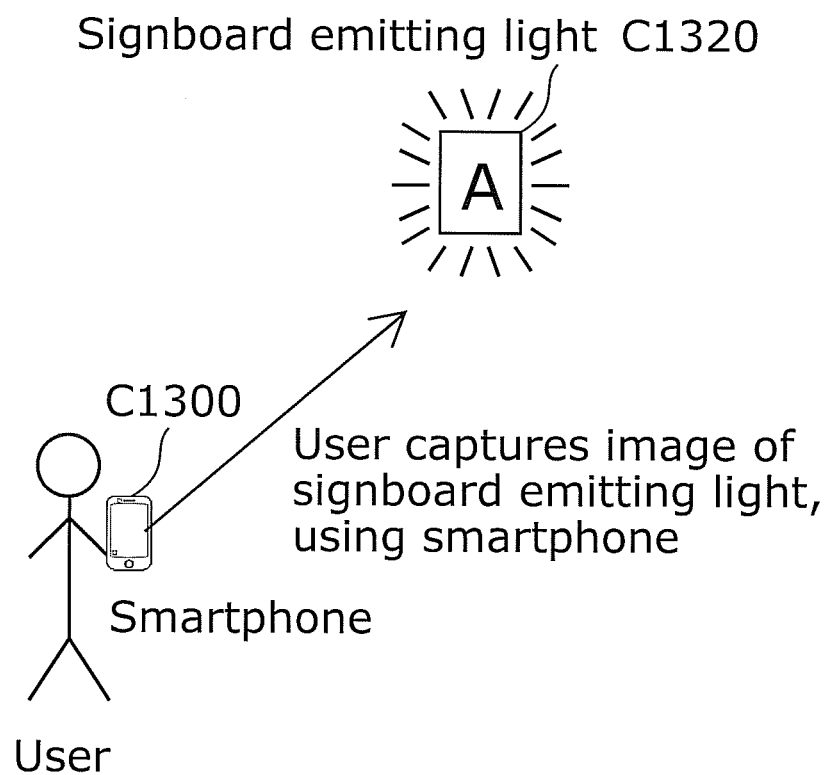
FIG. 19 illustrates an example of use of a receiver according to Embodiment 2.

FIGS. 18 and 19 illustrate examples of using a receiver according to the present embodiment.

A user of a receiver C1300 achieved as a smartphone finds a signboard C1320 that attract his/her interest. The signboard C1320 is an example of a data transmission light C0100, and transmits a signal by changing luminance. The user aims a camera (light receiving unit) of the receiver C1300 at the signboard C1320, and captures an image of the signboard C1320 as a subject. It should be noted that the receiver C1300 according to the present embodiment has the same configuration as the terminal C0200 according to Embodiment 1, and may perform visible light communication using the visible light communication program C0201a.

Figure 20:
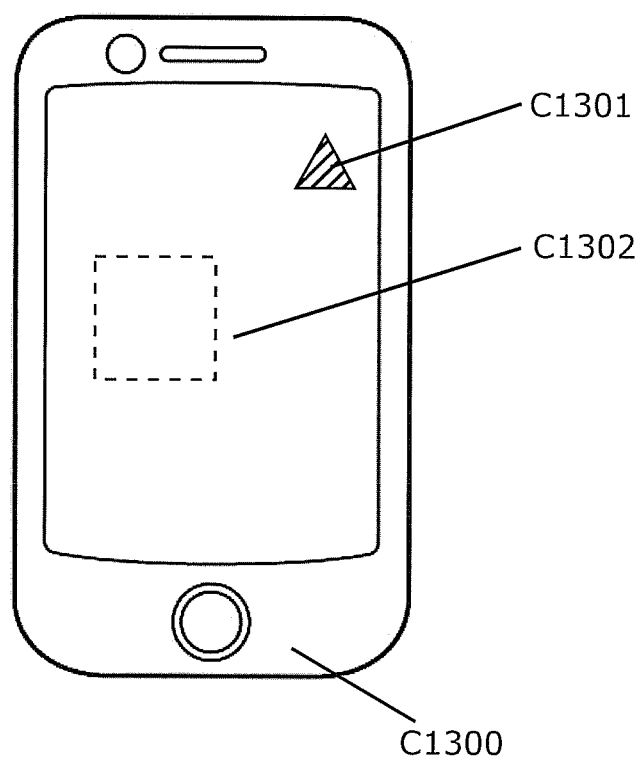
FIG. 20 illustrates an example of an image obtained by capturing an image.

FIG. 20 illustrates an example of an image obtained by capturing an image.

The receiver C1300 displays a box C1302 and a mark C1301 indicating the position of the signboard C1320 on the display of the receiver C1300, by capturing an image of the signboard C1320. In other words, a captured image that includes the mark C1301 and the box C1302 is displayed on the display of the receiver C1300. The mark C1301 is a subject image for identifying the signboard C1320 which is a subject, and the box C1302 is displayed at a predetermined position of the display. Here, capturing an image is performed continuously and repeatedly at predetermined cycles. Thus, if a user moves the receiver C1300, the mark C1301 moves although the position of the box C1302 on the display does not change. In other words, the receiver C1300 displays a captured image that includes the mark C1301 for identifying the signboard C1320 and the box C1302 while continuously updating the position of the mark C1301 on the captured image according to the positional relationship between the signboard C1320 and the image sensor of the camera established when the image is captured.

Then, the receiver C1300 according to the present embodiment receives signals transmitted from the signboard C1320 by changing luminance and demodulates the signals when the mark C1301 enters the box C1302, thereby obtaining information from the signboard C1320.

Figure 21:
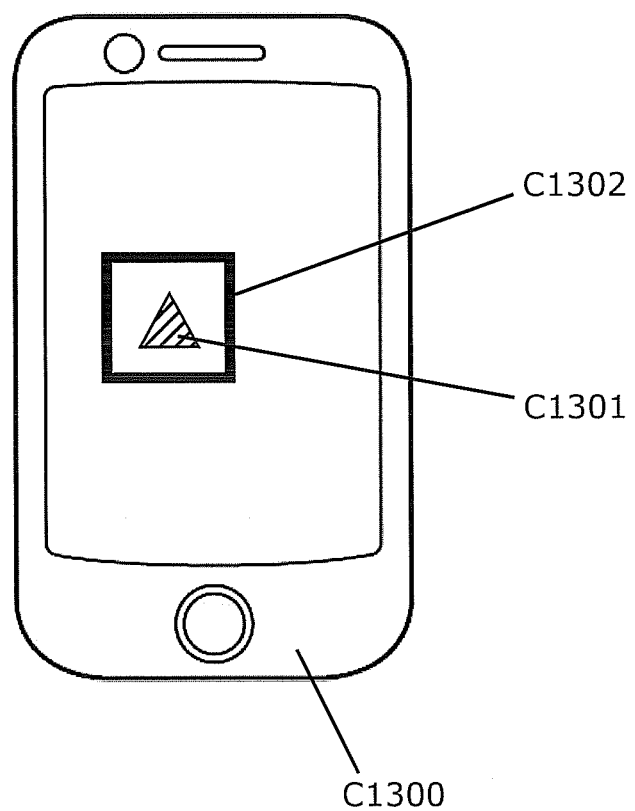
FIG. 21 illustrates a state when a mark enters a box.

FIG. 21 illustrates a state when the mark C1301 enters the box C1302.

If it is determined that the mark C1301 has entered the box C1302, the receiver C1300 changes the color of the box C1302 or displays the box C1302 with a thicker line, in order to emphasize the box C1302, for example. Then, the receiver C1300 receives a signal transmitted from the signboard C1320 by changing luminance, which corresponds to the mark C1301 that has entered the box C1302, and demodulates the signal, thereby obtaining information from the signboard C1320.

Figure 22:
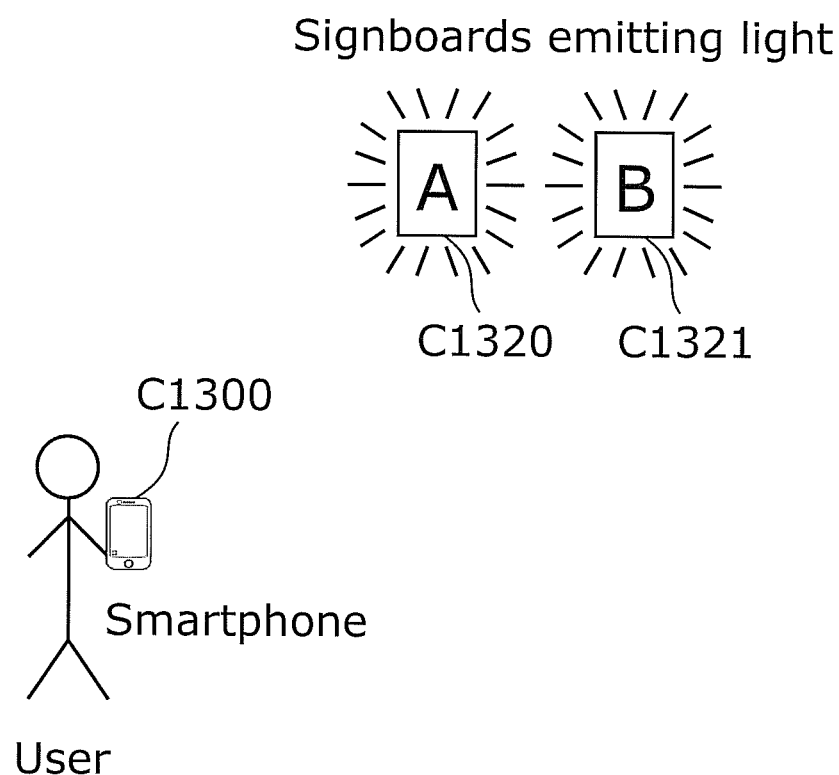
FIG. 22 illustrates another example of use of a receiver according to Embodiment 2.
Figure 23:
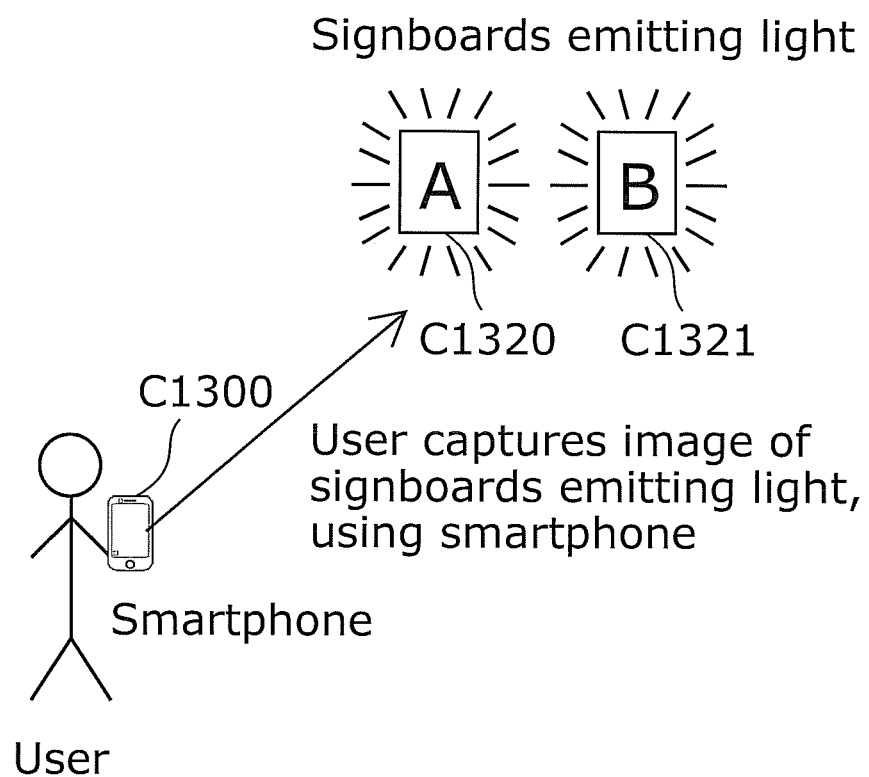
FIG. 23 illustrates another example of use of a receiver according to Embodiment 2.

FIGS. 22 and 23 illustrate other examples of using a receiver according to the present embodiment.

A user of the receiver C1300 achieved as a smartphone finds the signboard C1320 that attracts his/her interest. The signboard C1320 transmits a signal by changing luminance. The user aims a camera (light receiving unit) of the receiver C1300 at the signboard C1320, and captures an image of the signboard C1320 as a subject. Here, a signboard C1321 is near the signboard C1320. The signboard C1321 is also an example of a data transmission light C0100 and transmits a signal by changing the luminance, as with the signboard C1320. Thus, the signboard C1321 may also be included in the imaging range of the camera of the receiver C1300 aimed at the signboard C1320.

Figure 24:
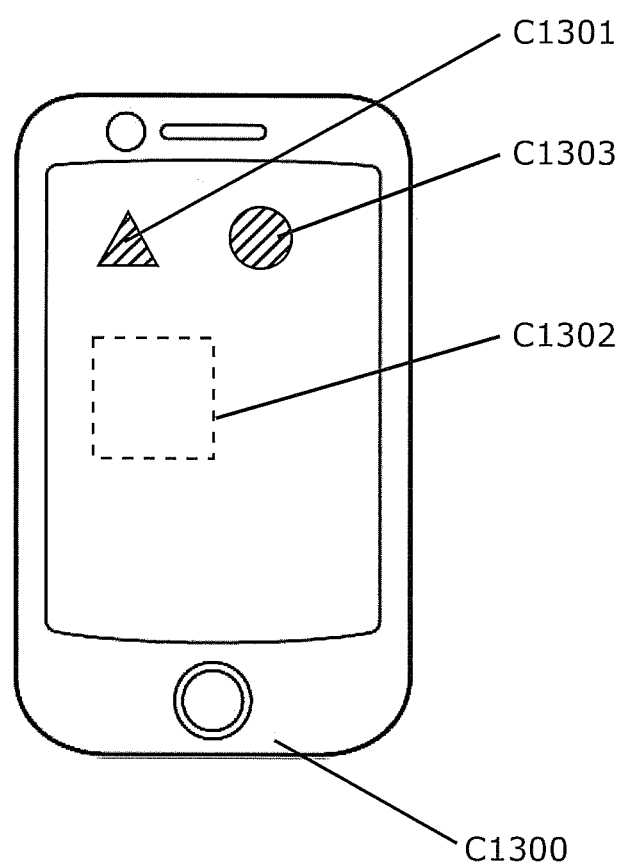
FIG. 24 illustrates another example of an image obtained by capturing an image.

FIG. 24 illustrates another example of an image obtained by capturing an image.

The receiver C1300 captures an image of the signboard C1320, and displays, on the display of the receiver C1300, the box C1302 and the mark C1301 indicating the position of the signboard C1320. The signboard C1321 is also included in the imaging range of the camera of the receiver C1300, and thus a mark C1303 indicating the position of the signboard C1321 is displayed on the display, together with the mark C1301.

Here, the mark C1303 is a subject image for identifying the signboard C1321 which is a subject, and the box C1302 is displayed at a predetermined position on the display as with the description given above. In addition, capturing an image is performed continuously and repeatedly at predetermined cycles. Thus, if the user moves the receiver C1300, the position of the box C1302 on the display does not change, but the marks C1301 and C1303 move. Specifically, the receiver C1300 displays a captured image which includes the box C1302 and the marks C1301 and C1303 for respectively identifying the signboards C1320 and C1321, according to a positional relationship between the image sensor of the camera and the signboards C1320 and C1321 established when the images are captured, while continuously updating the positions of the marks C1301 and C1303 on the captured image.

When either of the marks C1301 and C1303 enters the box C1302, the receiver C1300 according to the present embodiment receives and demodulates a signal transmitted from a signboard by changing luminance, which corresponds to the mark in the box C1302, thereby obtaining information from the signboard.

Figure 25:
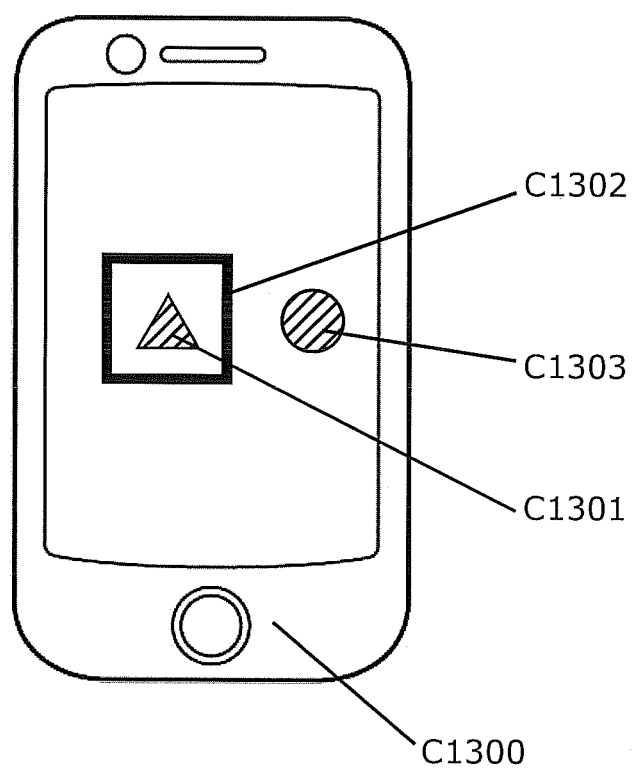
FIG. 25 illustrates a state when a mark enters a box.

FIG. 25 illustrates a state when the mark C1301 enters the box C1302.

If the receiver C1300 determines that the mark C1301 has entered the box C1302, the receiver C1300 changes the color of the box C1302, or displays the box C1302 with a thicker line, to emphasize the box C1302, for example. Then, the receiver C1300 receives and demodulates only a signal transmitted from the signboard C1320 by changing luminance, which corresponds to the mark C1301 that has entered the box C1302 out of the marks C1301 and C1303, thereby obtaining only information from the signboard C1320.

In this way, according to the information communication method according to the present embodiment, a visible light communication program which runs in the background allows a user to easily select a subject (data transmission light such as a signboard) from which data is to be received, for example.

Figure 26:
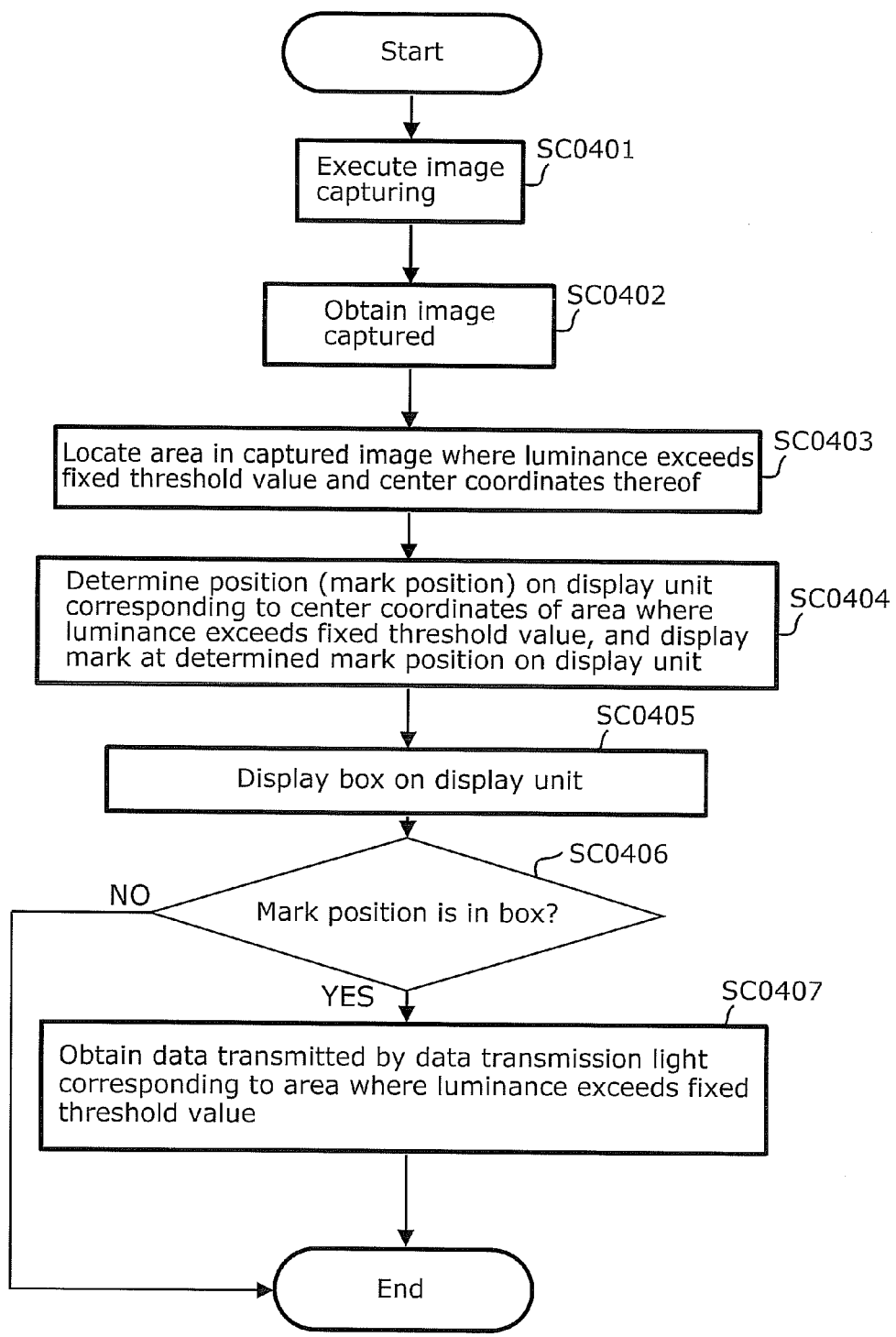
FIG. 26 is a flowchart illustrating processing operation of a terminal according to Embodiment 2.

FIG. 26 is a flowchart illustrating processing operation of the terminal C0200 achieved as the receiver C1300 according to the present embodiment.

First, the visible light communication program C0201a performs imaging using the light receiving unit C0203a via the light reception control unit C0202a in a state where the shutter speed of the light receiving unit C0203a is increased using the light reception control unit C0202a (step SC0401). Next, the visible light communication program C0201a obtains an image captured by the light receiving unit C0203a via the light reception control unit C0202a (step SC0402). Imaging in step SC0401 and obtaining a captured image in step SC0402 are repeatedly performed at fixed cycles.

Next, every time an image captured by the light receiving unit C0203a (hereinafter, referred to as a captured image) is newly obtained, the visible light communication program C0201a locates an area in the captured image where the luminance exceeds a fixed threshold value and the center coordinates thereof (step SC0403). The visible light communication program C0201a locates the center coordinates using a method for locating the center coordinates as described in the following, for example. According to the method for locating the center coordinates, assuming that an X-axis is the width direction of a captured image and a Y-axis is the height direction of a captured image, an x-coordinate located midway between an x-coordinate of a leftmost pixel and an x-coordinate of a rightmost pixel among pixels where luminance exceeds a fixed threshold value is considered to be an x-coordinate of the center of an area where luminance exceeds a fixed threshold value. Furthermore, among pixels where luminance exceeds a fixed threshold value, a y coordinate located midway between a y coordinate of an uppermost pixel and a y coordinate of a lowermost pixel is considered to be a y coordinate of the center of the area where luminance exceeds a fixed threshold value.

Next, the visible light communication program C0201a determines, via the display control unit C0202b, a position (hereinafter, referred to as a mark position) on the display unit C0203b (display) corresponding to the center coordinates of the area where luminance exceeds the fixed threshold value, and displays a mark at the mark position on the display unit C0203b (step SC0404). If a mark is already displayed on the display unit C0203b, the visible light communication program C0201a once deletes the mark that has been displayed until that time, and thereafter displays a mark at the newly calculated mark position. For example, the visible light communication program C0201a associates the center of a captured image with the center of the display unit C0203b, associates an upper end of the captured image with an upper end of the display unit C0203b, associates a lower end of the captured image with a lower end of the display unit C0203b, associates a left end of the captured image with a left end of the display unit C0203b, associates a right end of the captured image with a right end of the display unit C0203b, and obtains a mark position from the ratio of the lengths of the sides of the captured image and the display unit C0203b. Specifically, it is assumed that the width of the captured image is 480 pixels, the height is 640 pixels, the upper left is the origin, the lower left coordinates are (0, 640), and the upper right coordinates are (480, 0). In addition, it is assumed that regarding the size of the display unit C0203b (display), the width is 960 pixels, the height is 1280 pixels, the upper left is the origin, the lower left coordinates are (0, 1280), and the upper right coordinates are (960, 0). Under this condition, if the above-described association is used, the visible light communication program C0201a determines the coordinates (200,400) as the position (mark position) on the display unit C0203b corresponding to the center coordinates (100, 200) of the above-described area on the captured image. The visible light communication program C0201a displays the mark at the mark position every time a captured image is obtained from the light receiving unit C0203a via the light reception control unit C0202a.

In addition, the visible light communication program C0201a displays, on the display unit C0203b, the box C1302 illustrated in FIG. 20 (step SC0405). The visible light communication program C0201a compares the mark position with the coordinates on the display unit C0203b of the box C1302 displayed on the display unit C0203b, and determines whether the mark position is in the box C1302 (step SC0406). For example, the width of the display unit C0203b is 960 pixels, and the height thereof is 1280 pixels. Then, in the coordinate system of the display unit C0203b, the upper left is the origin, the lower left coordinates are (0, 1280), and the upper right coordinates are (960, 0). In addition, the upper left coordinates of the box C1302 being displayed are (450, 610), the lower left coordinates are (450, 670), the upper right coordinates are (510, 610), and the lower right coordinates are (510, 670). At this time, assuming that the mark position is (x, y), it is determined that the mark position is in the box C1302 if "450≤x≤510 and 610≤y≤670".

Here, the visible light communication program C0201a obtains a signal transmitted by a data transmission light (such as a signboard) corresponding to an area where luminance exceeds the fixed threshold value if it is determined that the mark position is in the box C1302 (YES in step SC0406) (step SC0407).

For example, in the state illustrated in FIG. 20, the center coordinates of the mark C1301 are outside the box C1302, and thus the visible light communication program C0201a does not receive a signal transmitted by a data transmission light corresponding to the mark C1301. On the other hand, in the state illustrated in FIG. 21, the center coordinates of the mark C1301 are in the box C1302, and thus the visible light communication program C0201a receives a signal transmitted by a data transmission light corresponding to the mark C1301. In addition, as illustrated in FIG. 22, there are plural data transmission lights such as signboards, and as illustrated in FIG. 23, the light receiving unit C0203a simultaneously captures images of plural data transmission lights. At this time, as illustrated in FIG. 24, if the center coordinates of both of the marks C1301 and C1303 are outside the box C1302, the visible light communication program C0201a does not receive a signal from any of the data transmission lights. On the other hand, as illustrated in FIG. 25, if the center coordinates of the mark C1301 are present in the box C1302, the visible light communication program C0201a receives a signal from the data transmission light corresponding to the mark C1301.

In the present embodiment, if images of plural data transmission lights are captured by the light receiving unit C0203a, marks are displayed at mark positions corresponding to respective data transmission lights. Marks are different for data transmission lights. the difference of the marks are represented by the difference in shape, the difference in color, the difference in text, or the difference in illustration, for example. Then, among the plural data transmission lights, a signal transmitted from a data transmission light corresponding to a mark position determined to be in the box C1302 is received. If plural mark positions are present in the box C1302, the visible light communication program C0201a selects one of the positions, and receives a signal transmitted from a data transmission light corresponding to the selected mark position. For example, the visible light communication program C0201a receives a signal transmitted from a data transmission light corresponding to the mark position which has entered the box C1302 earlier. In addition, the visible light communication program C0201a receives a signal transmitted from a data transmission light having a large area where luminance exceeds the fixed threshold value.

It should be noted that although in the present embodiment, a data transmission light from which a signal is obtained is selected by comparing a mark position with the coordinates of a box displayed on the display unit C0203b, such a box may not be displayed. For example, a mark position and the coordinates of a point on the display unit C0203b designated by a user via the input unit C0203c are compared, a data transmission light corresponding to a mark position distant from the mark position by a fixed range or less is selected as a data transmission light from which a signal is to be obtained.

It should be noted that if an image captured by the light receiving unit C0203a is displayed on the display unit C0203b as it is, a mark showing an area where luminance exceeds the fixed threshold value may not be displayed on the display unit C0203b.

According to the present embodiment as described above, even if plural subjects which transmit signals by changing luminance are present nearby, a signal only from a desired subject can be easily received by merely capturing a subject image of the desired subject in a box.

Embodiment 3

Conventionally, reading a QR code (registered trademark) by using a camera has been used to automatically activate a data-usable application (application program) and make an access to an application installation site in a terminal such as a smartphone. However, according to such a conventional method, it is necessary to take a close-up shot of a QR code for reading, and thus reading from a distant location and simultaneous reading by plural terminals are difficult.

According to the present embodiment, such a problem is addressed, and plural terminals are simultaneously allowed to automatically activate an application for which data can be used and automatically access an application installation site, without being brought close to a subject whose image is to be captured.

In other words, an information communication method according to the present embodiment includes: a light reception step of receiving visible light; a decoding step of extracting data from the received light; an inquiry step of inquiring of a server information regarding the obtained data and obtaining a result; an identification step of identifying a data-usable application or an installable application, using the obtained inquiry result; a display step of showing a data-usable or installable application to a user according to the identification result; and an execution step of activating or installing an application selected by a user who has received a notification. In this manner, a terminal which performs such an information communication method can obtain information on a data-usable or installable application, without being brought close to a subject to be imaged. In addition, plural terminals which perform such an information communication method can simultaneously obtain information on a data-usable or installable application.

The following describes the present embodiment in detail.

The present embodiment involves an information communication method for allowing a terminal to use data received from a data transmission light, displaying a list of applications installed in the terminal, and activating an application selected by a user.

Figure 27:
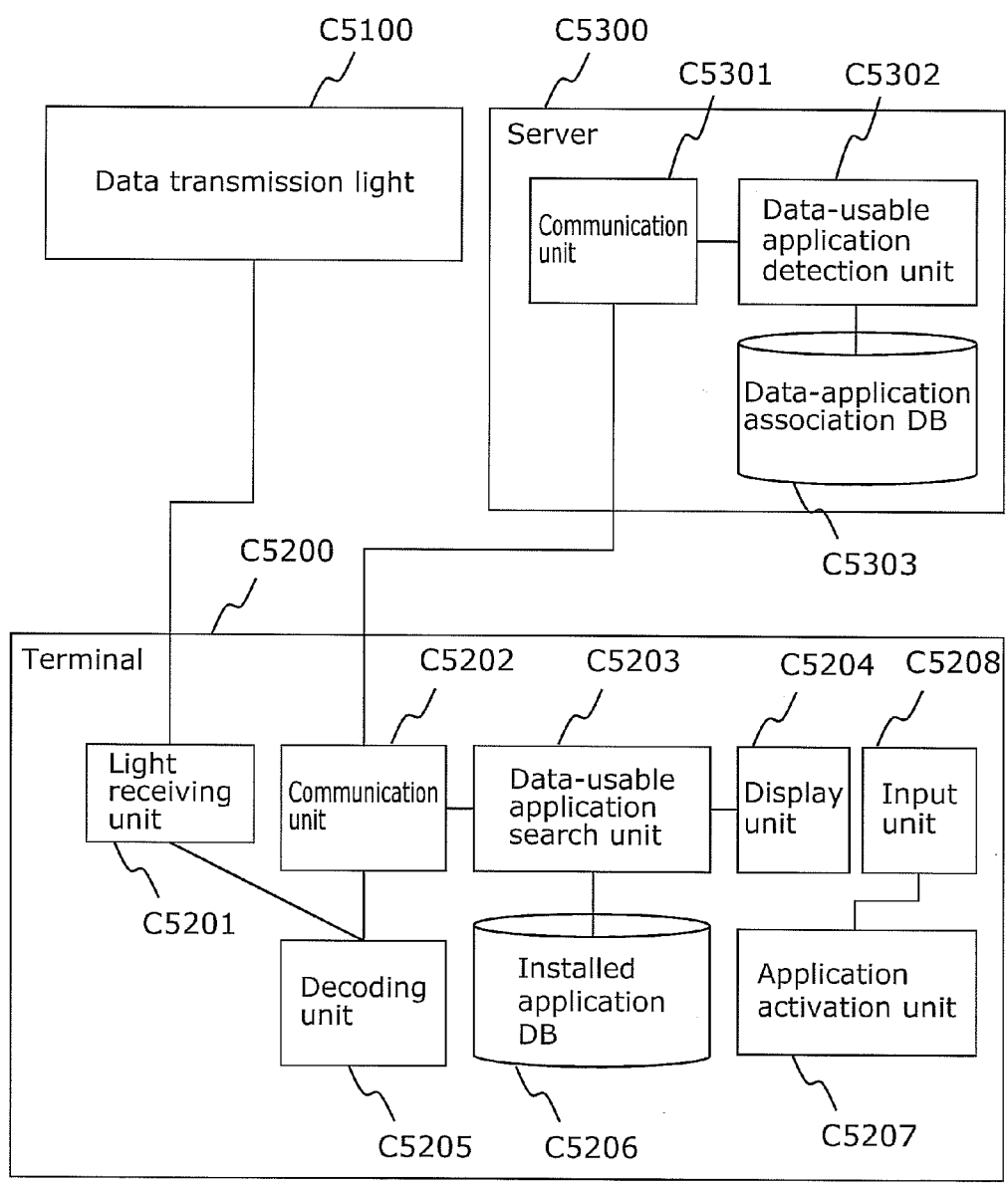
FIG. 27 illustrates a system configuration according to Embodiment 3.

FIG. 27 illustrates a system configuration according to the present embodiment.

A data transmission light C5100 transmits data using light in the same manner as the data transmission light C0100 according to Embodiment 1. A terminal C5200 includes: a light receiving unit C5201 which shoots light emitted by the data transmission light C5100; a decoding unit C5205 which extracts data from the light received by the light receiving unit C5201, as decoded data; a communication unit C5202 which transmits the decoded data extracted by the decoding unit C5205 to a server C5300, and receives, from the server C5300, a list of applications for which the decoded data is usable (data-usable application list); a data-usable application search unit C5203 which detects an application installed in the terminal C5200 from the data-usable application list received from the server C5300; an installed application DB_C5206 which stores information on an application installed in the terminal C5200; a display unit C5204 which shows information to a user; an input unit C5208 which receives input from the user; and an application activation unit C5207 which activates an application designated by the user via the input unit C5208. The light receiving unit C5201 has a function of changing the shutter speed used when receiving light. In addition, the terminal C5200 may include a plurality of the light receiving units C5201.

The server C5300 includes: a communication unit C5301 which receives decoded data from the terminal C5200, and transmits a list of applications for which the decoded data is usable; a data-usable application detection unit C5302 which detects an application for which decoded data received from the terminal C5200 is usable; and a data-application association DB_C5303 which stores association between data transmitted by a data transmission light (decoded data) and an application for which the data is usable.

Figure 28:
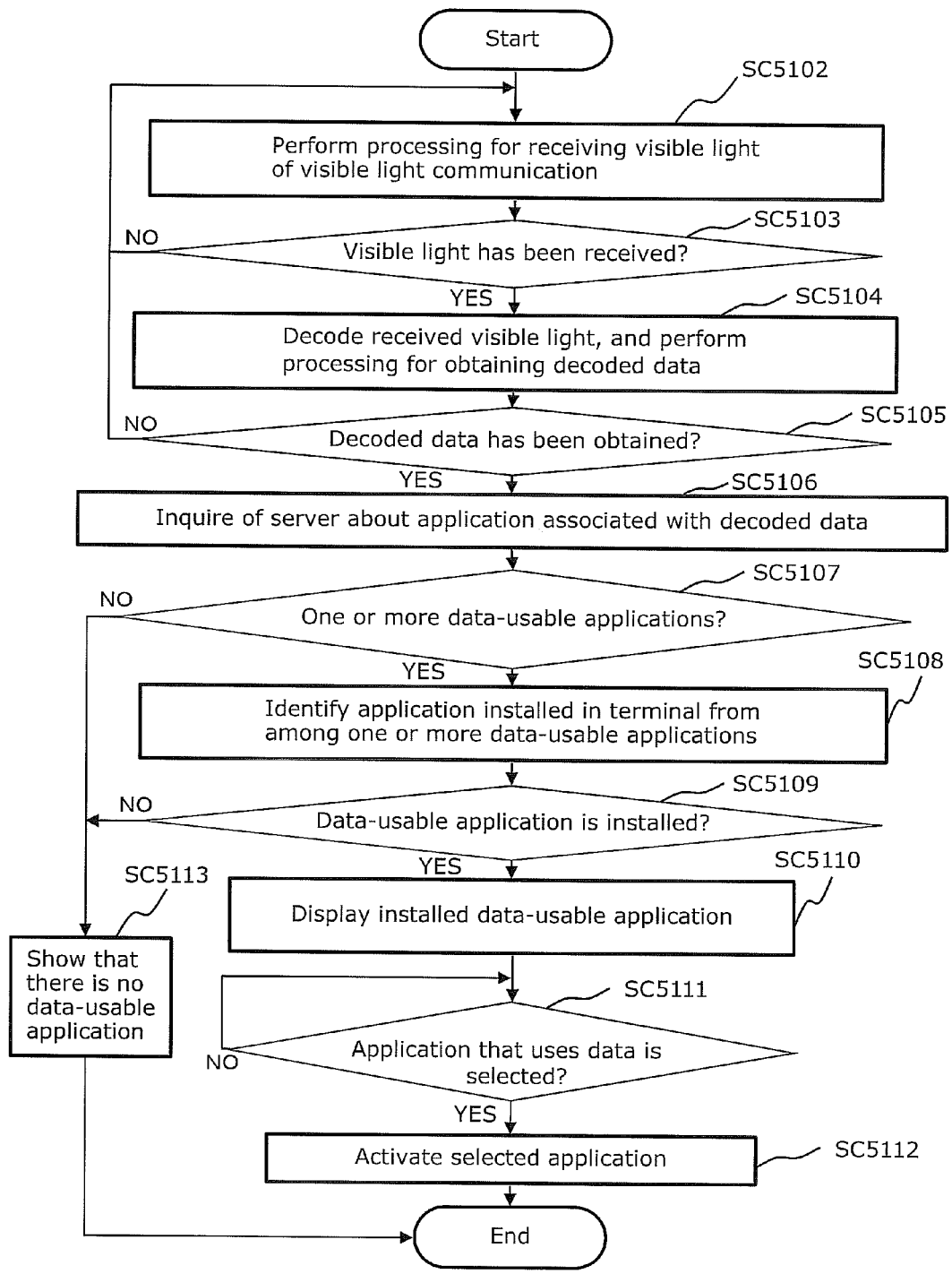
FIG. 28 is a flowchart illustrating processing operation by a terminal to receive visible light of visible light communication, and notify a user of a data-usable application.

FIG. 28 is a flowchart illustrating processing operation by the terminal C5200 to receive visible light of visible light communication, and notify a user of a data-usable application.

Figure 29:
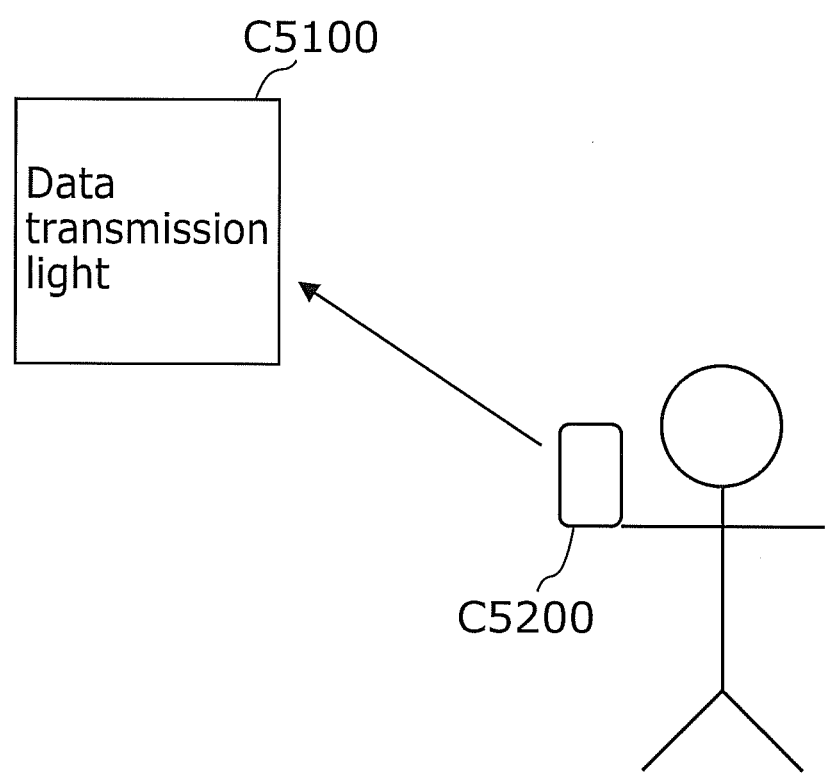
FIG. 29 illustrates an example of use according to Embodiment 3.

If a user aims the terminal C5200 at the data transmission light C5100 as illustrated in FIG. 29, the terminal C5200 performs, using the light receiving unit C5201, processing for receiving visible light of visible light communication emitted from the data transmission light C5100 (step SC5102). Next, the terminal C5200 determines whether visible light has been received (step SC5103). Here, if it is determined that light has been received (YES in step SC5103), the terminal C5200 performs processing for obtaining decoded data using the decoding unit C5205 from the light received by the light receiving unit C5201 (step SC5104).

Figure 30:
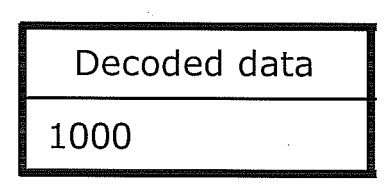

FIG. 30 illustrates an example of decoded data to be obtained. For example, decoded data to be obtained is "1000."

After step SC5104 illustrated in FIG. 28, the terminal C5200 determines whether decoded data has been obtained (step SC5105). Here, if it is determined that decoded data has been obtained (YES in step SC5105), the terminal C5200 transmits, using the communication unit C5202, the obtained decoded data to the server C5300, and inquires whether there is any application for which the obtained decoded data is usable (step SC5106). After that, the terminal C5200 receives from the server C5300 using the communication unit C5202, a list of applications for which the obtained decoded data is usable (data-usable application list).

Figure 31:
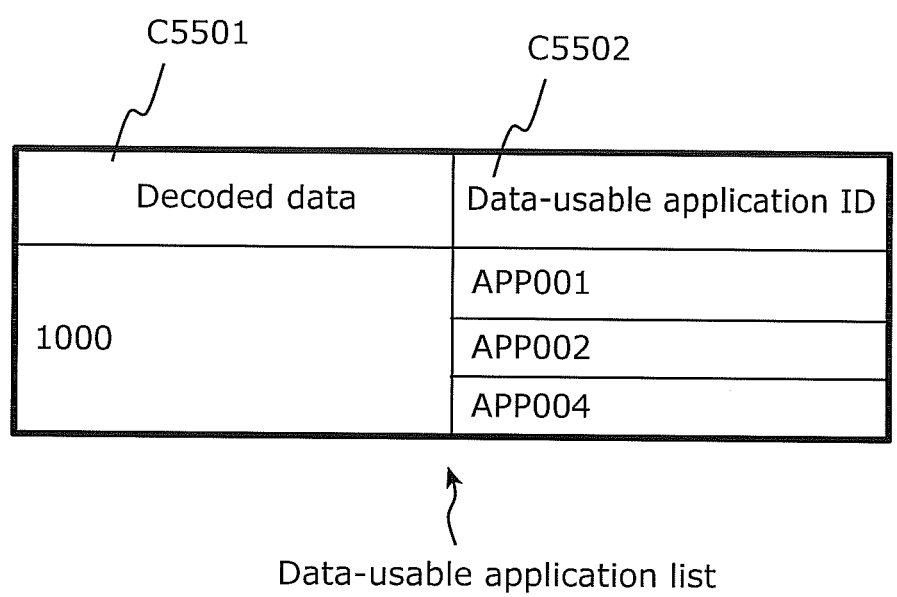
FIG. 31 illustrates an example of a data-usable application list according to Embodiment 3.

FIG. 31 illustrates an example of a data-usable application list that is received.

As illustrated in FIG. 31, this data-usable application list includes decoded data C5501 and a data-usable application ID_C5502 for identifying each of data-usable applications associated with the decoded data.

In step SC5107 illustrated in FIG. 28, the terminal C5200 determines based on the data-usable application list received from the server C5300, whether there are one or more applications for which the decoded data obtained in step SC5104 is usable (step SC5107). Here, if it is determine that there are one or more such applications (YES in step SC5107), the terminal C5200 compares, using the data-usable application search unit C5203, data-usable application IDs in the data-usable application list received from the server C5300 with application IDs in an installed application list stored in the installed application DB_C5206. Consequently, the terminal C5200 identifies an installed application from among one or more applications shown in the data-usable application list (data-usable application) (step SC5108).

Figure 32:
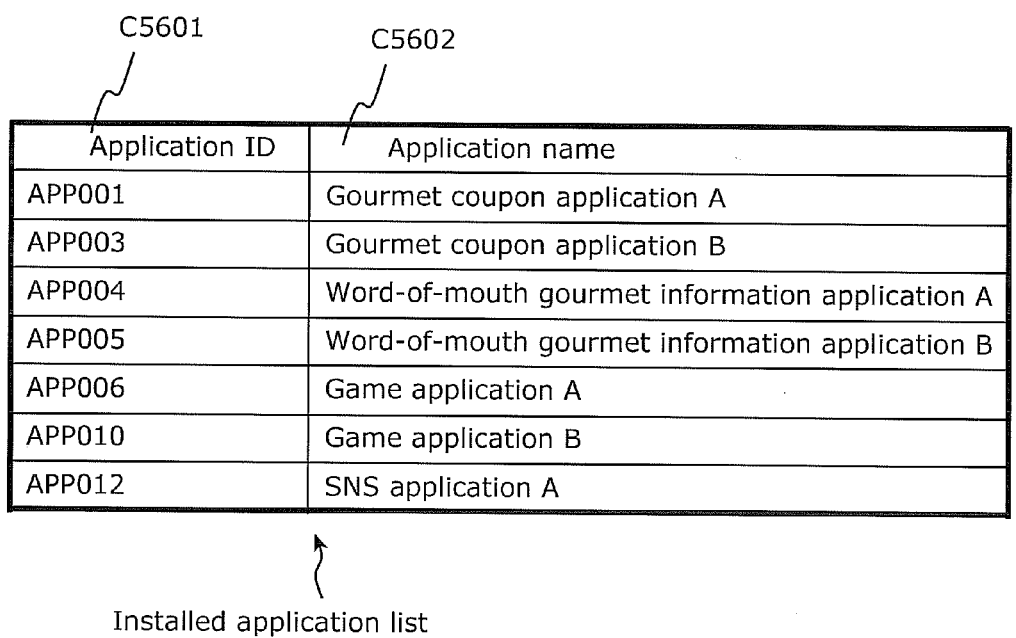
FIG. 32 illustrates an example of information (installed application list) stored in an installed application DB according to Embodiment 3.

FIG. 32 illustrates an example of information (installed application list) stored in the installed application DB_C5206.

As illustrated in FIG. 32, the installed application list includes, for each of the applications installed in the terminal C5200, an application ID_C5601 for identifying the application and a name C5602 of the application (application name).

In step SC5109 illustrated in FIG. 28, the terminal C5200 determines whether one or more data-usable applications are installed (step SC5109). Then, if the terminal C5200 determines that one or more data-usable applications are installed (YES in step SC5109), the terminal C5200 displays the one or more installed data-usable applications on the display unit C5204 in the form of a list (step SC5110).

Figure 33:
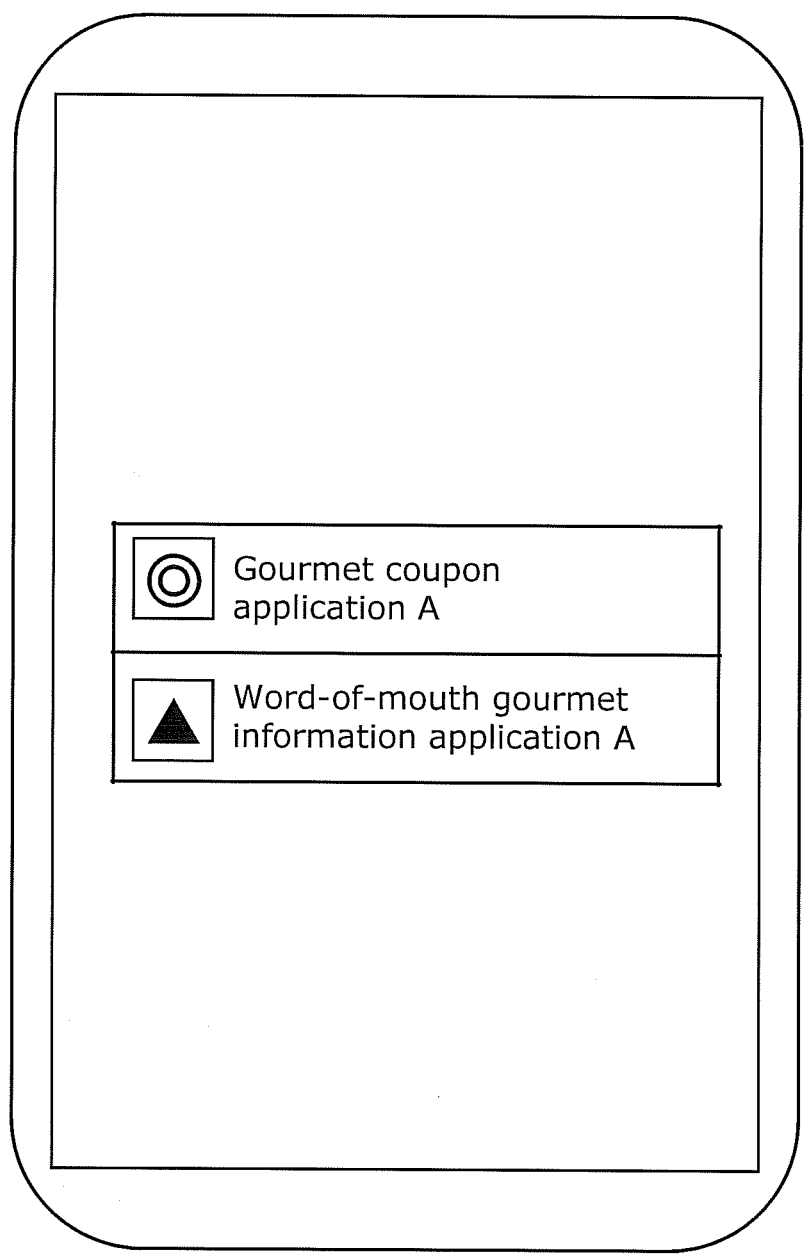
FIG. 33 illustrates an example of a list of data-usable applications displayed on a display unit according to Embodiment 3.

FIG. 33 illustrates an example of a list of data-usable applications displayed on the display unit C5204.

The display unit C5204 shows names of the installed data-usable applications, as illustrated in FIG. 33, for example. In this way, the screen displayed on the display unit C5204 is an application selection screen for selecting an application program from among plural application programs for which obtained decoded data is usable.

In step SC5111 illustrated in FIG. 28, the terminal C5200 determines whether a user has selected, using the input unit C5208, an application that uses the decoded data from among one or more data-usable applications displayed on the display unit C5204 (step SC5111). Here, if the terminal C5200 determines that such an application has been selected (YES in step SC5111), the terminal C5200 activates the application selected by the user, using the application activation unit C5207 (step SC5112).

It should be noted that if it is determined in step SC5107 that there is no application for which the decoded data obtained in step SC5104 is usable, or if it is determined in step SC5109 that there is no such data-usable application, the terminal C5200 shows, on display unit 5204, that there is no data-usable application (step SC5113).

Figure 34:
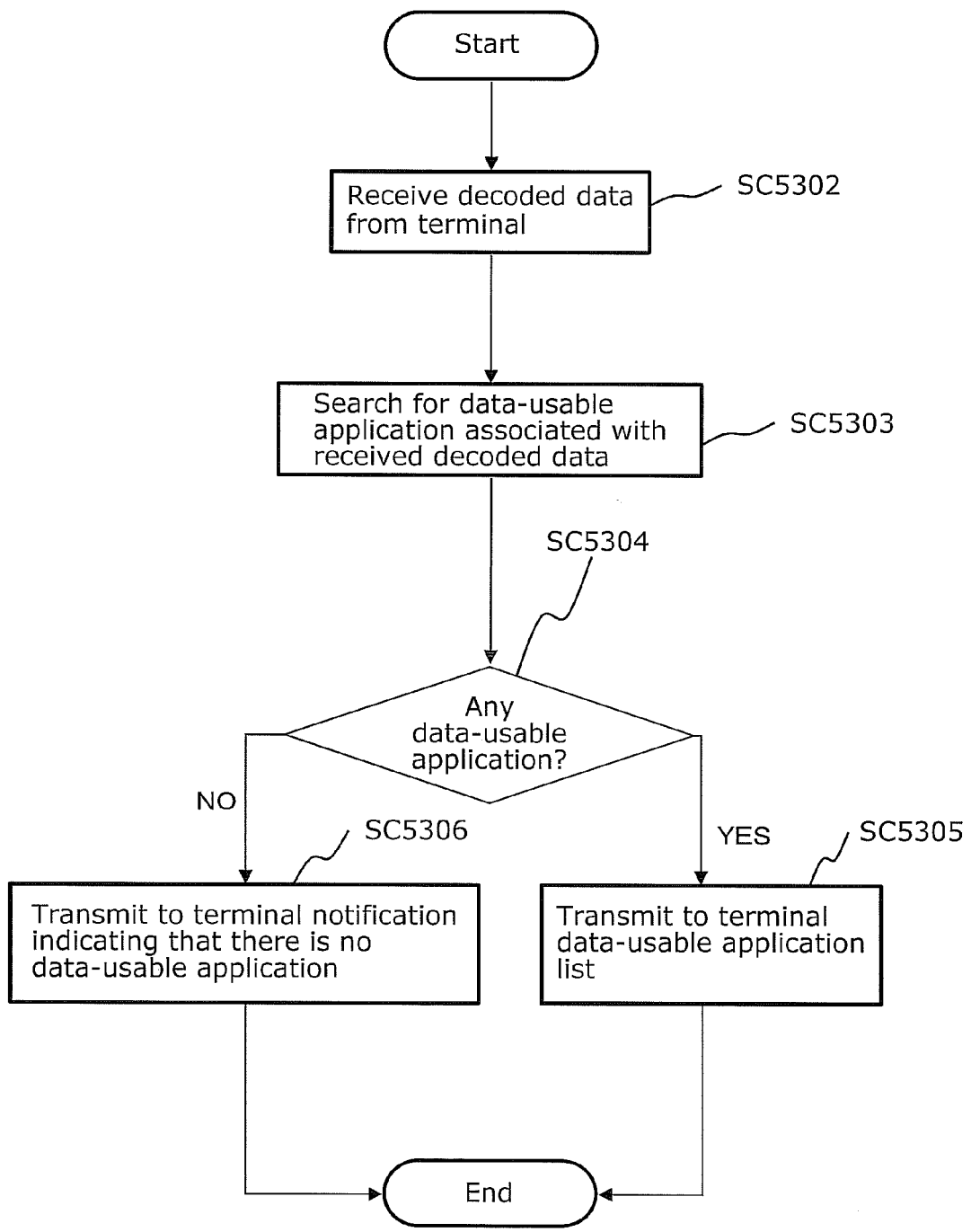
FIG. 34 is a flowchart illustrating processing operation by a server to search for an application for which decoded data is usable, according to Embodiment 3.

FIG. 34 is a flowchart illustrating processing operation by the server C5300 to search for an application for which decoded data is usable.

First, the server C5300 receives decoded data from the terminal C5200 using the communication unit C5301 (step SC5302). Next, the server C5300 searches information stored in the data-application association DB_C5303 for an application (data-usable application) for which the decoded data is usable, using the data-usable application detection unit C5302 (step SC5303).

FIG. 35 illustrates an example of information stored in the data-application association DB_C5303.

This information includes, for each of applications, an application ID_C5401 for identifying the application, and at least one piece of decoded data C5402 which is usable for the application.

Specifically, in step SC5303 illustrated in FIG. 34, the data-usable application detection unit C5302 of the server C5300 searches information stored in the data-application association DB_C5303 for decoded data received from the terminal C5200, and determines an application identified using an application ID associated with the decoded data, as data-usable application.

Consequently, the server C5300 determines whether there is any data-usable application (step SC5304). Here, if it is determined that there is a data-usable application (YES in step SC5304), the server C5300 transmits to the terminal C5200 a data-usable application list showing the data-usable application (step SC5305). On the other hand, if it is determined that there is no data-usable application (NO in step SC5304), the server C5300 transmits to the terminal C5200 information for notifying that there is no data-usable application (step SC5306).

According to the present embodiment as described above, the application selection screen illustrated in FIG. 33 is displayed, which is for selecting an application program from among plural application programs for which obtained decoded data is usable. Then, if an application program is selected in response to a user operation on the application selection screen, the selected application program causes a computer to execute processing using decoded data. In this manner, an appropriate application program can be caused to process data obtained by visible light communication.

Variation

This variation relates to an information communication method for displaying a list of applications not installed in a terminal among applications for which data received by a terminal from a data transmission light is usable, and installing an application selected by a user.

Figure 36:
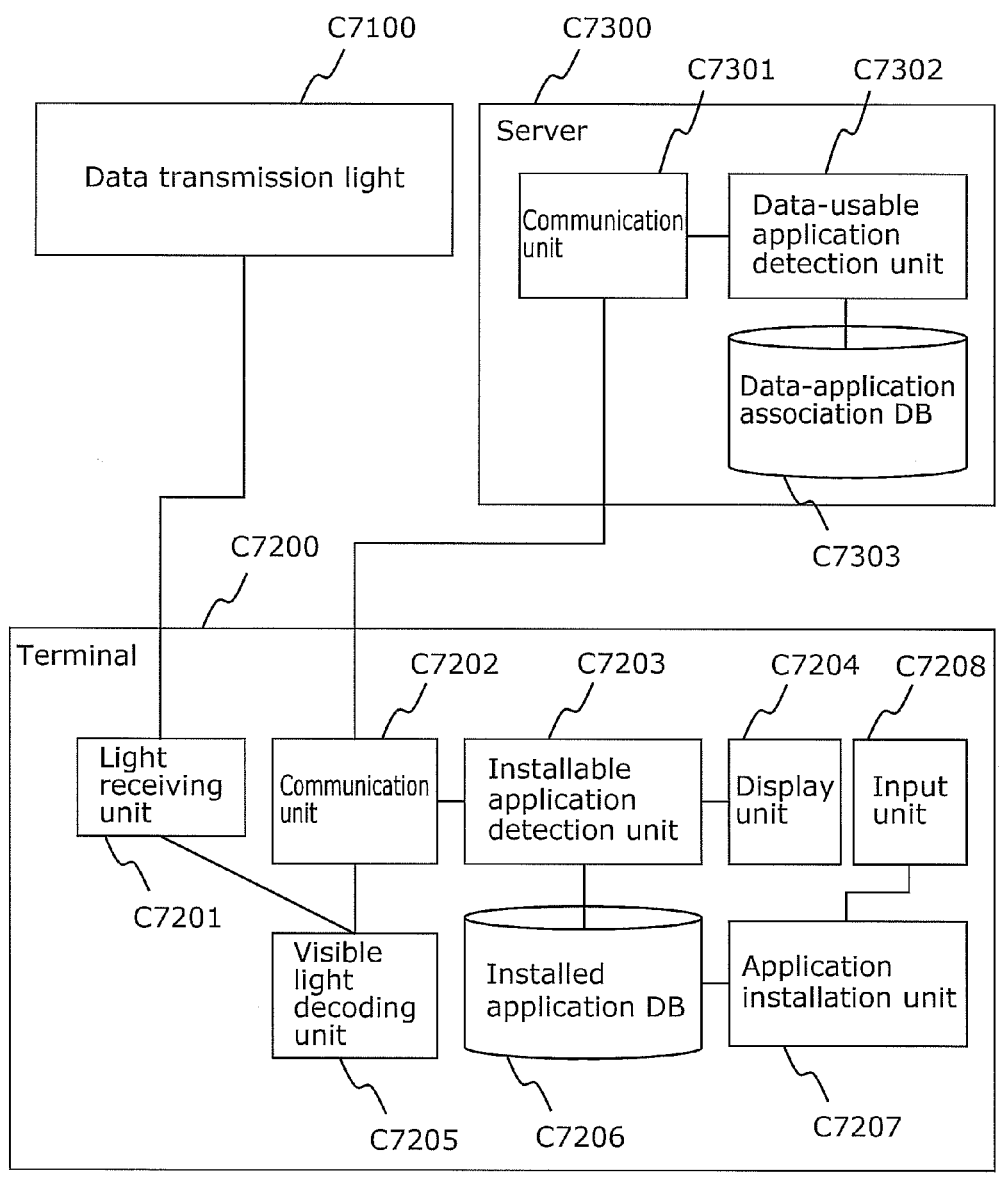
FIG. 36 illustrates a system configuration according to a variation of Embodiment 3.

FIG. 36 illustrates a system configuration according to this variation.

A data transmission light C7100 transmits data using light in the same manner as the data transmission light C0100 according to Embodiment 1. A terminal C7200 includes: a light receiving unit C7201 which shoots light emitted by the data transmission light C7100; a decoding unit C7205 which extracts data from the light received by the light receiving unit C7201 as decoded data; a communication unit C7202 which transmits decoded data extracted by the decoding unit C7205 to a server C7300, and receives from the server C7300 a list of applications for which the decoded data is usable (data-usable application list); an installable application detection unit C7203 which detects an application installable in the terminal C7200 from the data-usable application list received from the server C7300; an installed application DB_C7206 storing information on an application installed in the terminal C7200; a display unit C7204 which shows information to a user; an input unit C7208 which receives input from the user; and an application installation unit C7207 which installs an application designated by the user via the input unit C7208. The light receiving unit C7201 has a function of changing the shutter speed used when receiving light. In addition, the terminal C7200 may include a plurality of the light receiving units C7201.

The server C7300 includes: a communication unit C7301 which receives decoded data from the terminal C7200, and transmits a list of applications for which decoded data is usable; a data-usable application detection unit C7302 which detects an application for which decoded data received from the terminal C7200 is usable; and a data-application association DB_C7303 storing association between data transmitted by a data transmission light (decoded data) and an application for which the data is usable.

Figure 37:
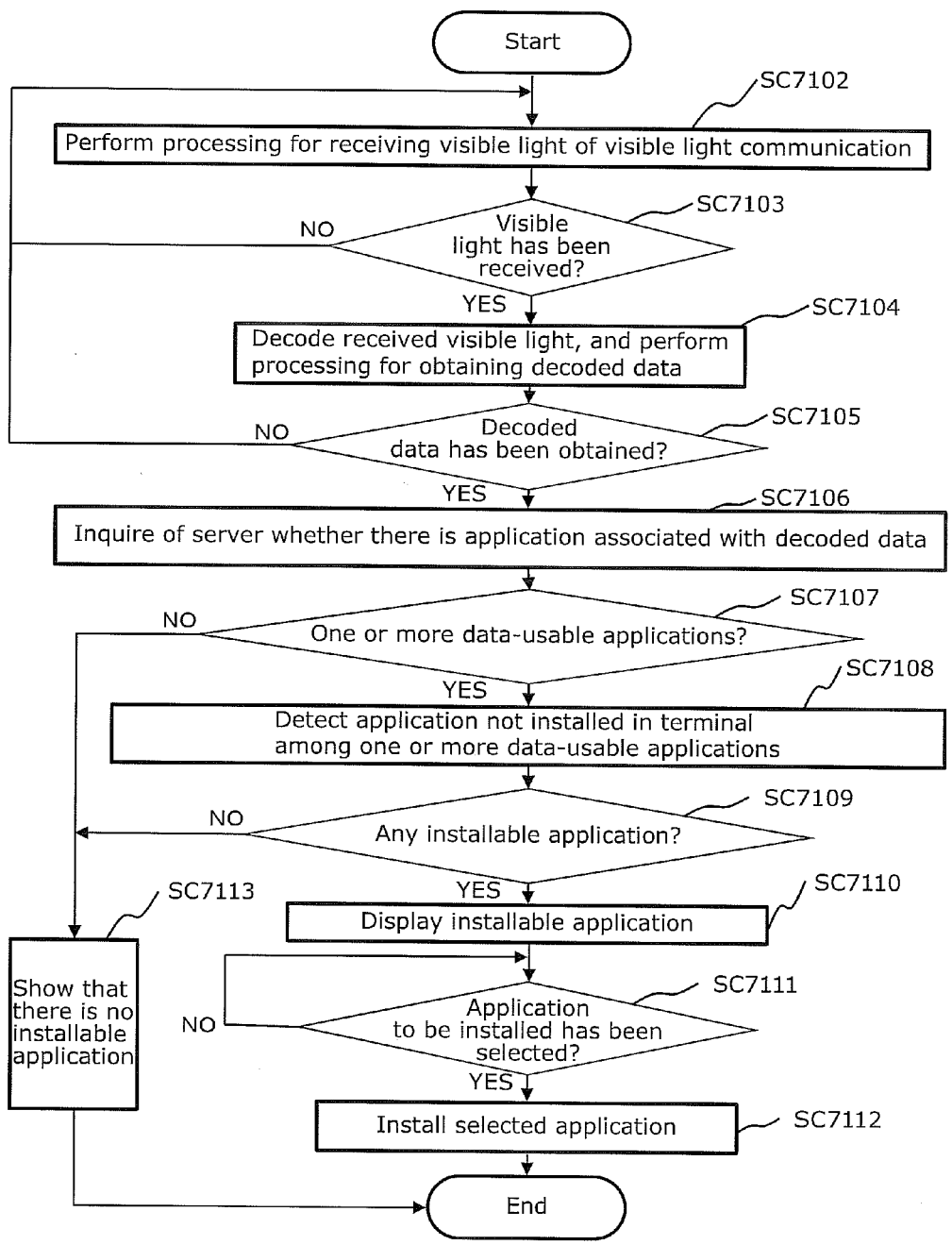
FIG. 37 is a flowchart illustrating processing operation by a terminal to receive visible light of visible light communication, and notify a user of a data-usable application, according to the variation of Embodiment 3.

FIG. 37 is a flowchart illustrating processing operation by the terminal C7200 to receive visible light of visible light communication, and notify a user of a data-usable application.

If a user aims the terminal C7200 at the data transmission light C7100, the terminal C7200 performs processing for receiving visible light of visible light communication emitted from the data transmission light C7100, using the light receiving unit C7201 (step SC7102). Next, the terminal C7200 determines whether visible light has been received (step SC7103). Here, if it is determined that light has been received, (YES in step SC7103), the terminal C7200 performs processing for obtaining decoded data illustrated in FIG. 30 from the light received by the light receiving unit C7201, using the decoding unit C7205 (step SC7104). Here, the terminal C7200 determines whether decoded data has been obtained (step SC7105).

If it is determined that decoded data has been obtained (YES in step SC7105), the terminal C7200 transmits the obtained decoded data to the server C7300 using the communication unit C7202, and inquires whether there is any application for which the obtained decoded data is usable (step SC7106). After that, the terminal C7200 receives a list of data-usable applications for which the obtained decoded data is usable (data-usable application list) from the server C7300 via the communication unit C7202.

FIG. 38 illustrates an example of a data-usable application list that is received.

As illustrated in FIG. 38, the data-usable application list includes decoded data C7501, and for each of data-usable applications associated with the decoded data, an application ID_C7502 for identifying the application and an application name C7503 which is a name of the application.

In step SC7107 illustrated in FIG. 37, the terminal C5200 determines, based on the data-usable application list received from the server C7300, whether there are one or more applications for which the decoded data obtained in step SC7104 is usable (step SC7107). Here, if it is determined that there are one or more such applications (YES in step SC7107), the terminal C7200 compares, using the installable application detection unit C7203, data-usable application IDs on the data-usable application list received from the server C7300 with application IDs on the installed application list stored in the installed application DB_C7206. Consequently, the terminal C7200 detects an application not installed in the terminal C7200 at that time and installable in the terminal C7200, from among the one or more applications shown by the data-usable application list (data-usable application) (step SC7108).

FIG. 39 illustrates an example of information (installed application list) stored in the installed application DB_C7206.

As illustrated in FIG. 39, the installed application list includes, for each of applications installed in the terminal C7200, an application ID_C7601 for identifying the application and a name C7602 of the application (application name).

In step SC7109 illustrated in FIG. 37, the terminal C7200 determines whether there are one or more installable applications (step SC7109). For example, the terminal C7200 determines that there are one or more installable applications (installable applications) if there is an application ID not included in the installed application list, among one or more application IDs shown by the data-usable application list. Then, if it is determined that there are one or more installable applications (YES in step SC7109), the terminal C7200 displays the one or more installable applications on the display unit C7204 in the form of a list (step SC7110).

Figure 40:
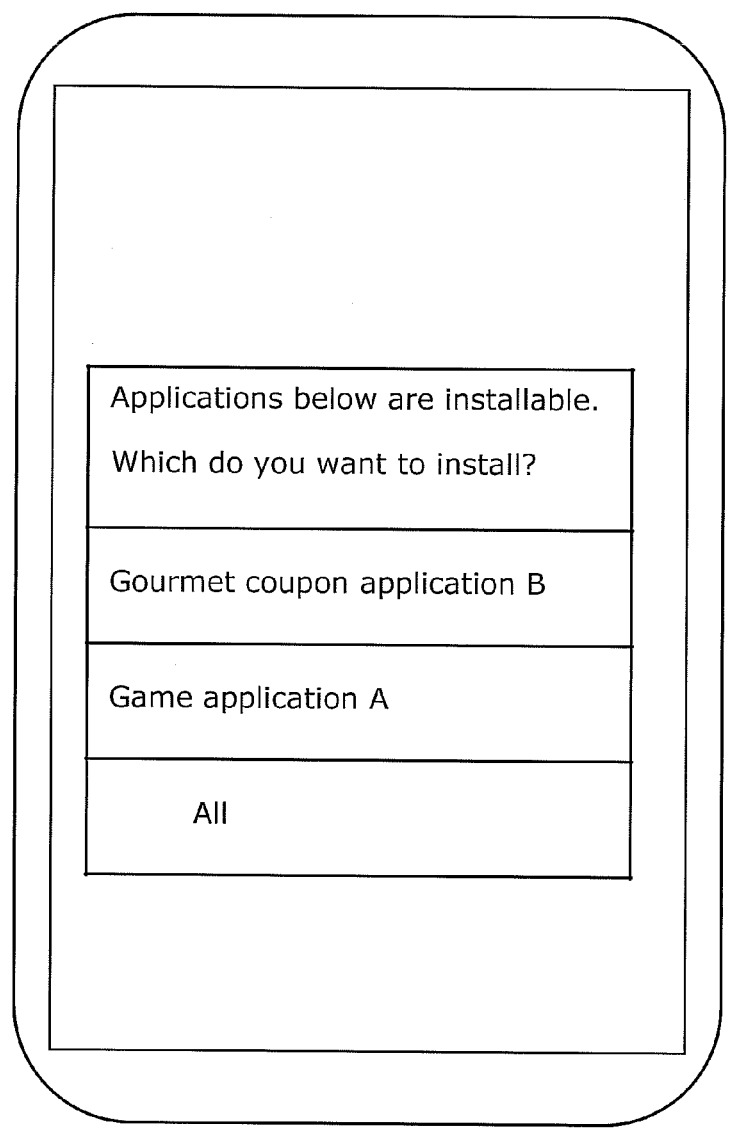
FIG. 40 illustrates an example of a list of installable applications displayed on a display unit according to the variation of Embodiment 3.

FIG. 40 illustrates an example of a list of installable applications displayed on the display unit C7204.

For example, as illustrated in FIG. 40, the display unit C7204 displays the names of applications which can be installed.

In step SC7111 illustrated in FIG. 37, the terminal C7200 determines whether the user has selected, using the input unit C7208, an application to be installed, from among one or more installable applications displayed on the display unit C7204 (step SC7111). Here, if the terminal C5200 determines that the user has selected such an application (YES in step SC7111), the terminal C7200 installs the application selected by the user, using the application installation unit C7207 (step SC7112).

It should be noted that if it is determined in step SC7107 that there is no application for which the decoded data obtained in step SC7104 is usable, or if it is determined in step SC7109 that there is no installable application, the terminal C7200 shows that there is no installable application, on the display unit C7204 (step SC7113).

The server C7300 performs processing operation similar to processing operation illustrated in FIG. 34, and generates a data-usable application list which includes the application names C7503 indicating the names of data-usable applications as illustrated in FIG. 38, and transmits the list to the terminal C7200.

FIG. 41 illustrates an example of information stored in the data-application association DB_C7303.

This information includes, for each of applications, an application ID_C7401 for identifying the application, an application name C7402 which is a name of the application, and at least one piece of decoded data C7403 which is usable for the application. The data-usable application detection unit C7302 of the server C7300 detects one or more applications for which received decoded data is usable, based on information stored in the data-application association DB_C7303, and generates a data-usable application list that is a list of the one or more detected applications, as illustrated in FIG. 38. In other words, the data-usable application detection unit C7302 searches information stored in the data-application association DB_C7303 for the received decoded data, and detects an application ID_C7401 and an application name C7402 associated with the decoded data. Then, the data-usable application detection unit C7302 generates a data-usable application list which includes the detected application ID_C7401 and the application name C7402.

It should be noted that the application ID_C7502 illustrated in FIG. 38, the application ID_C7601 illustrated in FIG. 39, and the application ID_C7401 illustrated in FIG. 41 may be package names of applications.

As described above, according to this variation, even if some application programs for which data obtained by visible light communication is usable are not installed in a terminal, an application program selected from among the application programs in response to a user operation is installed. Thus, as with Embodiment 3 above, an appropriate application program can be caused to process data obtained by visible light communication.

Embodiment 4

Light emission devices in a city such as streetlights, electric signs, signage, and car lights emit light as visible light transmission devices, thereby each transmitting a different visible light ID. In such a case, there is a problem that it is not possible to obtain with ease a visible light ID only from a visible light transmission device from which a user intends to obtain an ID. This problem arises since, in order to receive light indicating a visible light ID, there is no method for obtaining, using a camera included in a mobile terminal such as a smartphone or a tablet terminal, a visible light ID of an only limited visible light transmission device from which a user intends to obtain an ID from among plural visible light transmission devices captured by the camera. In addition, also in the case where devices that can emit light such as home electric appliances and lighting devices in a room are achieved as visible light transmission devices, it may be necessary to obtain a visible light ID only from a specific visible light transmission device, and thus a similar problem arises.

In view of this, in the present embodiment, association between a gesture operation of a user toward a mobile terminal and a visible light transmission device from which a visible light ID is obtained is previously defined. In this manner, if a gesture operation by a user toward a mobile terminal is detected when receiving a visible light ID, a visible light transmission device from which a visible light ID is to be obtained can be limited to a visible light transmission device according to the intention of a user, by referring to the defined association.

In addition, a visible light transmission device from which a visible light ID is to be obtained can be automatically limited, and which one of plural cameras included in the mobile terminal is to be used can be determined by detecting the orientation of the casing of a mobile terminal other than by an explicit operation of a user such as a gesture operation, and thus implicit intention of the user can also be understood.

The following describes in detail an information communication method according to the present embodiment, or in other words, a method for selecting a visible light ID in response to a gesture operation toward a mobile terminal B0101.

Figure 42:
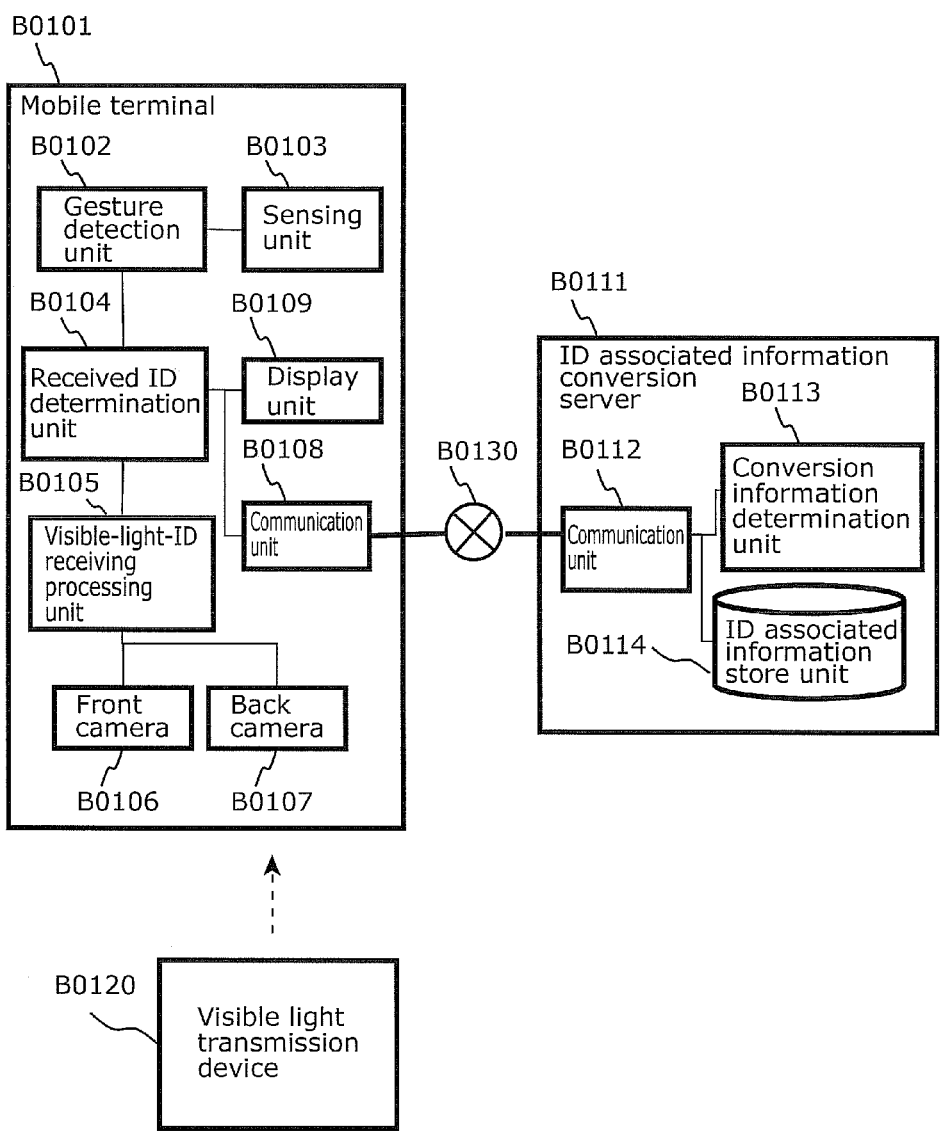
FIG. 42 illustrates a system configuration according to Embodiment 4.

FIG. 42 illustrates a system configuration according to the present embodiment.

In the system illustrated in FIG. 42, a front camera B0106 or a back camera B0107 included in the mobile terminal B0101 receive visible light emitted by a visible light transmission device B0120, and a visible-light-ID receiving processing unit B0105 converts the visible light into a visible light ID. It should be noted that a visible light ID is an identifier for identifying detailed information associated with the visible light ID.

On the other hand, in order to select a visible light ID, a gesture operation by the user toward the mobile terminal B0101 is used. Sensing data obtained by a sensing unit B0103 included in the mobile terminal B0101 is used in order to obtain a gesture operation. It should be noted that the sensing unit B0103 includes a 9-axis sensor and others. Sensing data obtained by the sensing unit B0103 is accumulated for a fixed time period or at fixed times, and thereafter a gesture detection unit B0102 detects (determines) a gesture operation based on the stored sensing data. A detailed description is given of processing by the gesture detection unit B0102 to detect a user gesture operation, using FIG. 46 described below.

A received ID determination unit B0104 determines, based on a user gesture operation detected (determined) by the gesture detection unit B0102, whether detailed information associated with a visible light ID obtained by conversion by the visible-light-ID receiving processing unit B0105 is information that a user desires to know at present. If the determination shows that the detailed information associated with a visible light ID is necessary, the received ID determination unit B0104 transmits an information obtaining request for obtaining information associated with a visible light ID to a communication unit B0108. In this manner, the communication unit B0108 transmits an information obtaining request that includes a visible light ID to an ID associated information conversion server B0111, via a public network B0130 and obtains visible light ID associated information (for example, URL) for detailed information from the ID associated information conversion server B0111.

On the other hand, if the detailed information associated with a visible light ID is unnecessary, or if the communication unit B0108 completes obtaining the visible light ID associated information from the ID associated information conversion server B0111, the received ID determination unit B0104 requests a display unit B0109 for display according to such cases.

A communication unit B0112 of the ID associated information conversion server B0111 receives an information obtaining request that includes a visible light ID from the communication unit B0108 of the mobile terminal B0101. In this case, a conversion information determination unit B0113 obtains visible light ID associated information associated with a visible light ID thereof from an ID associated information store unit B0114. The conversion information determination unit B0113 delivers the obtained visible light ID associated information to the communication unit B0112. As a result, the communication unit B0112 transmits visible light ID associated information to the mobile terminal B0101 via the public network B0130.

Figure 43:
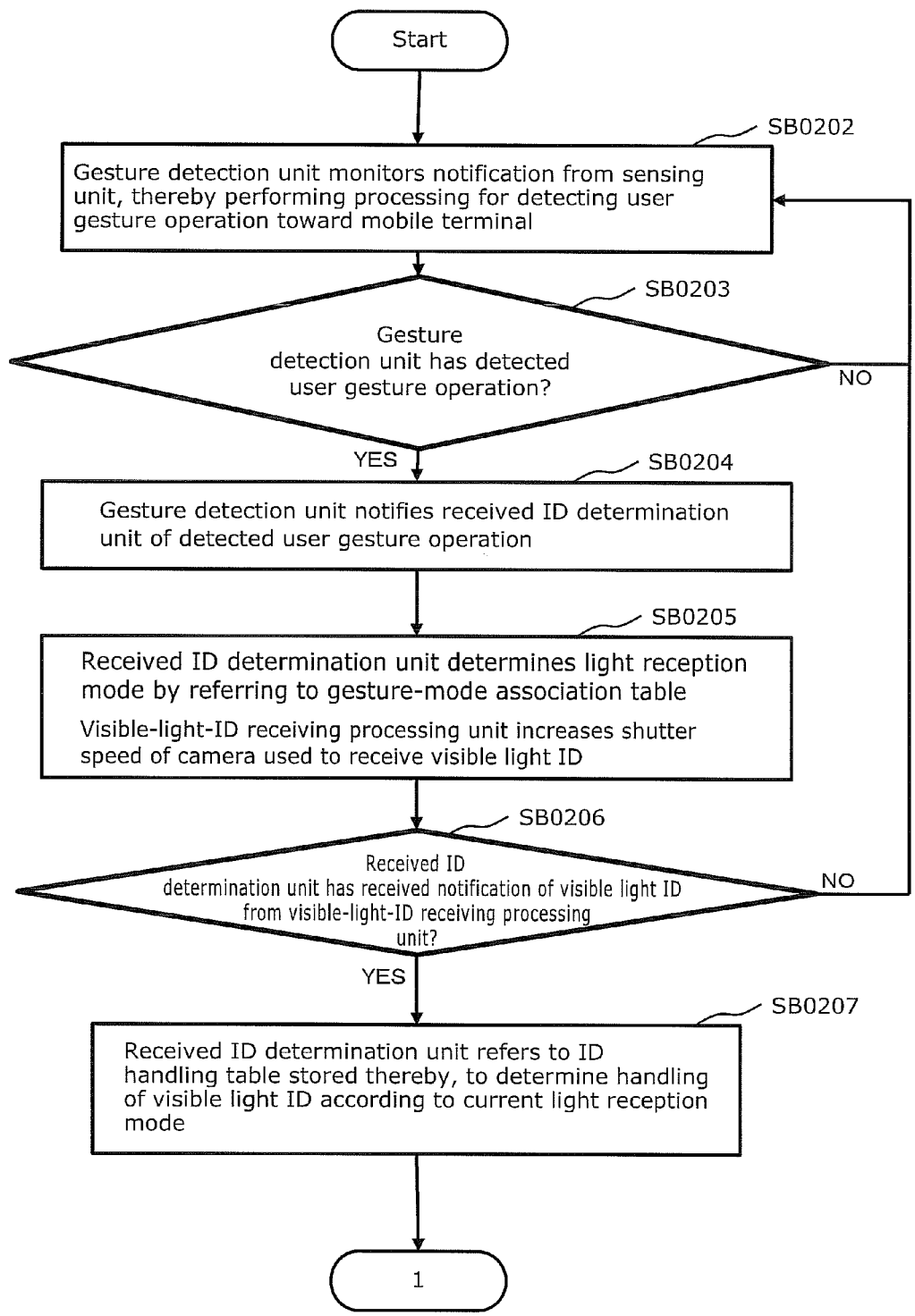
FIG. 43 is a flowchart illustrating processing operation by a mobile terminal according to Embodiment 4.

FIG. 43 is a flowchart illustrating processing operation by the mobile terminal B0101, and in particular, a flowchart illustrating processing operation for detecting a user gesture operation and selecting a visible light ID of received light.

Upon a start of processing for the mobile terminal B0101 to receive a visible light ID, the gesture detection unit B0102 monitors notification of sensing data from the sensing unit B0103, thereby performing processing for detecting a gesture operation of the user toward the mobile terminal B0101 (step SB0202). Next, the gesture detection unit B0102 determines whether a user gesture operation has been detected (step SB0203). If it is determined that such an operation has been detected (YES in step SB0203), processing of step SB0204 is performed, whereas if it is determined that such an operation has not been detected (NO in step SB0203), processing of step SB0202 is performed repeatedly. A detailed description is given of operation of the gesture detection unit B0102 using FIG. 46 described below.

Next, in step SB0204, the gesture detection unit B0102 notifies the received ID determination unit B0104 of the detected user gesture operation (step SB0204). Next, the received ID determination unit B0104 determines a light reception mode with reference to a gesture-mode association table stored thereby, which is illustrated in FIG. 49 later described. The visible-light-ID receiving processing unit B0105 increases the shutter speed of a camera (front camera B0106 or back camera B0107) which receives light indicating a visible light ID (step SB0205).

The received ID determination unit B0104 determines whether notification of a visible light ID has been received from the visible-light-ID receiving processing unit B0105 (step SB0206). If it is determined that a notification has been received (YES in step SB0206), processing of step SB0207 is performed, whereas if it is determined that a notification has not been received (NO in step SB0206), processing of step SB0202 is performed repeatedly. In step SB0207, in order to determine handling of a visible light ID according to a light reception mode determined in step SB0205, the received ID determination unit B0104 refers to an ID handling table stored thereby and illustrated in FIG. 50 later described (step SB0207). In other words, the received ID determination unit B0104 determines, for each of notified visible light IDs, whether the visible light ID is a visible light ID for which detailed information is required, or is a visible light ID for which detailed information is not required.

Figure 44:
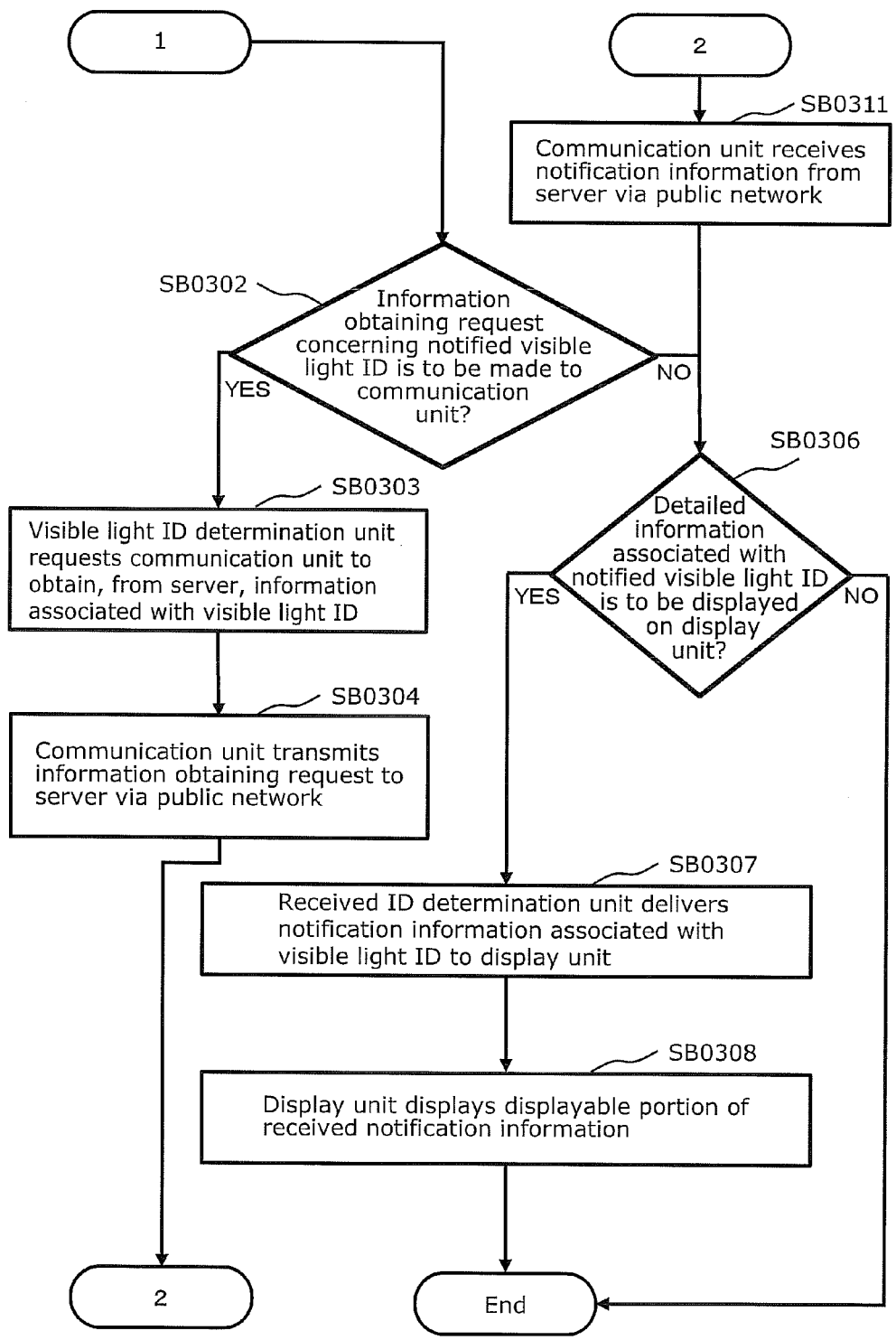
FIG. 44 is a flowchart illustrating display processing operation of a mobile terminal.

FIG. 44 is a flowchart illustrating processing operation of the mobile terminal B0101, and in particular a flowchart illustrating processing operation for display.

After step SB0207 illustrated in FIG. 43, based on the result of the above determination, the received ID determination unit B0104 determines, for each of the notified visible light IDs, whether to request the communication unit B0108 for an information obtaining request corresponding to the visible light ID (step SB0302). Here, processing of step SB0303 is performed if it is determined that such a request is to be made (YES in step SB0302), whereas processing of step SB0306 is performed if it is determined that such a request is not to be made (NO in step SB0302). In step SB0303, the received ID determination unit B0104 requests the communication unit B0108 to obtain, from the ID associated information conversion server B0111, visible light ID associated information corresponding to the visible light ID (step SB0303). The communication unit B0108 makes an information obtaining request to the ID associated information conversion server B0111 via the public network B0130 (step SB0304). In other words, the communication unit B0108 transmits, to the ID associated information conversion server B0111, a command for requesting to transmit visible light ID associated information associated with a visible light ID to the communication unit B0108 (information obtaining request that includes a visible light ID).

Next, if notification information in response to the information obtaining request is transmitted from the ID associated information conversion server B0111, the communication unit B0108 receives notification information from the ID associated information conversion server B0111 via the public network B0130 (step SB0311).

Then, after step SB0311 or if it is determined in step SB0302 that a request is not to be made (NO in step SB0302), the received ID determination unit B0104 determines, for each of notified visible light IDs, whether detailed information associated with the visible light ID is to be displayed on the display unit B0109 (step SB0306). For example, if a visible light ID is determined to be a visible light ID for which detailed information is necessary, the received ID determination unit B0104 determines that detailed information associated with the visible light ID is to be displayed on the display unit B0109. In contrast, the received ID determination unit B0104 determines that detailed information associated with the visible light ID is not to be displayed on the display unit B0109 when the visible light ID is determined to be a visible light ID for which detailed information is not necessary. In addition, the received ID determination unit B0104 determines that detailed information associated with the visible light ID is to be displayed on the display unit B010 if notification information corresponding to the visible light ID is received in step S803111.

Here, processing of step SB0307 is performed if it is determined that detailed information corresponding to the visible light ID is to be displayed on the display unit B0109 (YES in step SB0306), whereas if it is determined that such information is not to be displayed (NO in step SB0306), the mobile terminal B0101 terminates processing of displaying detailed information associated with the visible light ID.

In step SB0307, the received ID determination unit B0104 delivers notification information corresponding to a visible light ID to the display unit B0109 (step SB0307). Then, the display unit B0109 displays detailed information (visible light ID associated information) which can be displayed in correspondence with the visible light ID, based on the received notification information, and terminates the processing. Specifically, if notification information includes visible light ID associated information and the visible light ID associated information is a uniform resource locator (URL), the mobile terminal B0101 obtains detailed information from the location indicated by the URL, and displays the detailed information on the display unit B0109.

Figure 45:
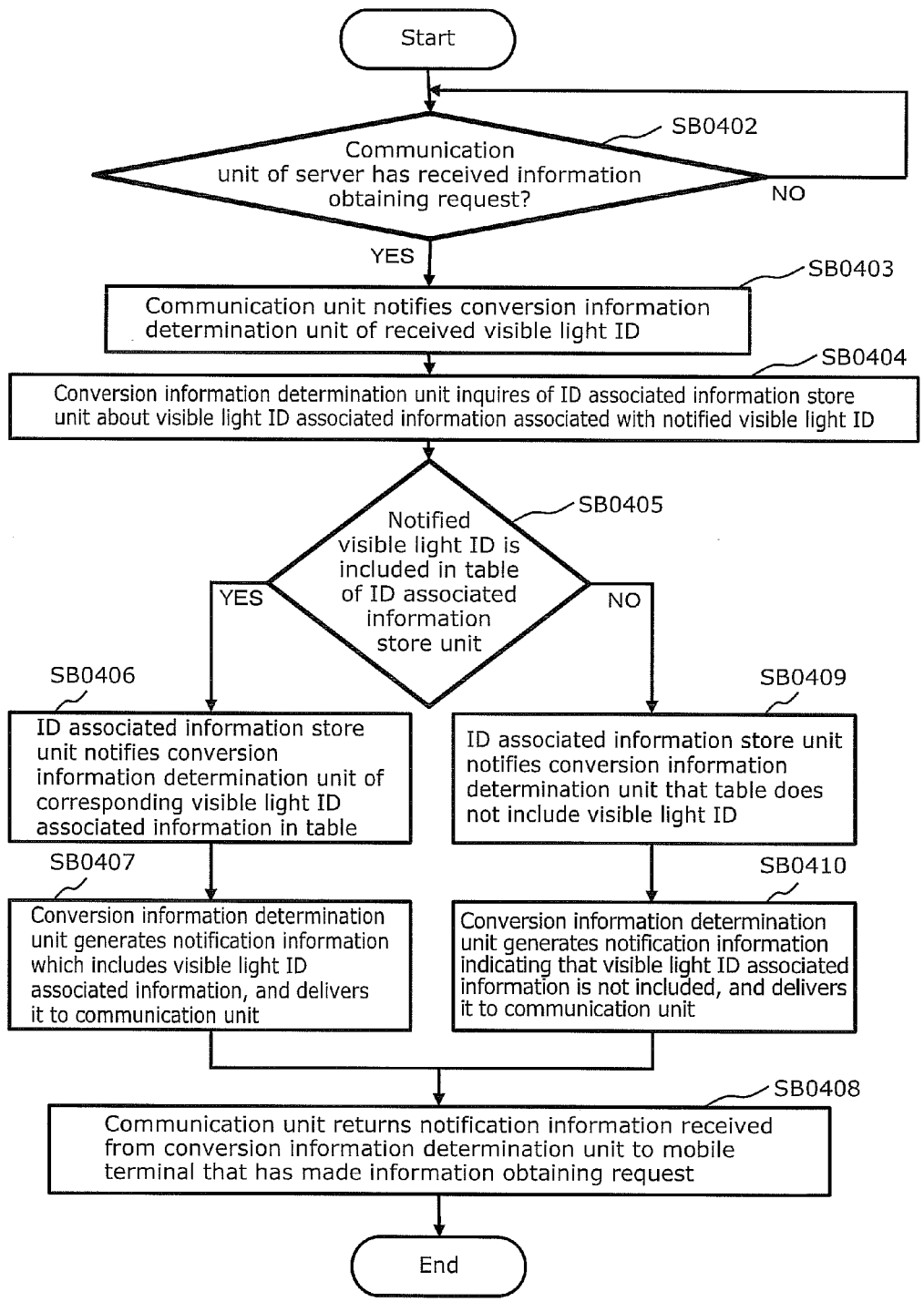
FIG. 45 is a flowchart illustrating processing operation of an ID associated information conversion server performed when receiving an information obtaining request from a mobile terminal according to Embodiment 4.

FIG. 45 is a flowchart illustrating processing operation of the ID associated information conversion server B0111 performed when receiving an information obtaining request from the mobile terminal B0101.

The communication unit B0112 of the ID associated information conversion server B0111 determines whether an information obtaining request has been received from the mobile terminal B0101 (step SB0402). Here, if it is determined that the request has been received (YES in step SB0402), processing of step SB0403 is performed, whereas if it is determined that the request has not been received (NO in step SB0402), processing of step SB0402 is performed repeatedly.

In step SB0403, the communication unit B0112 notifies the conversion information determination unit B0113 of the visible light ID included in the received information obtaining request (step SB0403). Next, the conversion information determination unit B0113 inquires of the ID associated information store unit B0114 about the visible light ID associated information associated with the notified visible light ID (step SB0404). Here, the ID associated information store unit B0114 determines whether the notified visible light ID is included in an ID associated information table stored therein (step SB0405). Here, if it is determined that a visible light ID is included in the table (YES in step SB0405), processing of step SB0406 is performed, whereas if it is determined that a visible light ID is not included in the table (NO in step SB0405), processing of step SB0409 is performed.

In step SB0406, the ID associated information store unit B0114 notifies the conversion information determination unit B0113 of visible light ID associated information associated with the visible light ID, obtained from the ID associated information table illustrated in FIG. 51 later described (step SB0406). Next, the conversion information determination unit B0113 generates notification information which includes the visible light ID associated information, and delivers the information to the communication unit B0112 (step SB0407).

In step SB0409, the ID associated information store unit B0114 notifies the conversion information determination unit B0113 that the ID associated information table illustrated FIG. 51 described later does not include the visible light ID (step SB0409). Next, the conversion information determination unit B0113 generates notification information indicating that visible light ID associated information of the ID is not included, and delivers the notification information to the communication unit B0112 (step SB0410).

After step SB0407 or SB0410, the communication unit B0112 returns the notification information received from the conversion information determination unit B0113 to the mobile terminal B0101 that has made an information obtaining request (step SB0408).

Figure 46:
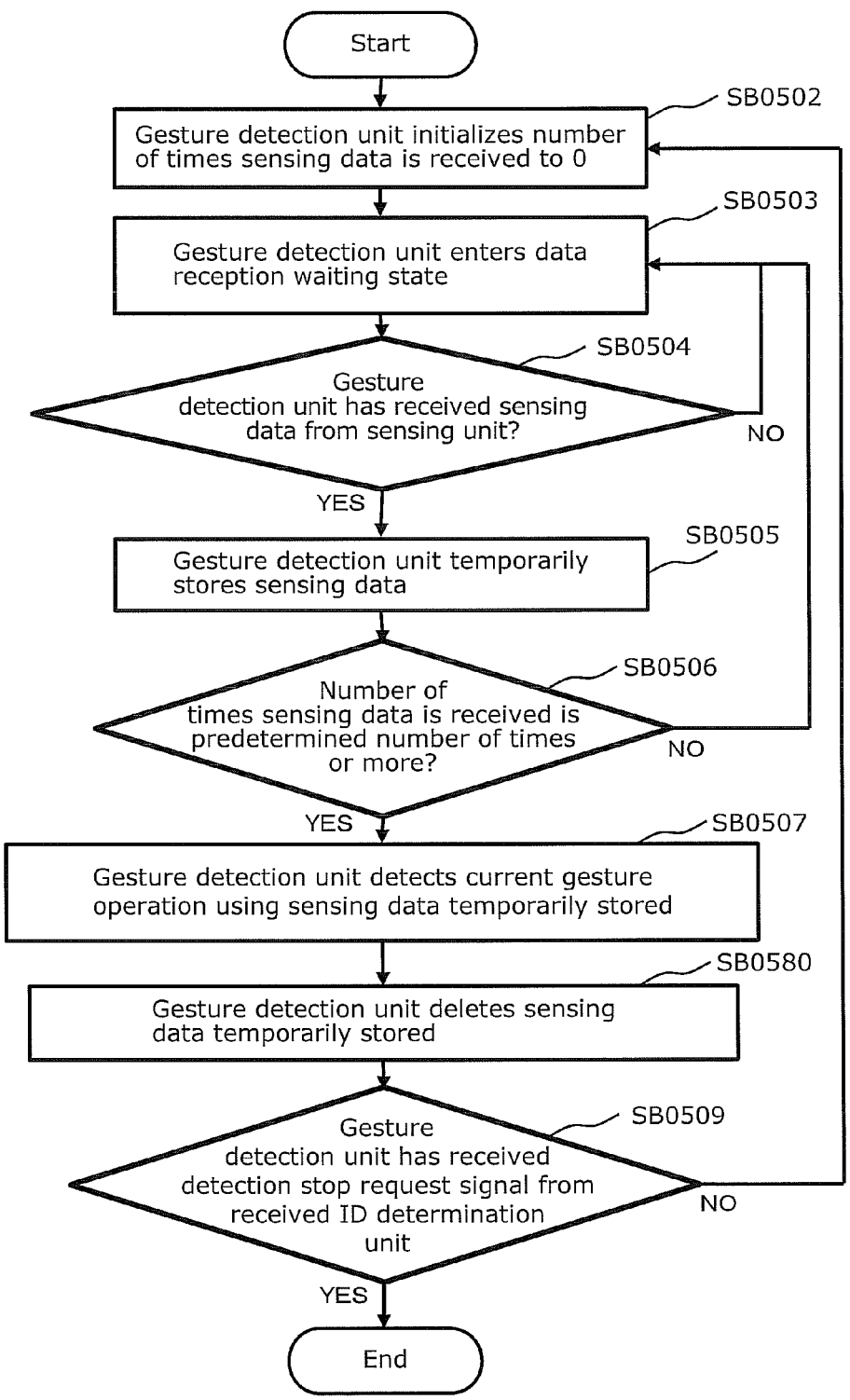
FIG. 46 is a flowchart illustrating processing operation by a mobile terminal to detect a user gesture operation according to Embodiment 4.

FIG. 46 is a flowchart illustrating processing operation by the mobile terminal B0101 to detect a user gesture operation. The gesture operation detected by this processing operation is a gesture made when a user manipulates the mobile terminal B0101, and used in order to determine a visible light ID obtained through light reception by the mobile terminal B0101.

Upon the start of the gesture detection unit B0102 detecting a gesture operation of the user, the gesture detection unit B0102 initializes the number of times sensing data is received to 0 (step SB0502). Then, the gesture detection unit B0102 enters a state of awaiting sensing data from the sensing unit B0103 (data reception waiting state) (step SB0503). Next, the gesture detection unit B0102 determines whether sensing data has been received from the sensing unit B0103 (step SB0504). Here, if it is determined that such data has been received (YES in step SB0504), processing of step SB0505 is performed, whereas if it is determined that such data has not been received (NO in step SB0504), processing of step SB0503 is performed repeatedly.

In step SB0505, the gesture detection unit B0102 temporarily holds sensing data, and also adds 1 to the number of times sensing data is received (step SB0505). Then, the gesture detection unit B0102 determines whether the number of times sensing data is received is a predetermined number of times or more (step SB0506). It should be noted that in step SB0502, the gesture detection unit B0102 may initialize a sensing-data reception elapsed time that is a time elapsed since the start of awaiting sensing data to 0, instead of initializing the number of times sensing data is received to 0. In this case, in step SB0506, the gesture detection unit B0102 determines whether a sensing-data reception elapsed time is longer than or equal to a predetermined time. If it is determined that the number of times sensing data is received is a predetermined number of times or more, or if it is determined that a sensing data reception elapsed time is longer than or equal to a predetermined time (YES in step SB0506), processing of step SB0507 is performed, whereas if it is determined that the number of times sensing data is received is less than a prescribed number of times, or if it is determined that a sensing-data reception elapsed time is less than a predetermined time (NO in step SB0506), processing of step SB0503 is performed repeatedly.

Next, the gesture detection unit B0102 detects a current gesture operation using at least one piece of sensing data temporarily stored (step SB0507). At this time, the gesture detection unit B0102 stores that detected gesture operation as a current gesture operation. Then, the gesture detection unit B0102 deletes at least one piece of sensing data temporarily stored (step SB0508).

Here, the gesture detection unit B0102 determines whether a signal indicating a request for stopping the detection of a gesture operation (detection stop request signal) has been received from the received ID determination unit B0104 (step SB0509). Here, if it is determined that such a signal has been received (YES in step SB0509), the gesture detection unit B0102 terminates processing operation for detecting a gesture operation. On the other hand, if it is determined that such a signal has not been received (NO in step SB0509), the gesture detection unit B0102 repeatedly executes processing from step SB0502. It should be noted that regarding processing operation for detecting a gesture operation illustrated in FIG. 46, the elapse of a fixed time period or interrupt processing performed by the sensing unit B0103 triggers the start of processing from step SB0502, again.

Figure 47:
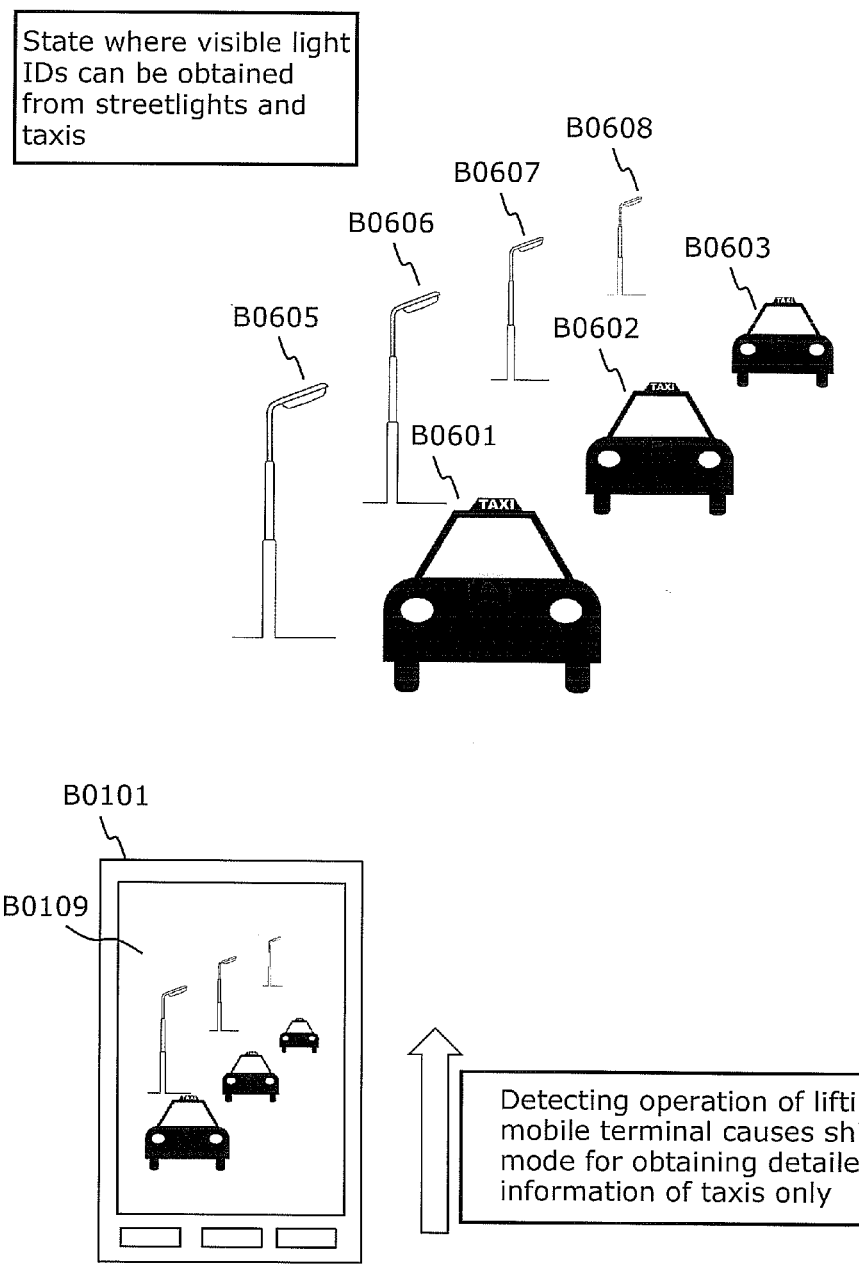
FIG. 47 is a diagram for describing operation of selecting a visible light ID by a mobile terminal B0101 in response to a gesture operation according to Embodiment 4.

FIG. 47 is a diagram for describing operation of selecting a visible light ID by the mobile terminal B0101 in response to a gesture operation.

For example, streetlights B0605 to B0608 and taxis B0601 to B0603 each have the visible light transmission device B0120 and emit visible light, thereby transmitting a visible light ID. Here, a terminal which includes a general conventional camera obtains pieces of detailed information corresponding to visible light IDs of all the visible light transmission devices that are in a direction in which camera shooting is performed. However, according to the present embodiment, the mobile terminal B0101 limits detailed information to be obtained only to pieces of detailed information of the taxis B0601 to B0603 by using a combination of intention of a user that he/she desires to obtain only detailed information of the taxis B0601 to B0603 and a gesture operation of a user moving the mobile terminal B0101 upward (in the arrow direction in FIG. 47), for example.

This can limit obtaining detailed information unnecessary for a user. In other words, detailed information (visible light ID associated information) displayed on the display unit B0109 can be selected, which achieves effects such as an improvement in the viewability of a user interface and limitation of obtaining visible light ID associated information via a network. It should be noted that cameras (the front camera B0106 and the back camera B0107) perform processing of changing the shutter speed to a high speed when receiving a visible light ID.

Figure 48:
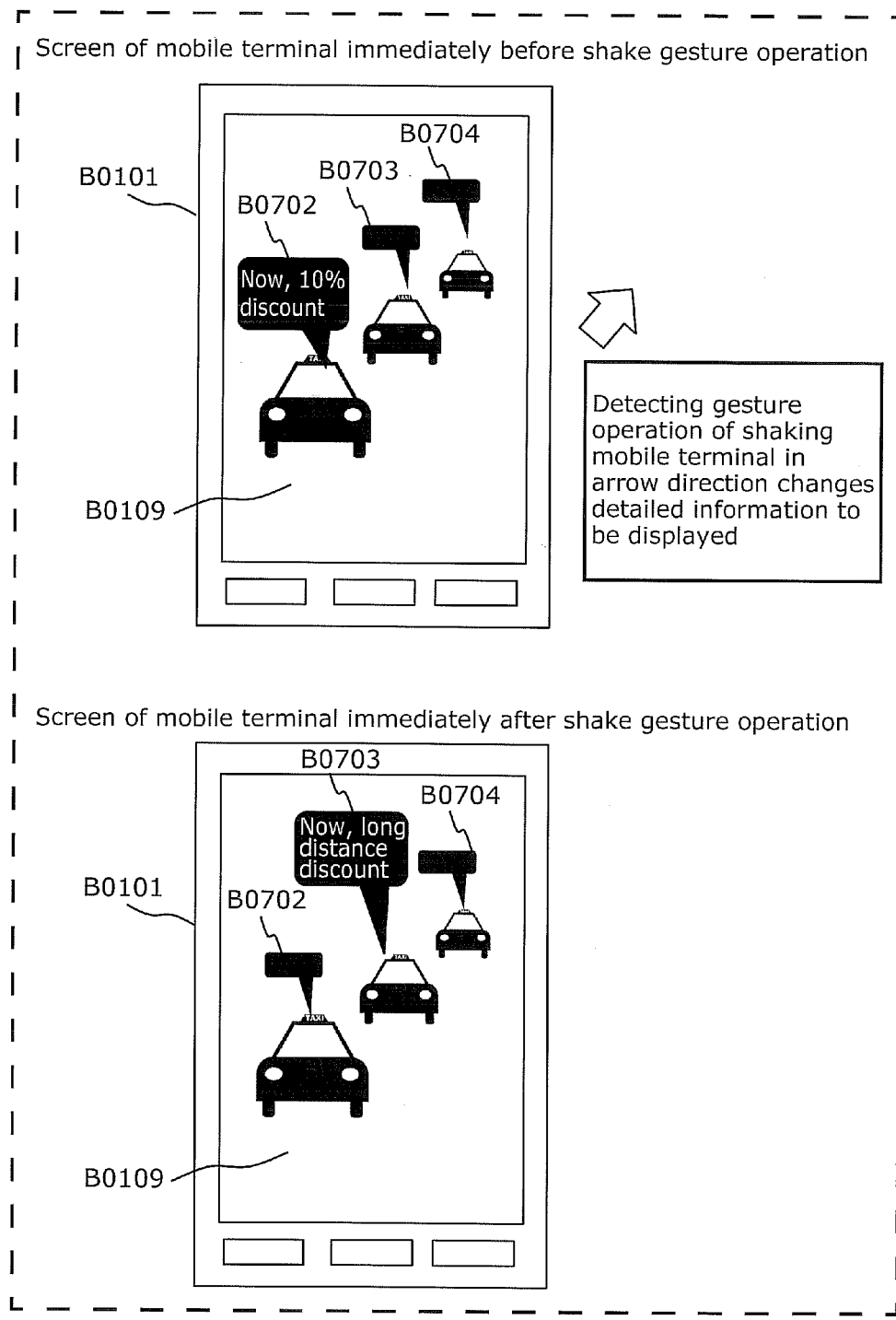
FIG. 48 illustrates an example of processing operation of selecting detailed information displayed in response to a gesture operation according to Embodiment 4.

FIG. 48 illustrates an example of processing operation of selecting detailed information displayed in response to a gesture operation.

The mobile terminal B0101 obtains detailed information of only the taxis B0601 to B0603 if the mobile terminal B0101 detects a gesture operation of moving the mobile terminal B0101 upward, as described above. Then, the mobile terminal B0101 displays a captured image shot by a camera (the front camera B0106, the back camera B0107). At this time, the mobile terminal B0101 superimposes balloon images (information-presentable notification images) B0702 to B0704 showing that detailed information is obtained, on the captured image to be displayed, in a state where the balloon images are respectively associated with the images of the taxis B0601 to B0603. Furthermore, the mobile terminal B0101 displays detailed information of only one of the taxis using a balloon image of the taxi, among the detailed information of the taxis B0601 to B0603. For example, detailed information of the taxi B0601, that is, "Now, 10% discount" is displayed in the balloon image B0702. A balloon image that includes such detailed information is an image generated according to a visible light ID from a taxi which is a subject, and an information notification image showing details regarding the taxi. In addition, the above-described information-presentable notification image (balloon image which does not include detailed information) is an image for notifying that detailed information can be shown.

Here, if a user shakes the mobile terminal B0101 in the upper right direction (arrow direction in FIG. 48), the gesture detection unit B0102 of the mobile terminal B0101 detects a gesture operation of shaking in the upper right direction. As a result, the mobile terminal B0101 hides detailed information displayed in the balloon image B0702. Furthermore, at this time, the mobile terminal B0101 displays detailed information of the taxi B0602 associated with the balloon image B0703, that is, "Now, long distance discount" in the balloon image B0703 closest to the balloon image B0702 in the upper right direction on the captured image.

As described above, in the present embodiment, a user can easily change detailed information to be displayed by a gesture operation of shaking the mobile terminal B0101.

FIG. 49 illustrates an example of a gesture-mode association table stored by the received ID determination unit B0104.

A gesture-mode association table shows, for each gesture operation, a gesture operation B0801 and a light reception mode B0802 associated with the gesture operation. For example, a light reception mode "taxi" for displaying detailed information of a taxi is associated with a gesture operation "hold up" that is an operation of holding up a mobile terminal in front of a user (or operation of raising a mobile terminal upwards). In addition, a light reception mode "cancel" for canceling a light reception mode currently set is associated with a shake which is an operation of laterally shaking a mobile terminal.

FIG. 50 illustrates an example of an ID handling table stored by the received ID determination unit B0104.

This ID handling table includes, for each light reception mode, a light reception mode B0901, a first group ID_B0902 for identifying the light reception mode, a name B0903 of a visible light transmission device which transmits a visible light ID that is a candidate in the light reception mode, a second group ID_B0904 for identifying the visible light transmission device, information B0905 indicating whether detailed information based on the visible light transmission device is to be displayed on the display unit B0109, and information B0906 indicating whether detailed information of the light reception mode is to be obtained from the ID associated information conversion server B0111. For example, the first group ID "TAXIAA1" and the names of visible light transmission devices, namely, a "roof lamp" and a "headlight" are associated with a light reception mode (taxi) for displaying detailed information of a taxi. In addition, the name "roof lamp" of a visible light transmission device is associated with the second group ID "XX001", "necessary" indicating that detailed information based on the roof lamp is to be displayed on the display unit B0109, and "necessary" indicating that detailed information thereof is to be obtained from the ID associated information conversion server B0111.

FIG. 51 illustrates an example of an ID associated information table stored by the ID associated information store unit B0114.

This ID associated information table includes, for each visible light ID, a visible light ID_B1001 thereof, and visible light ID associated information B1002 associated with the visible light ID. As illustrated in the ID associated information table, a visible light ID includes three alphanumeric strings connected with hyphens (-). The first alphanumeric string of the alphanumeric strings corresponds to the first group ID_B0902 illustrated in FIG. 50, the middle alphanumeric string corresponds to a second group ID_B0904 illustrated in FIG. 50, and the last alphanumeric string is an ID for identifying visible light ID associated information. Visible light ID associated information is indicated by URL or the like, for example. If the visible light ID associated information included in notification information is URL, the mobile terminal B0101 obtains detailed information from the location indicated by the URL. In addition, among the visible light IDs_B1001 included in the ID associated information table illustrated in FIG. 51, "TAXIAA1-XX001-0001", "TAXIAA1-XX001-0002", "TAXIAA1-XX001-0003", and "TAXIAA1-XX001-0004" are visible light IDs transmitted by visible light from roof lamps of taxis. In addition, among the visible light IDs_B1001 included in the ID associated information table illustrated in FIG. 51, "TAXIAA1-HR001-0001" and "TAXIAA1-HR001-0002" are visible light IDs transmitted by visible light from headlights of taxis.

It should be noted that although a light reception mode is determined by a user gesture operation in the above embodiment, other factors may determine a light reception mode. For example, the orientation of the mobile terminal B0101 may determine a light reception mode.

Figure 52:
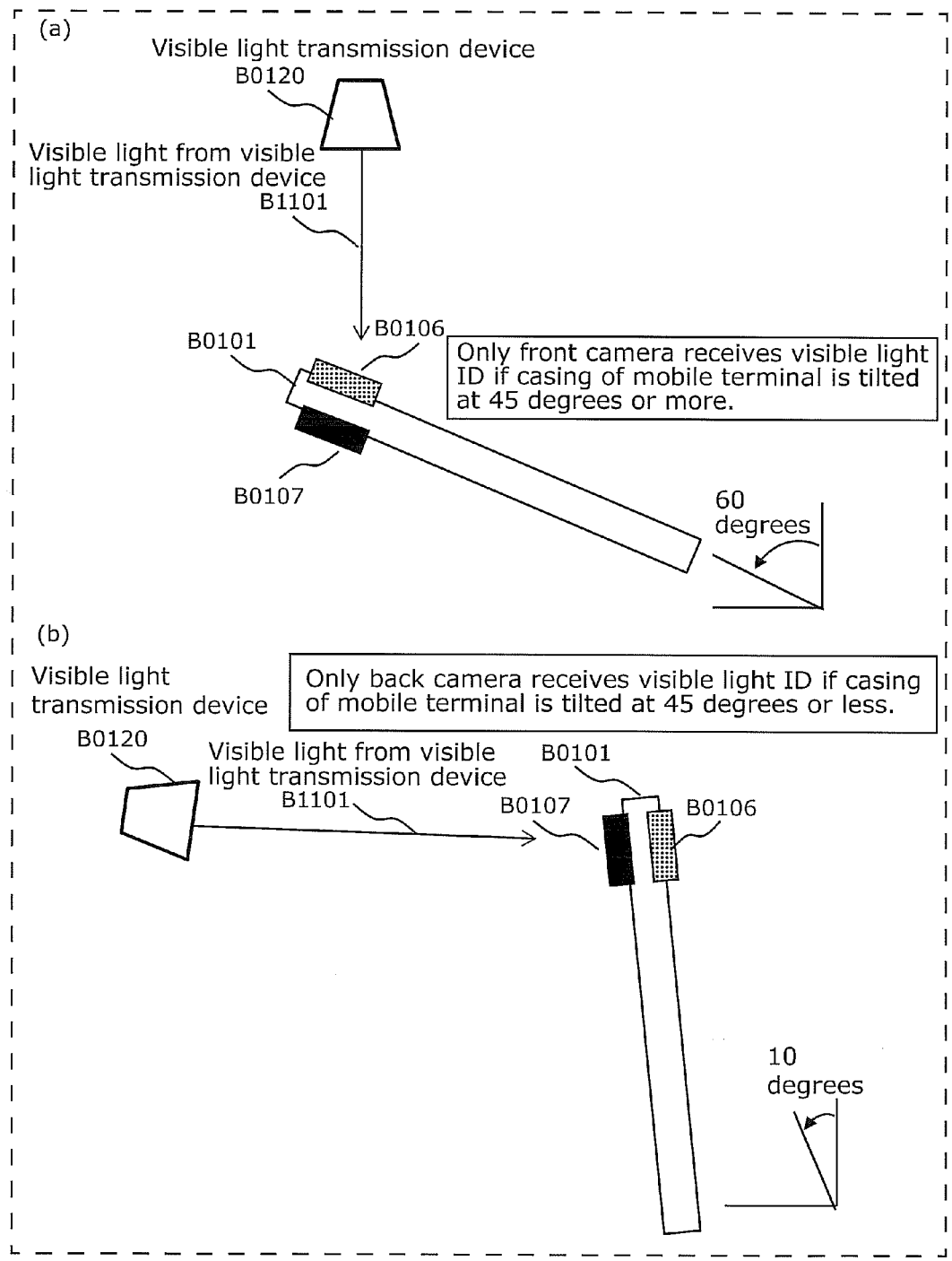
FIG. 52 is a diagram for describing processing of determining a light reception mode by the orientation of a mobile terminal according to Embodiment 4.

FIG. 52 is a diagram for describing processing of determining a light reception mode by the orientation of the mobile terminal B0101.

The sensing unit B0103 of the mobile terminal B0101 detects the orientation of a casing of the mobile terminal B0101. The mobile terminal B0101 determines, based on the detection result, one of the front camera B0106 and the back camera B0107 to be a camera which receives visible light B1101 from the visible light transmission device B0120. In this manner, only one of the front camera B0106 and the back camera B0107 receives the visible light B1101. Consequently, from among visible light IDs obtained by the front camera B0106 and the back camera B0107, a visible light ID corresponding to detailed information necessary for a user can be easily selected according to the orientation of the mobile terminal B0101. Furthermore, induction of the fraudulent action by reflected light and the like can be reduced, and power consumption can also be reduced.

For example, as illustrated in (a) of FIG. 52, the mobile terminal B0101 activates only the front camera B0106 if a state is detected where the casing is tilted at 45 degrees or more (for example, 60 degrees) relative to the vertical direction with the front side facing upwards, as the orientation of the casing of the mobile terminal B0101. On the other hand, as illustrated in (b) of FIG. 52, the mobile terminal B0101 activates only the back camera B0107 if a state is detected where the casing is tilted at 45 degrees or less (for example, 10 degrees) relative to the vertical direction with the front side facing a user, as the orientation of the casing of the mobile terminal B0101.

It should be noted that in the present embodiment, a description is given of the case where only detailed information corresponding to a visible light ID transmitted by a taxi emitting visible light is obtained. However, also in addition to such detailed information, detailed information corresponding to only a visible light ID transmitted by store signboards and signage in a town emitting visible light may be obtained, and detailed information corresponding to only a visible light ID transmitted by home electric appliances (for example, a light emitting diode (LED) lamp and a video on a television) and others in a room emitting visible light may be obtained.

As described above, in the present embodiment, among signals (visible light IDs) transmitted by plural subjects (such as taxis) and received, an information notification image which is an image generated according to a signal from a subject, and an image indicating information regarding the subject (a balloon image which includes detailed information) is superimposed on a captured image in the state where the information notification image is associated with an image of the subject. Furthermore, when it is determined that a terminal device (mobile terminal) has been shaken, another information notification image that is an image generated according to a signal from another subject in the direction in which the terminal device is shaken, and showing information regarding that other subject is superimposed on a captured image in a state where the information notification image is associated with an image of the other subject. Consequently, for example, an information notification image having a description of detailed information regarding a subject in a balloon is displayed in a state where the information notification image is associated with an image of the subject, and thus a user can appropriately understand information regarding the subject. In addition, a subject for which an information notification image is to be displayed can be easily changed by shaking a terminal device. Furthermore, the subject is changed to a subject that is in the direction in which the terminal device is shaken, thus allowing a user to intuitively make such a change and achieving a further improvement in a user interface.

Furthermore, in the present embodiment, for each of the images of remaining subjects among images of plural subjects, excluding an image of a subject associated with an information notification image, a information-presentable notification image for notifying that information (detailed information) regarding the remaining subjects can be presented are superimposed on a captured image. Thus, for example, an information-presentable notification image shaped like a small balloon having no detailed information is displayed for an image of a subject for which an information notification image is not displayed, and thus a user can determine that information regarding the subject (detailed information) can be displayed as an information notification image by shaking a terminal device.

Figure 53B:
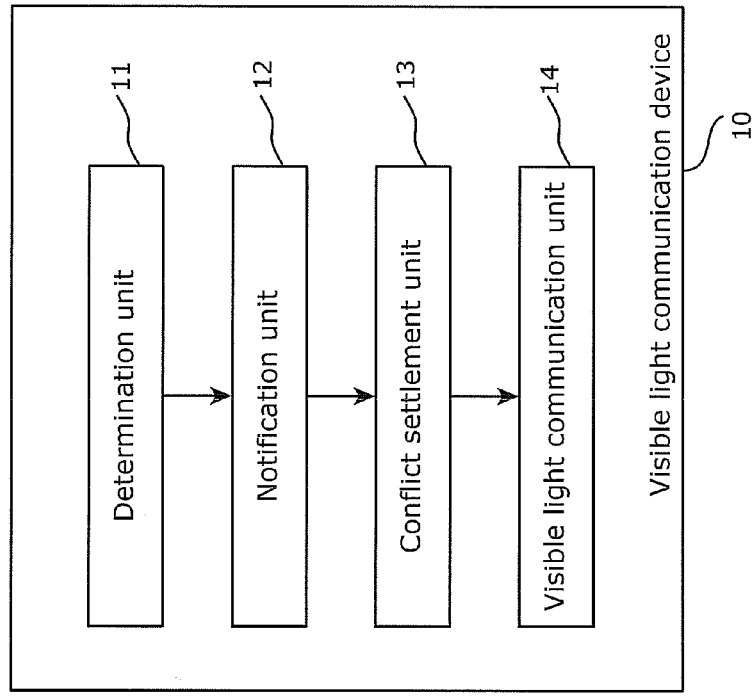
FIG. 53B is a block diagram illustrating an information communication device according to an aspect of the present disclosure.
Figure 53A:
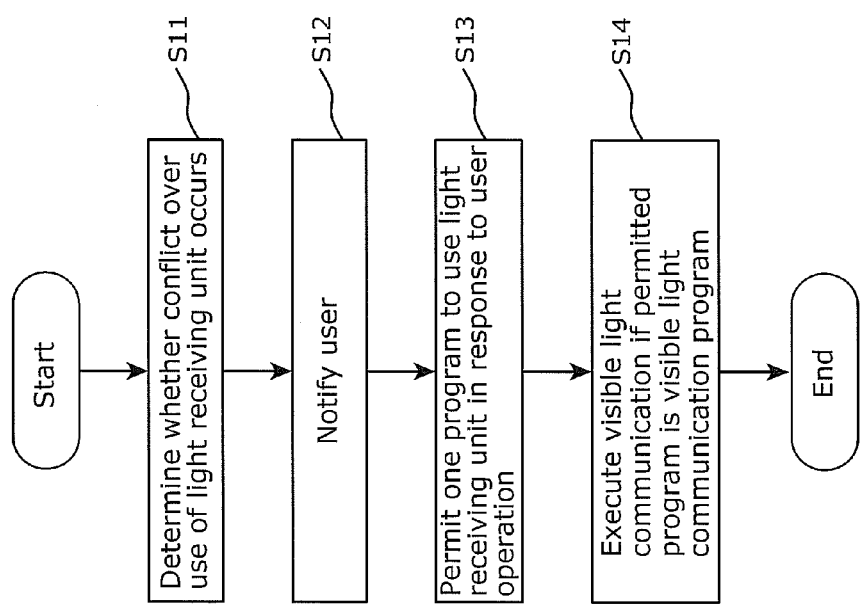
FIG. 53A is a flowchart of an information communication method according to an aspect of the present disclosure.

FIG. 53A is a flowchart of an information communication method according to an aspect of the present disclosure.

An information communication method according to an aspect of the present disclosure is an information communication method for performing visible light communication, and includes steps S11, S12, S13, and S14.

Specifically, this information communication method includes: determining whether conflict over use of a light receiving unit which detects light will occur between a first program for performing visible light communication using the light receiving unit and a second program for performing processing different from the visible light communication, using the light receiving unit (S11); notifying a user of the light receiving unit that the conflict will occur if it is determined that the conflict will occur (S12); permitting one of the first program and the second program to use the light receiving unit in response to an operation by the user (S13); and causing, by the first program, a computer to execute visible light communication according to light detected by the light receiving unit if the first program is permitted to use the light receiving unit (S14).

FIG. 53B is a block diagram illustrating an information communication device according to an aspect of the present disclosure.

An information communication device 10 according to an aspect of the present disclosure is an information communication device which performs visible light communication, and includes constituent elements 11, 12, 13, and 14.

Specifically, the information communication device 10 includes: a determination unit 11 configured to determine whether conflict over use of a light receiving unit configured to detect light will occur between a first program for performing visible light communication using the light receiving unit and a second program for performing processing different from the visible light communication, using the light receiving unit; a notification unit 12 configured to notify a user of the light receiving unit that the conflict will occur if it is determined that the conflict will occur; a conflict settlement unit 13 configured to permit one of the first program and the second program to use the light receiving unit in response to an operation by the user; and a visible light communication unit 14 configured to cause, according to the first program, a computer to execute visible light communication according to light detected by the light receiving unit if the first program is permitted to use the light receiving unit.

According to the information communication method and the information communication device 10 illustrated in FIGS. 53A and 53B as described above, if conflict over use of a light receiving unit will occur, a user of the light receiving unit is notified of the conflict, and a user operation permits one of programs to use the light receiving unit. Thus, the user can understand with ease the status occurring in the terminal that includes the light receiving unit. Furthermore, the user understands the status and then can manipulate the terminal. Thus, conflict over use of a light receiving unit can be easily solved without performing an extra operation. As a result, a user interface can be improved and the burden on a user can be reduced.

It should be noted that in the above embodiments and variations, each of the constituent elements may be constituted by dedicated hardware or may be obtained by executing a software program suitable for the constituent element. Each constituent element may be obtained by a program execution unit such as a CPU or a processor reading and executing a software program recorded on a recording medium such as a hard disk or semiconductor memory. For example, a program causes a computer to execute the information communication method illustrated by the flowchart in FIG. 53A.

Embodiment 5

The following describes Embodiment 5.

(Observation of Luminance of Light Emitting Unit)

Figure 54:
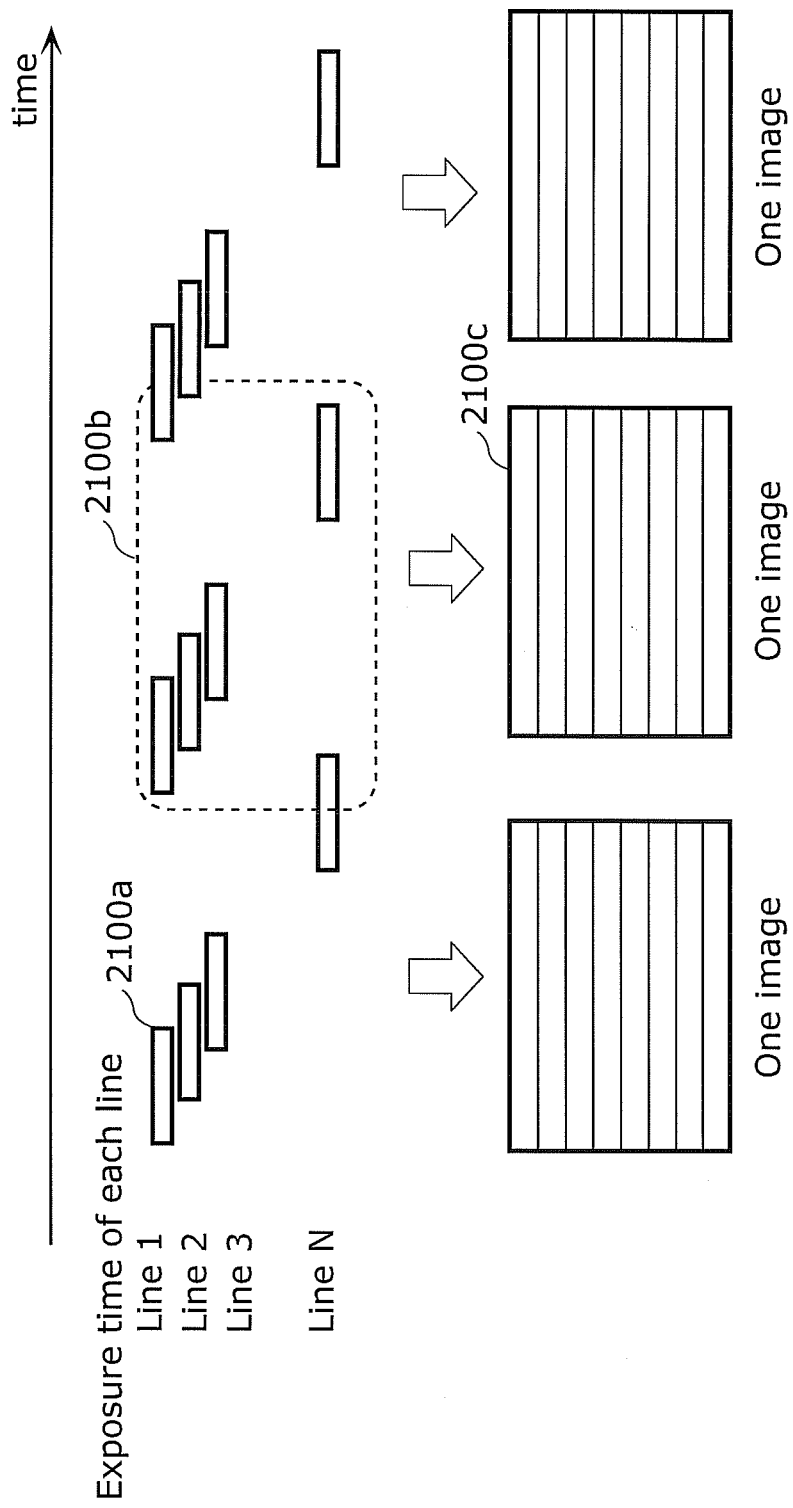
FIG. 54 illustrates an example of an observation method of luminance of a light emitting unit in Embodiment 5.

The following proposes an imaging method in which, when capturing one image, all imaging elements are not exposed simultaneously but the times of starting and ending the exposure differ between the imaging elements. FIG. 54 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

Figure 55:
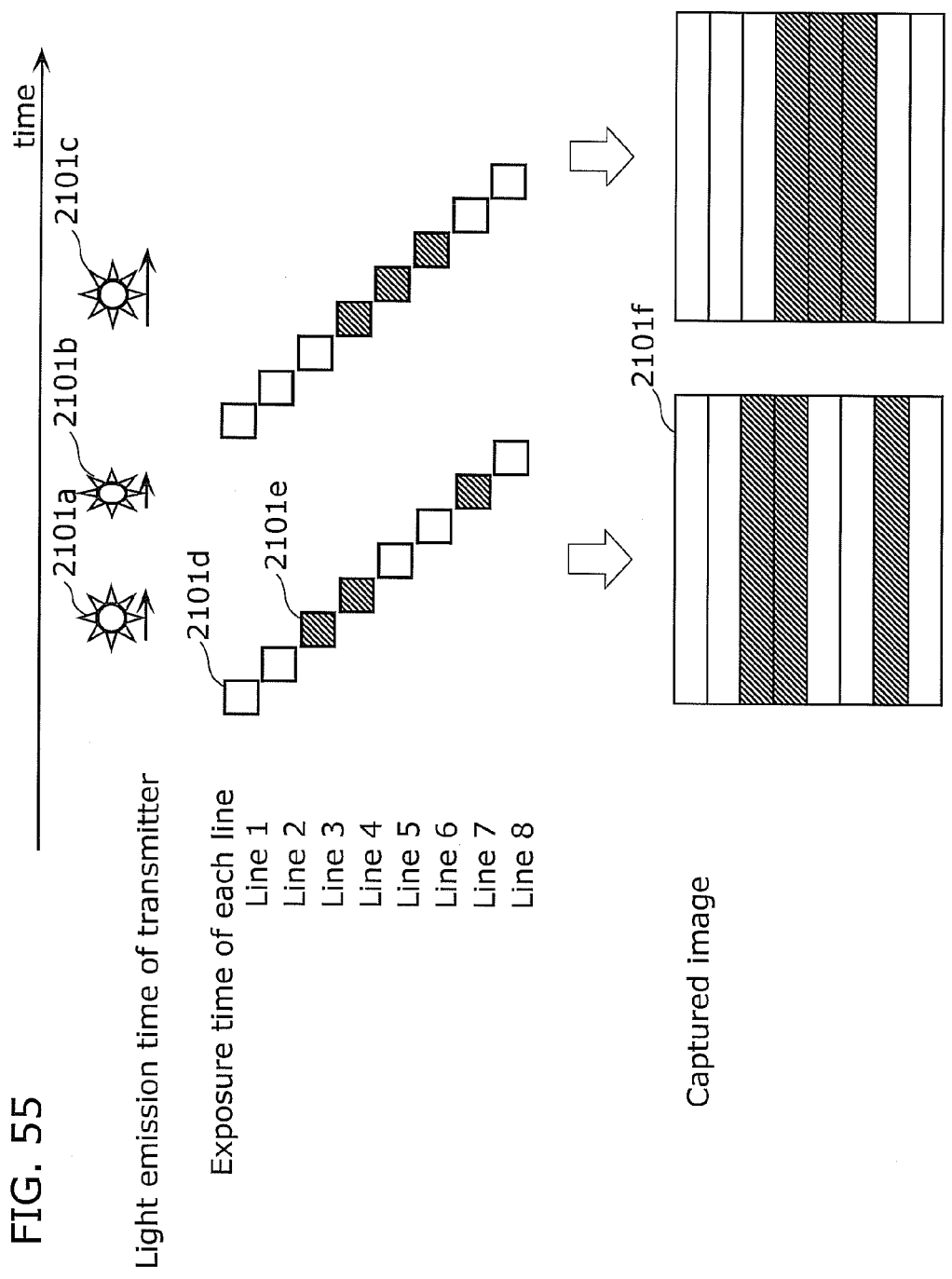
FIG. 55 illustrates an example of an observation method of luminance of a light emitting unit in Embodiment 5.

In the case of capturing a blinking light source shown on the entire imaging elements using this imaging method, bright lines (lines of brightness in pixel value) along exposure lines appear in the captured image as illustrated in FIG. 55. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1.67 millisecond. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 55 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and I is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 56:
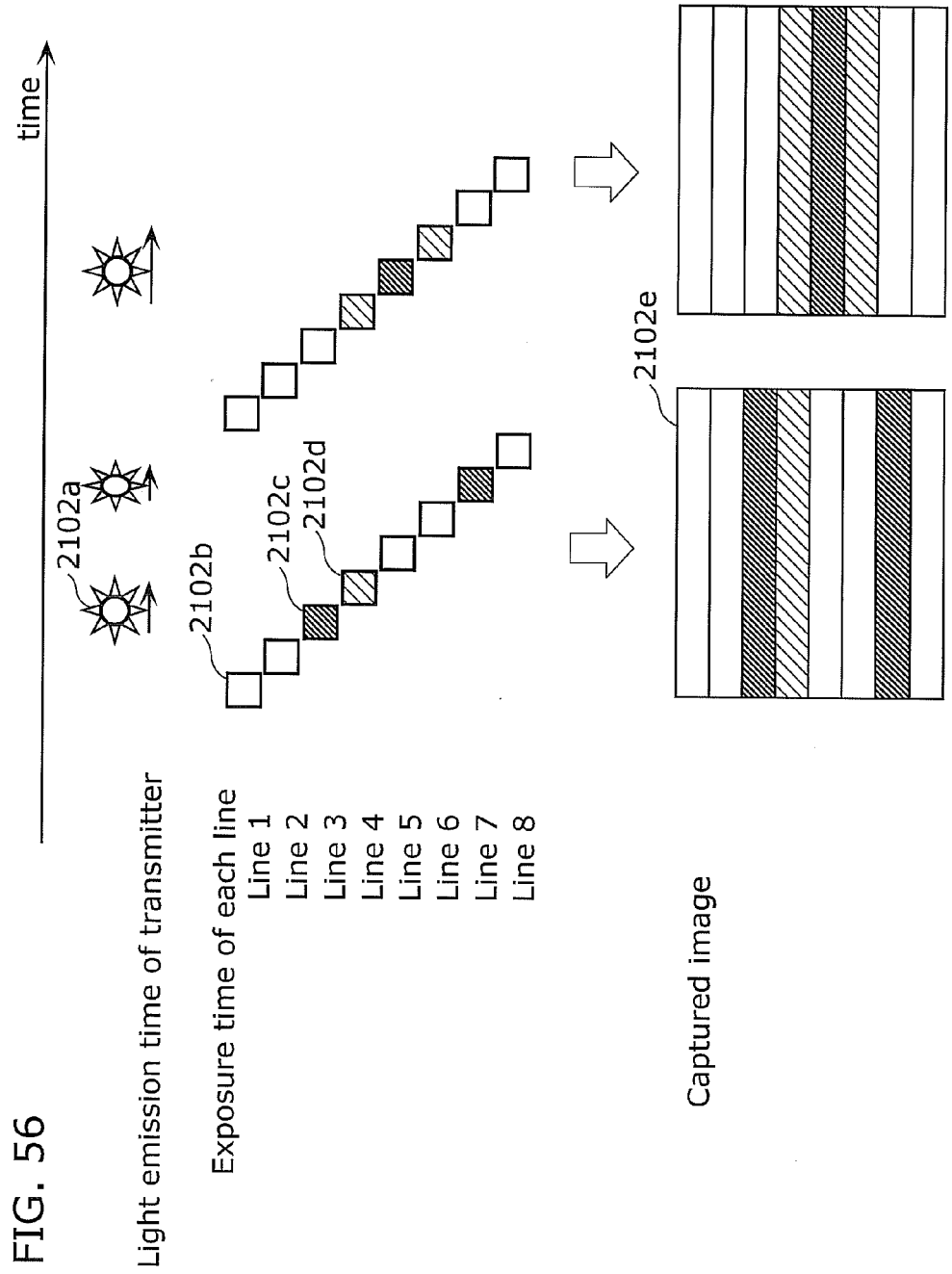
FIG. 56 illustrates an example of an observation method of luminance of a light emitting unit in Embodiment 5.

If the exposure state of each exposure line caused by the light emission of the light emitting unit is recognizable in a plurality of levels as illustrated in FIG. 56, more information can be transmitted by controlling the light emission time of the light emitting unit in a shorter unit of time than the exposure time of each exposure line.

In the case where the exposure state is recognizable in E|v levels, information can be transmitted at a speed of f|E|v bits per second at the maximum.

Moreover, a fundamental period of transmission can be recognized by causing the light emitting unit to emit light with a timing slightly different from the timing of exposure of each exposure line.

Figure 57A:
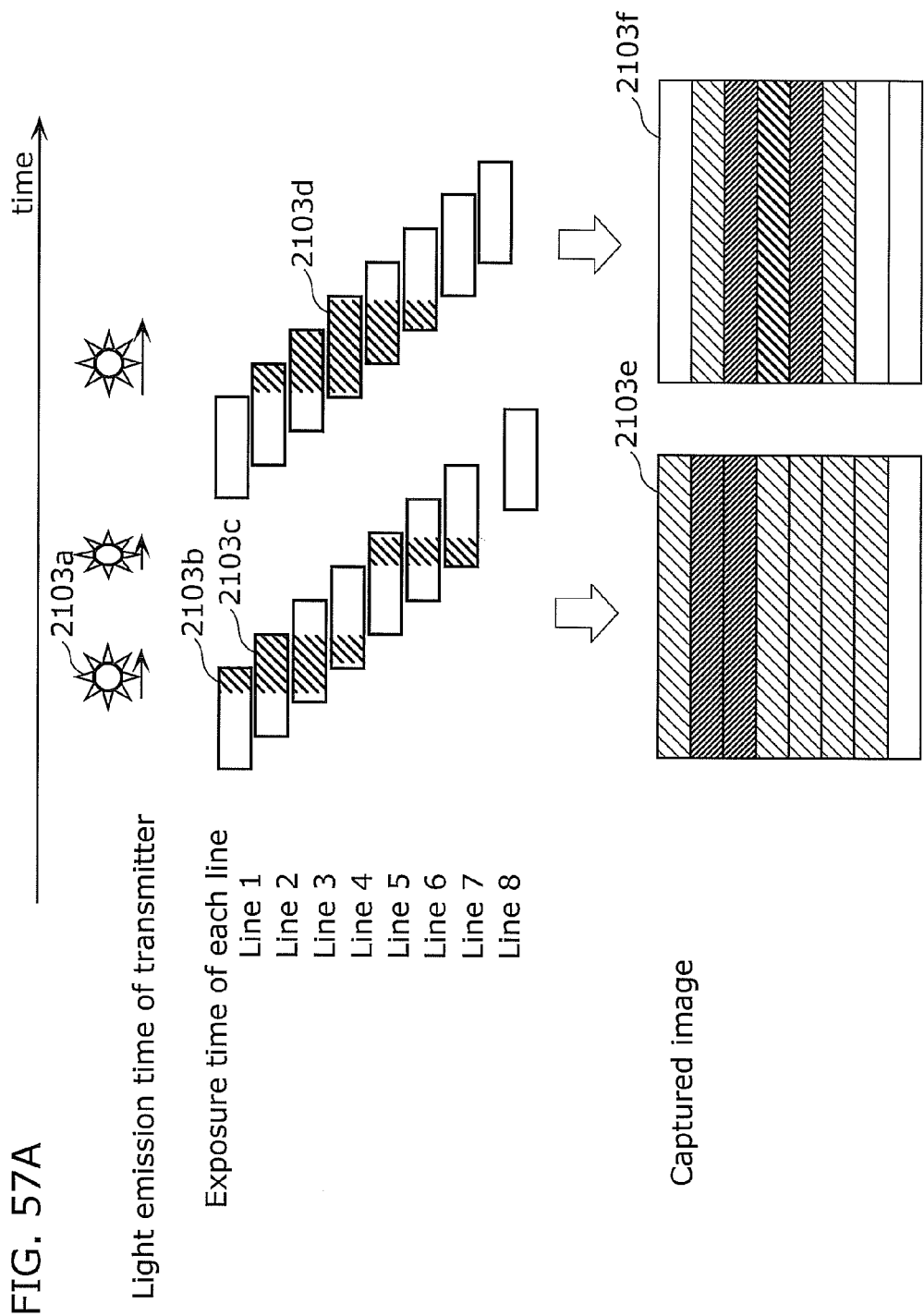
FIG. 57A illustrates an example of an observation method of luminance of a light emitting unit in Embodiment 5.

FIG. 57A illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e. the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 57B:
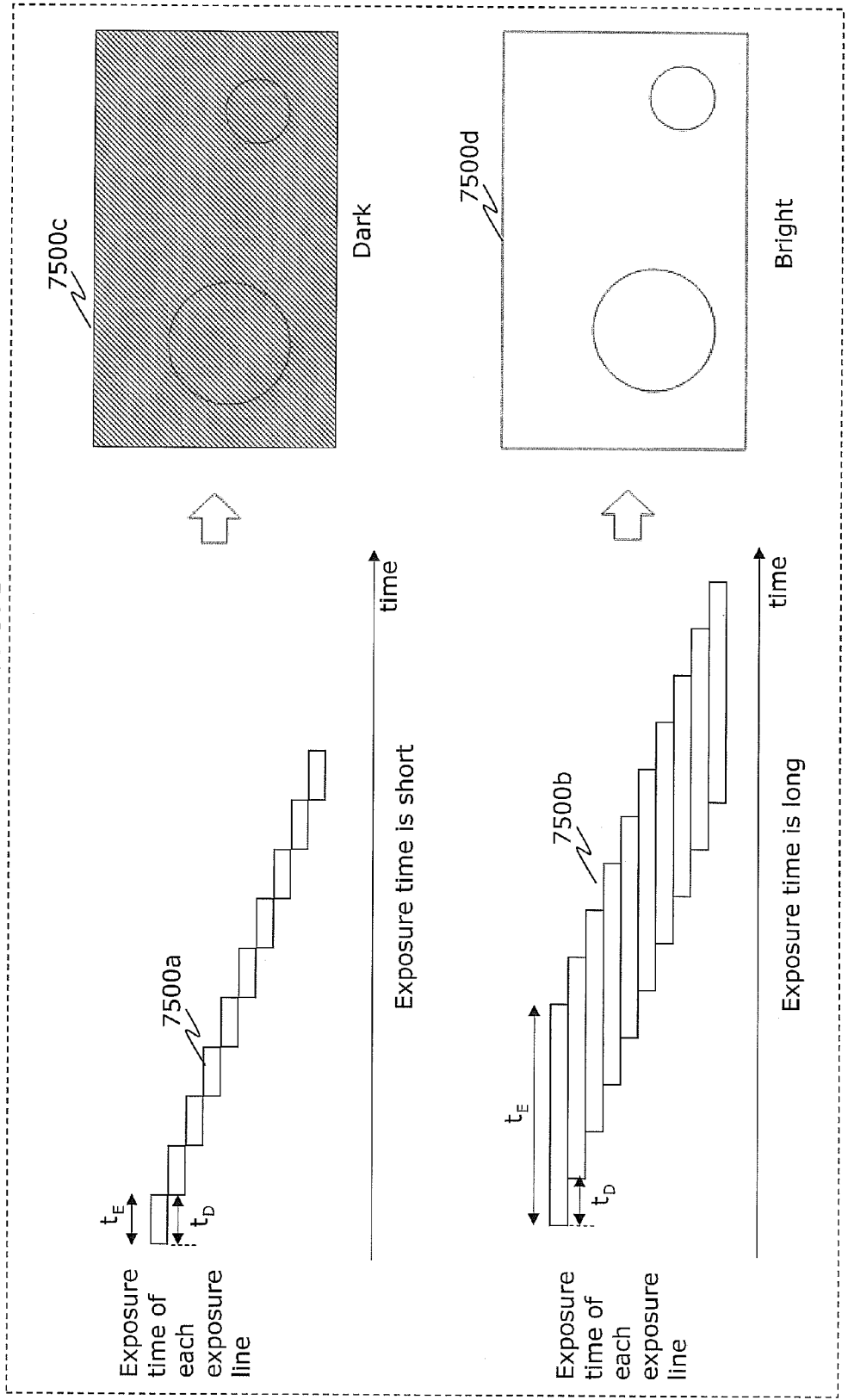
FIG. 57B illustrates an example of an observation method of luminance of a light emitting unit in Embodiment 5.

FIG. 57B illustrates the influence of the difference in exposure time in the case where the exposure start time of each exposure line is the same. In 7500*a*, the exposure end time of one exposure line and the exposure start time of the next exposure line are the same. In 7500*b*, the exposure time is longer than that in 7500*a*. The structure in which the exposure times of adjacent exposure lines partially overlap each other as in 7500*b* allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 57C:
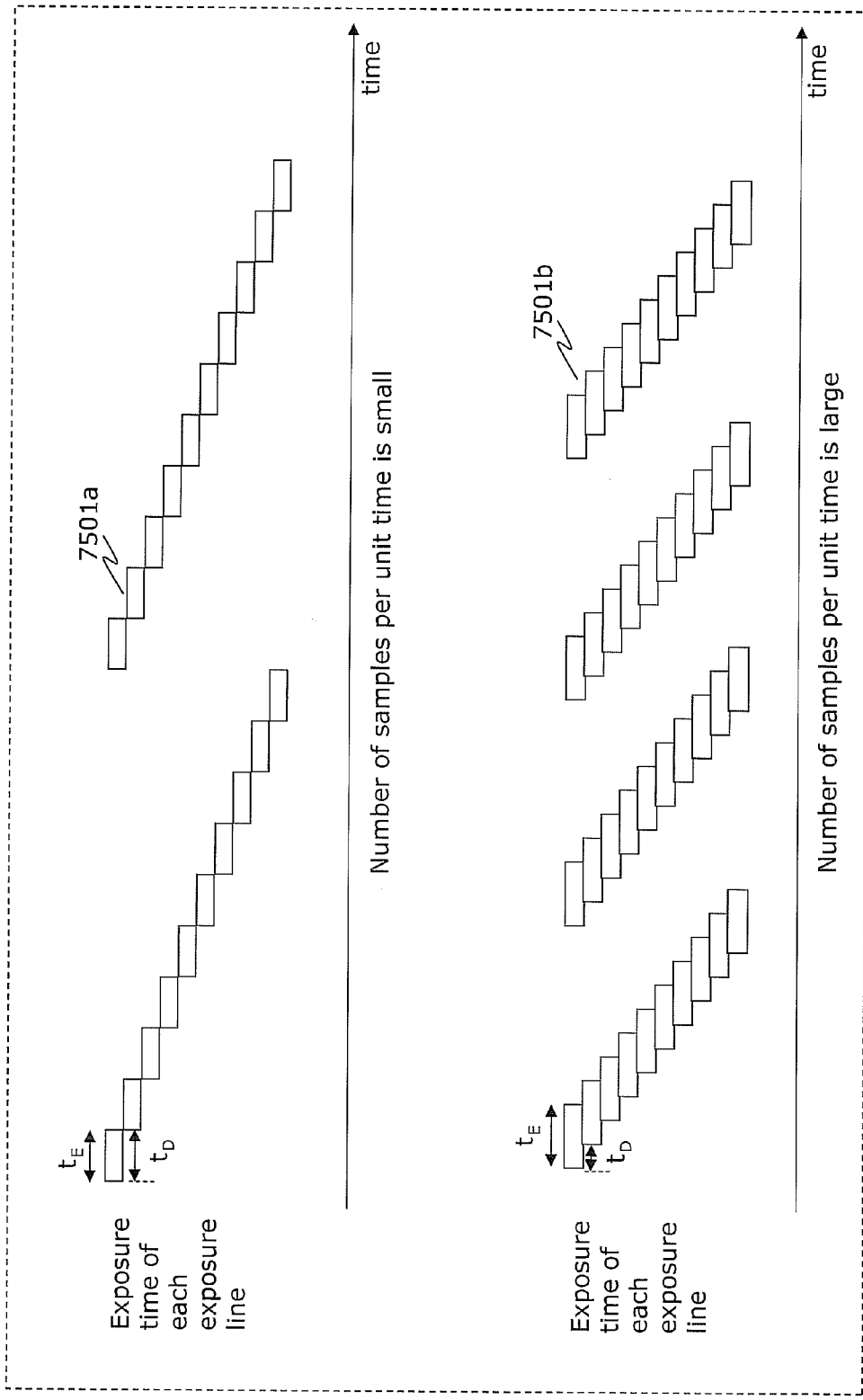
FIG. 57C illustrates an example of an observation method of luminance of a light emitting unit in Embodiment 5.

FIG. 57C illustrates the influence of the difference in exposure start time of each exposure line in the case where the exposure time is the same. In 7501*a*, the exposure end time of one exposure line and the exposure start time of the next exposure line are the same. In 7501*b*, the exposure of one exposure line ends after the exposure of the next exposure line starts. The structure in which the exposure times of adjacent exposure lines partially overlap each other as in 7501*b* allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 57B and 57C, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to $1/480$ second enables an appropriate bright line pattern to be generated. Here, it is necessary to set (exposure time)<$1/8 \times f$, where f is the frame frequency. Blanking during imaging is half of one frame at the maximum. That is, the blanking time is less than or equal to half of the imaging time. The actual imaging time is therefore $1/2f$ at the shortest. Besides, since 4-value information needs to be received within the time of $1/2f$, it is necessary to at least set the exposure time to less than $1/(2f \times 4)$. Given that the normal frame rate is less than or equal to 60 frames per second, by setting the exposure time to less than or equal to $1/480$ second, an appropriate bright line pattern is generated in the image data and thus fast signal transmission is achieved.

FIG. 57D illustrates the advantage of using a short exposure time in the case where each exposure line does not overlap in exposure time. In the case where the exposure time is long, even when the light source changes in luminance in a binary fashion as in 7502*a*, an intermediate-color part tends to appear in the captured image as in 7502*e*, making it difficult to recognize the luminance change of the light source. By providing a predetermined non-exposure blank time (predetermined wait time) $t_{D2}$ from when the exposure of one exposure line ends to when the exposure of the next exposure line starts as in 7502*d*, however, the luminance change of the light source can be recognized more easily. That is, a more appropriate bright line pattern can be detected as in 7502*f*. The provision of the predetermined non-exposure blank time is possible by setting a shorter exposure time $t_E$ than the time difference $t_D$ between the exposure start times of the exposure lines, as in 7502*d*. In the case where the exposure times of adjacent exposure lines partially overlap each other in the normal imaging mode, the exposure time is shortened from the normal imaging mode so as to provide the predetermined non-exposure blank time. In the case where the exposure end time of one exposure line and the exposure start time of the next exposure line are the same in the normal imaging mode, too, the exposure time is shortened so as to provide the predetermined non-exposure time. Alternatively, the predetermined non-exposure blank time (predetermined wait time) $t_{D2}$ from when the exposure of one exposure line ends to when the exposure of the next exposure line starts may be provided by increasing the interval $t_D$ between the exposure start times of the exposure lines, as in 7502*g*. This structure allows a longer exposure time to be used, so that a brighter image can be captured. Moreover, a reduction in noise contributes to higher error tolerance. Meanwhile, this structure is disadvantageous in that the number of samples is small as in 7502*h*, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure blank time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to $1/480$ second for visible light communication. The use of the same reading method or circuit to read a signal eliminates the need to employ separate circuits for the normal imaging mode and the visible light communication mode. The circuit size can be reduced in this way.

FIG. 57E illustrates the relation between the minimum change time $t_S$ of light source luminance, the exposure time $t_E$, the time difference $t_D$ between the exposure start times of the exposure lines, and the captured image. In the case where $t_E + t_D < t_S$, imaging is always performed in a state where the light source does not change from the start to end of the exposure of at least one exposure line. As a result, an image with clear luminance is obtained as in 7503*d*, from which the luminance change of the light source is easily recognizable. In the case where $2t_E > t_S$, a bright line pattern different from the luminance change of the light source might be obtained, making it difficult to recognize the luminance change of the light source from the captured image.

Figure 57F:
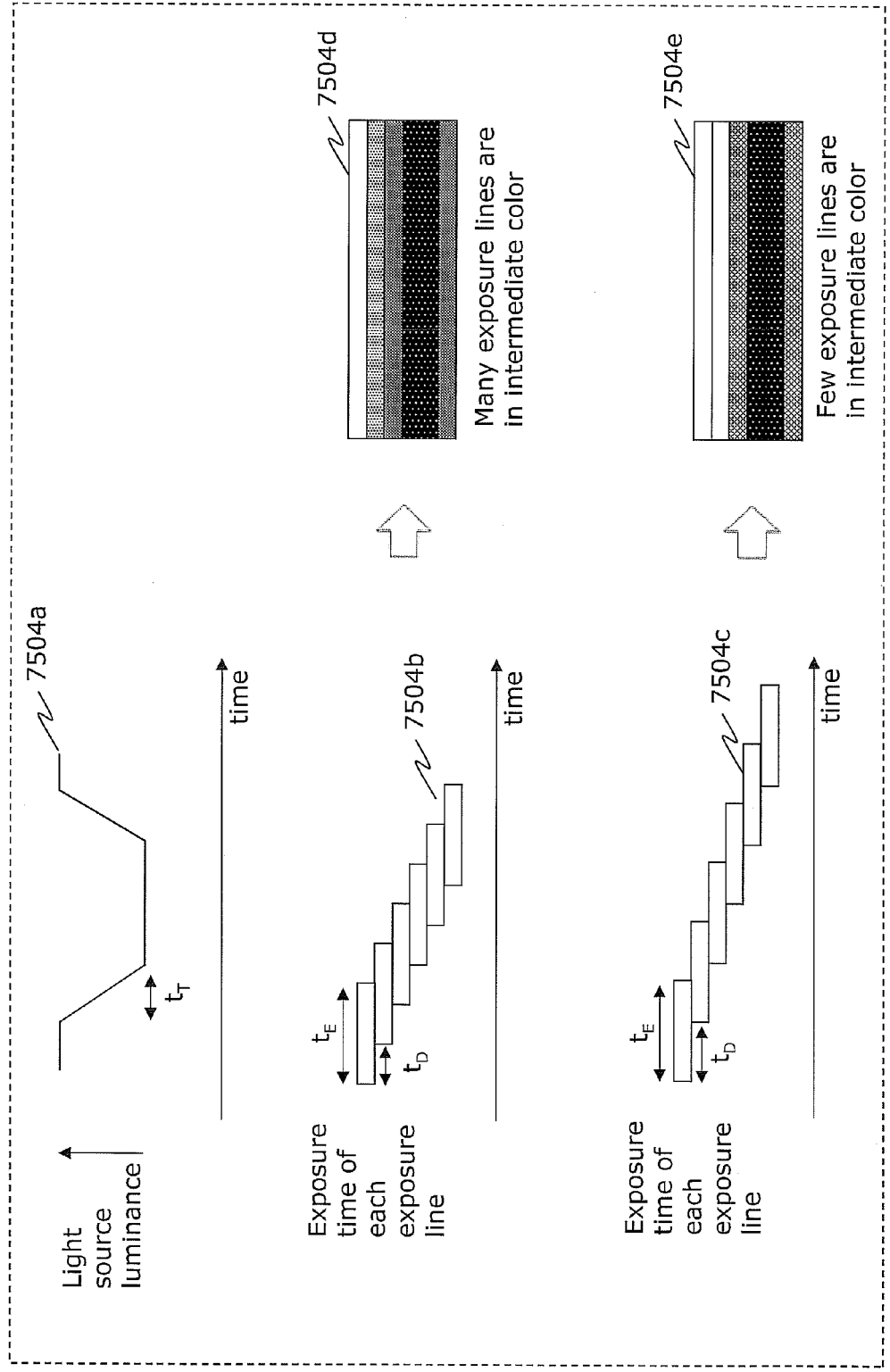
FIG. 57F illustrates an example of an observation method of luminance of a light emitting unit in Embodiment 5.

FIG. 57F illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D > t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

FIG. 57G illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E > t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

FIG. 57H is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 57I:
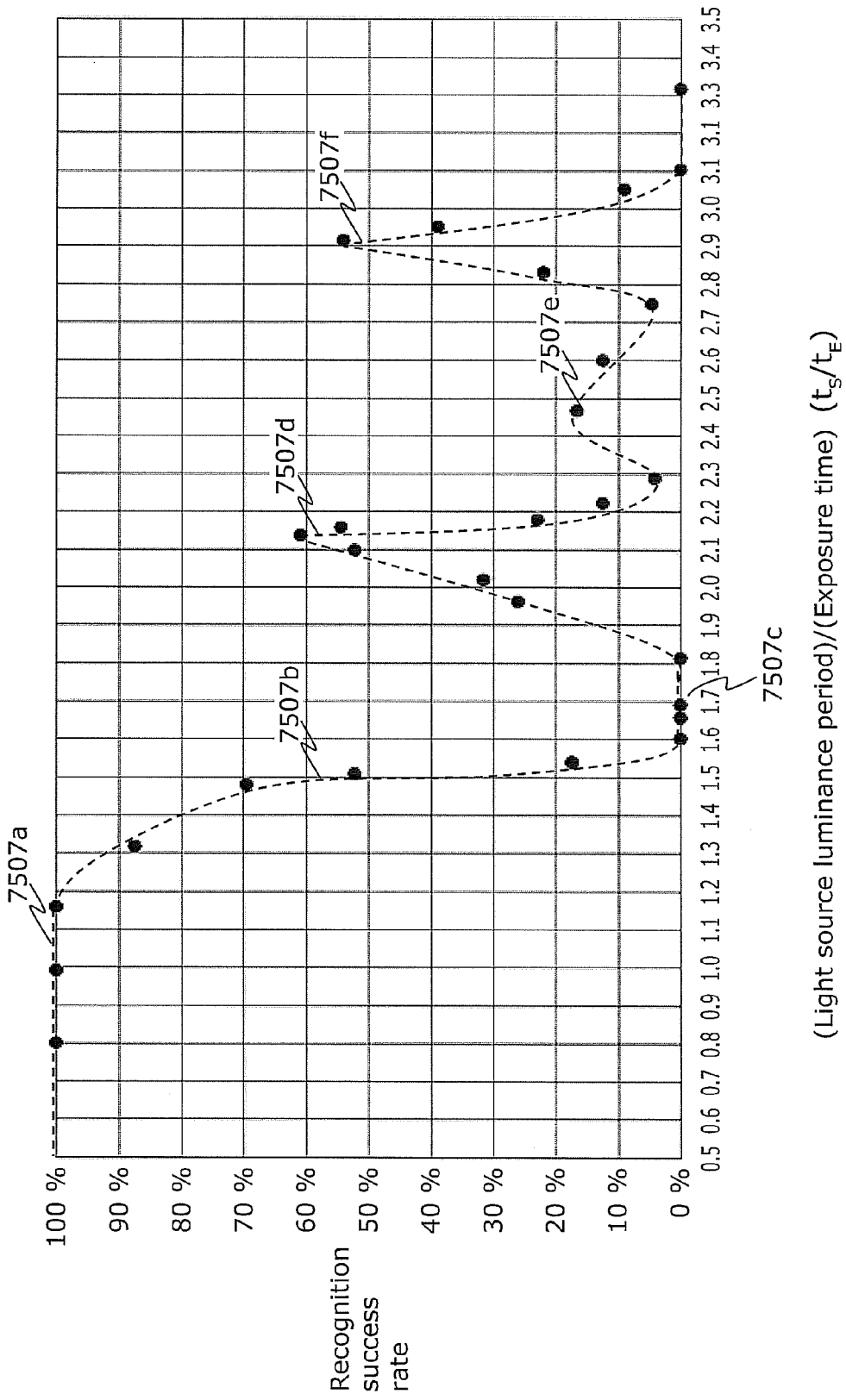
FIG. 57I illustrates an example of an observation method of luminance of a light emitting unit in Embodiment 5.
Figure 59:
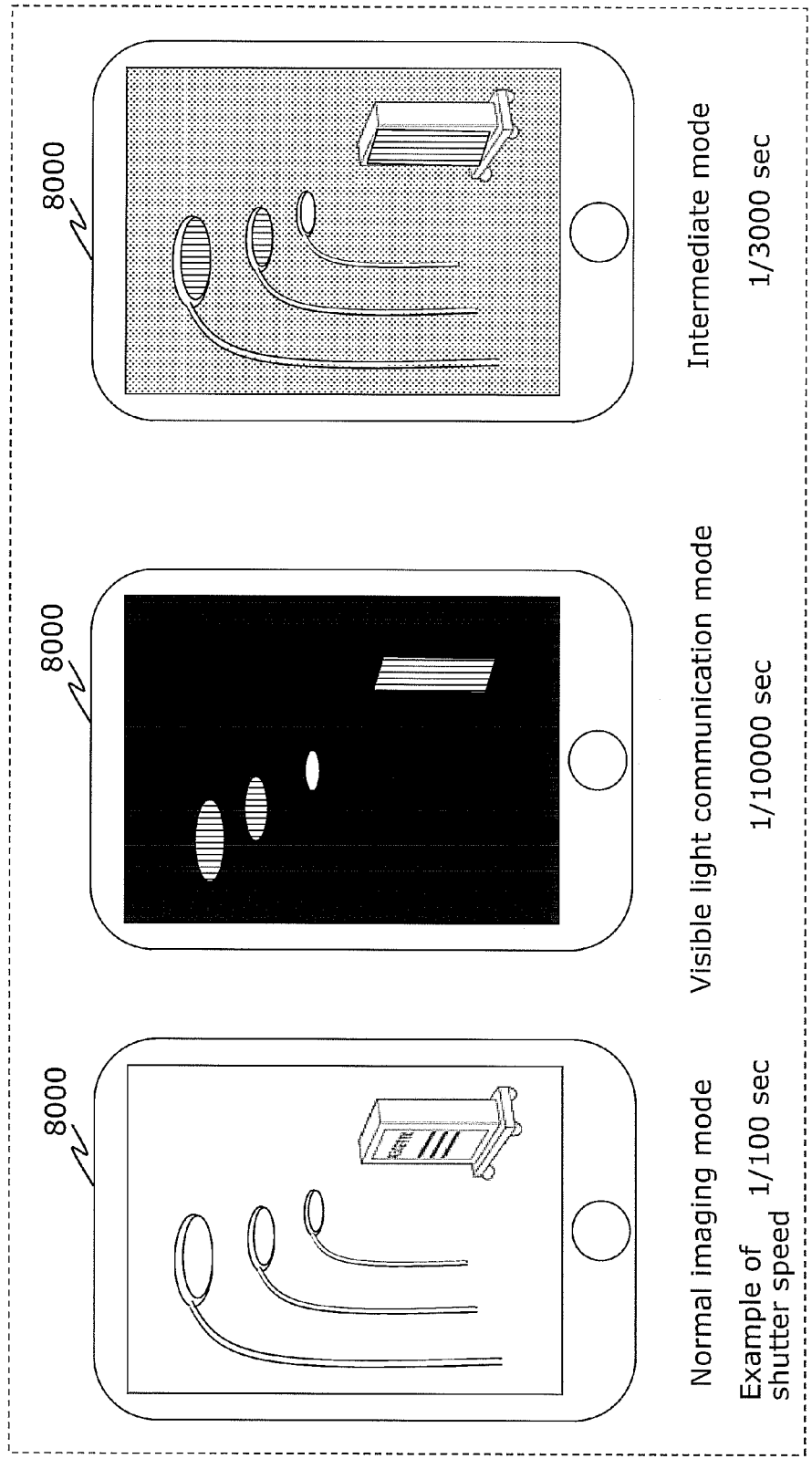
FIG. 59 illustrates an example of each mode of a receiver in Embodiment 5.

FIG. 57I illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period is by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507c, it increases again at 7507d, 7507e, and 7507f. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 59.

Figure 58:
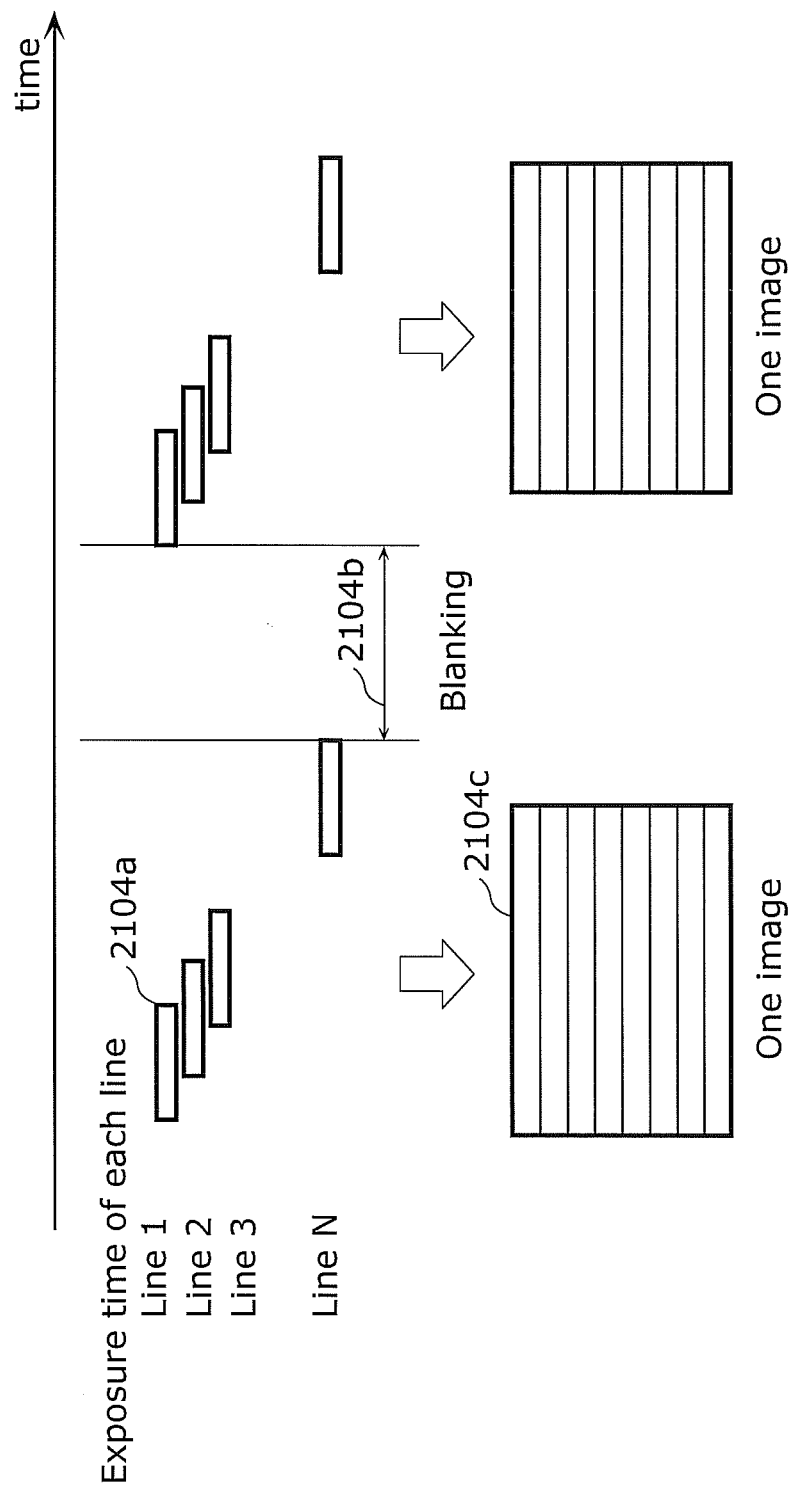
FIG. 58 illustrates an example of an observation method of luminance of a light emitting unit in Embodiment 5.

Depending on imaging devices, there is a time (blanking) during which no exposure is performed, as illustrated in FIG. 58.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 6

Figure 60:
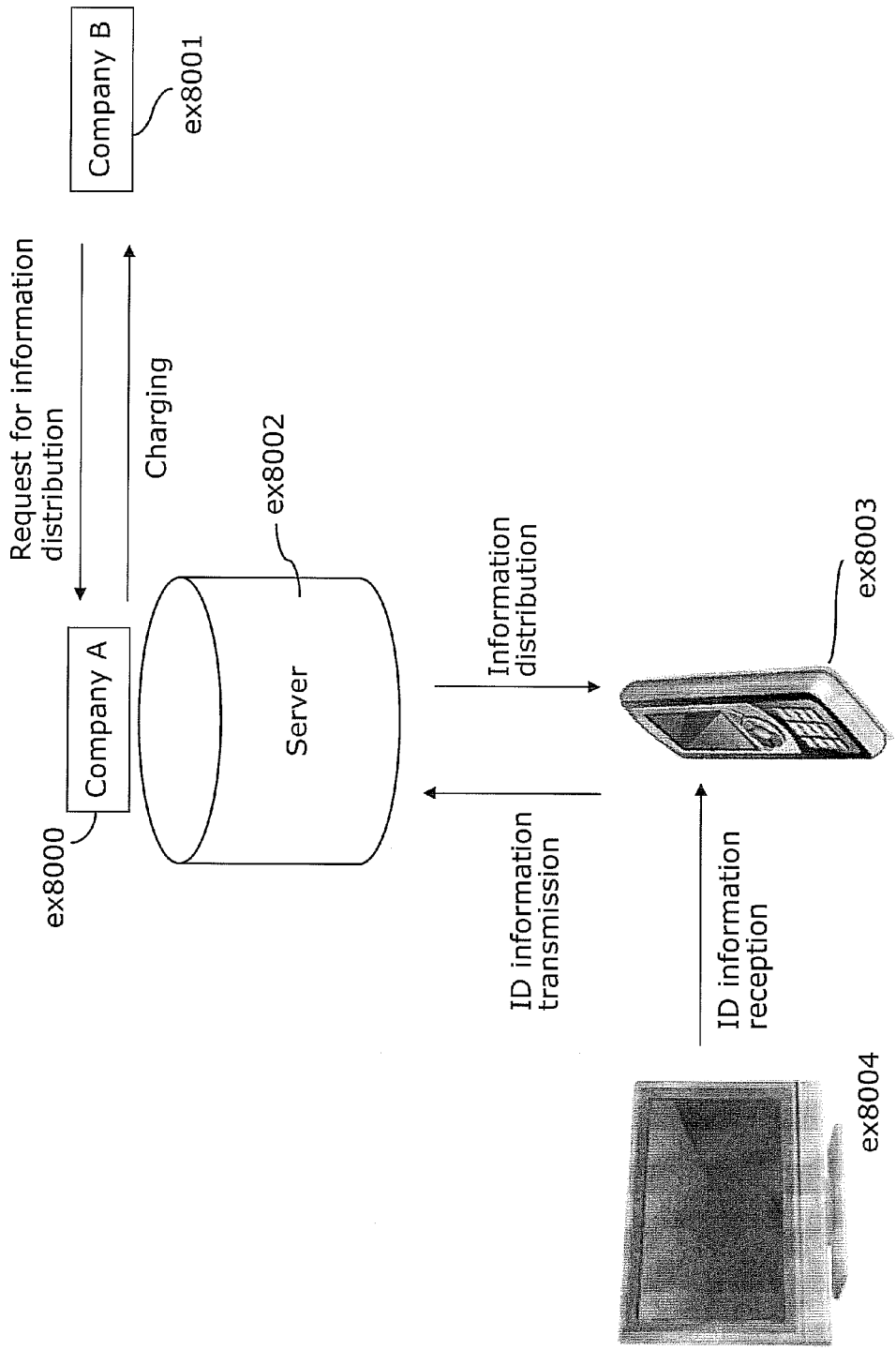
FIG. 60 illustrates a service provision system using the reception method described in any of the foregoing embodiments.

FIG. 60 is a diagram illustrating a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

Figure 61:
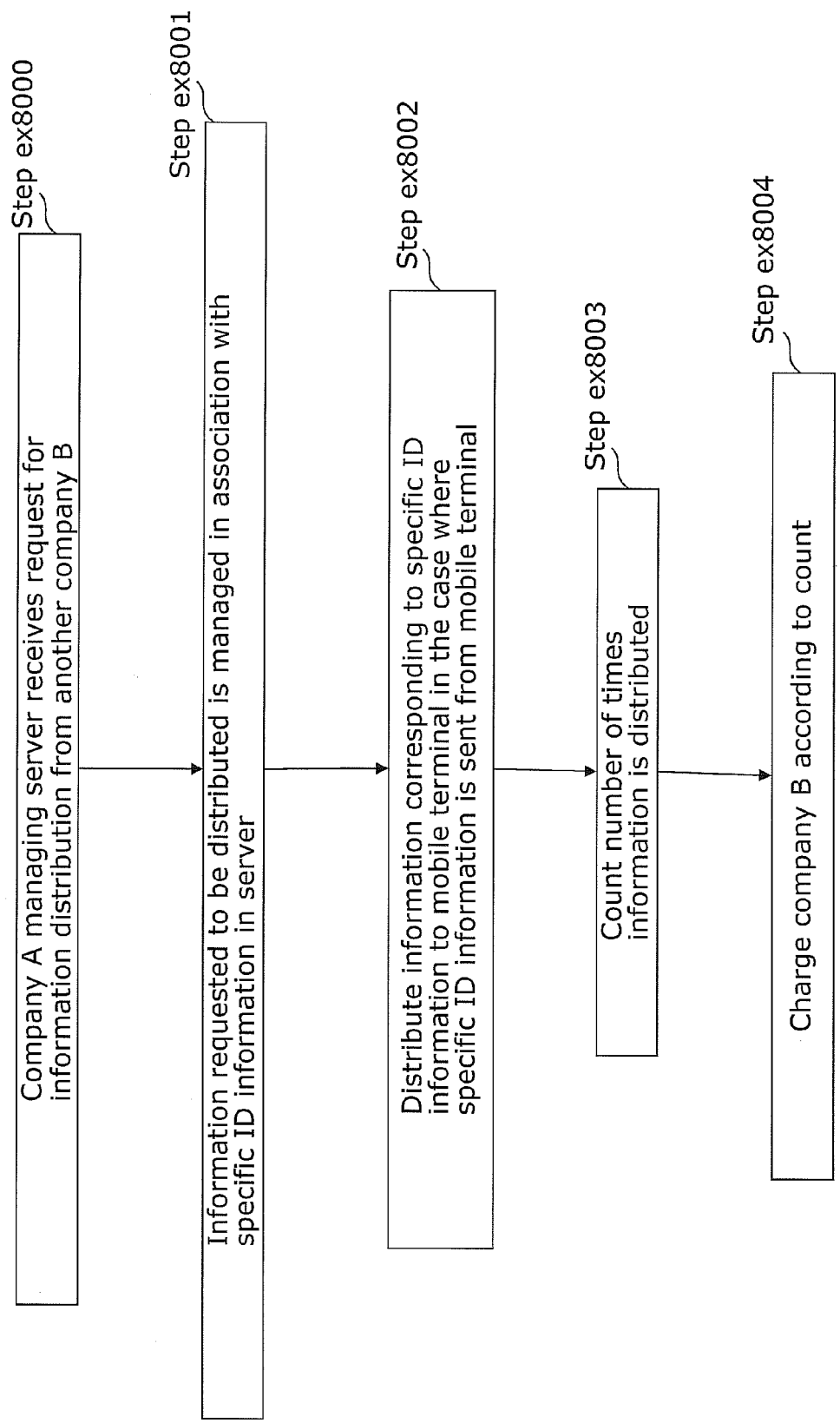
FIG. 61 is a flowchart illustrating flow of service provision.

FIG. 61 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

Figure 62:
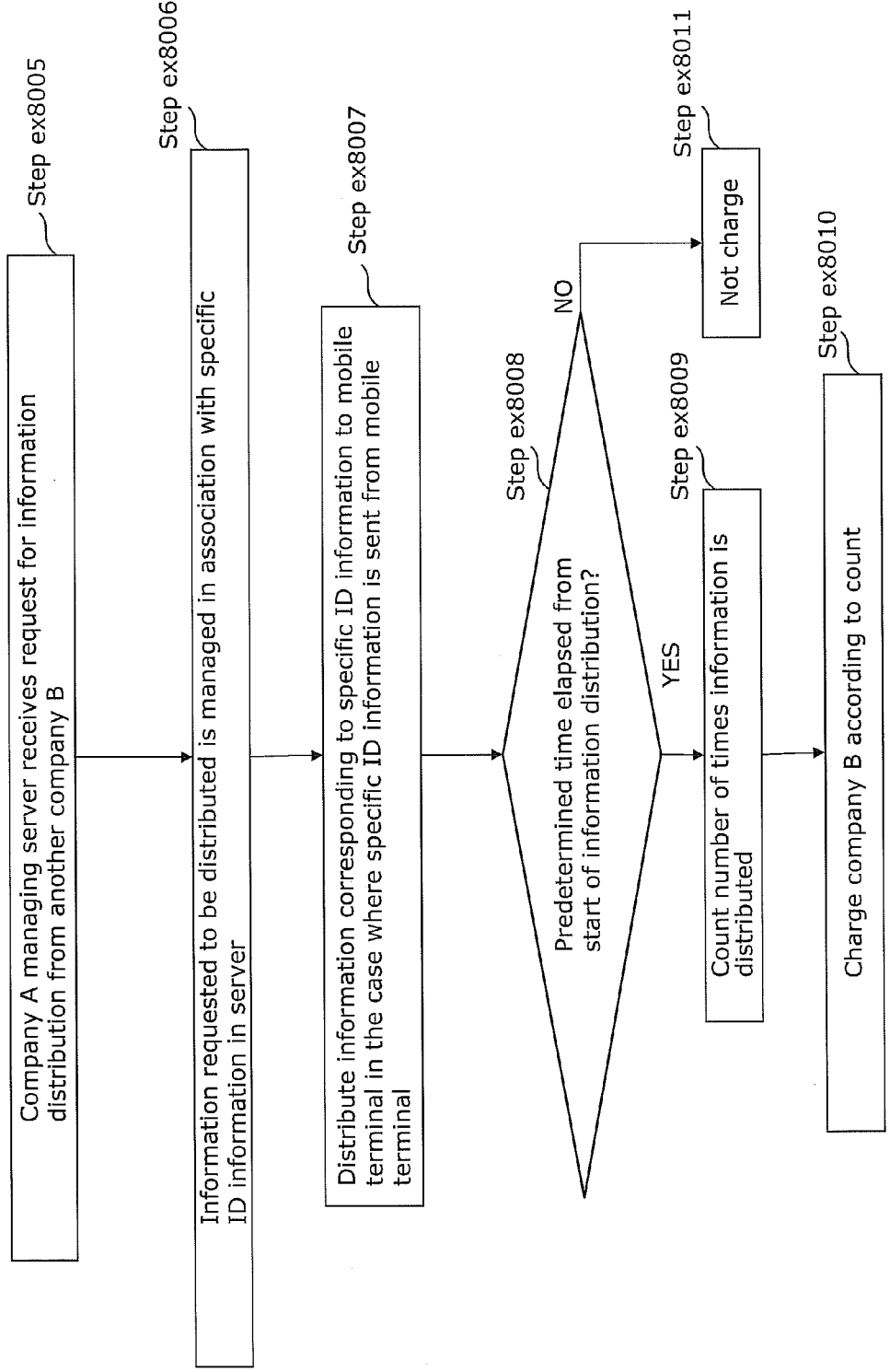
FIG. 62 is a flowchart illustrating service provision in another example.

FIG. 62 is a flowchart illustrating service provision in another example. The description of the same steps as those in FIG. 61 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

Figure 63:
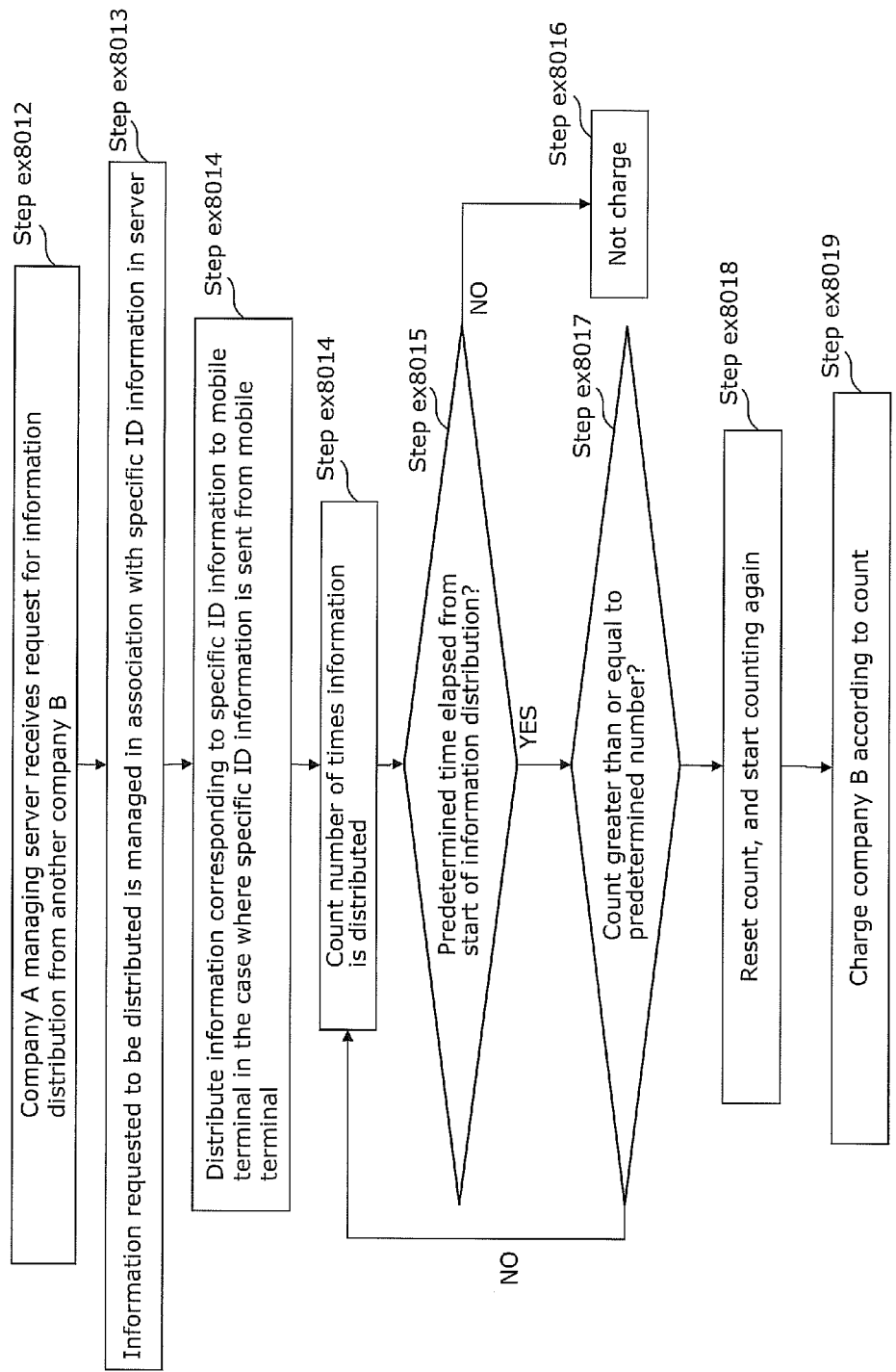
FIG. 63 is a flowchart illustrating service provision in another example.

FIG. 63 is a flowchart illustrating service provision in another example. The description of the same steps as those in FIG. 62 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

The above is a description of an information communication method and an information communication device according to one or more aspects of the present disclosure based on the embodiments and variations thereof. The present disclosure, however, is not limited to the embodiments and the variations. Various modifications to the embodiments that may be conceived by those skilled in the art and combinations of constituent elements in different embodiments may be included within the scope of the one or more aspects of the present disclosure, without departing from the spirit of the present disclosure.

It should be noted that the following cases are also encompassed in the present disclosure.

(1) Specifically, each device described above may be a computer system which includes a microprocessor, a ROM, a RAM, a hard disk unit, a display unit, a keyboard, a mouse, and the like. A computer program is stored in the RAM or the hard disk unit. The operation of the microprocessor in accordance with the computer program allows each device to achieve its functionality. Here, the computer program includes a combination of instruction codes indicating instructions to a computer in order to achieve given functionality.

(2) Some or all of constituent elements included in each device described above may include a single system large scale integration (LSI: large scale integrated circuit). The system LSI is a super multi-function LSI manufactured by integrating plural components in one chip, and is specifically a computer system configured so as to include a microprocessor, a ROM, a RAM, and so on. A computer program is stored in the RAM. The system LSI accomplishes its functions through the operation of the microprocessor in accordance with the computer program.

(3) Some or all of constituent elements included in each device described above may include an IC card or a single module which can be attached to or detached from the device. The IC card or the module is a computer system which includes a microprocessor, a ROM, a RAM, and the like. The above super-multifunctional LSI may be included in the IC card or the module. The IC card or the module accomplishes its functions through the operation of the microprocessor in accordance with the computer program. This IC card or module may have tamper resistant properties.

(4) The present disclosure may be achieved by the methods described above. In addition, these methods may be achieved by a computer program implemented by a computer, or may be implemented by a digital signal which includes the computer program.

The present disclosure may be achieved by the computer program or the digital signal stored in a computer-readable recording medium such as, for example, a flexible disk, a hard disk, CD-ROM, MO, DVD, DVD-ROM, DVD-RAM, a blu-ray Disc (BD), or a semiconductor memory. Alternatively, the present disclosure may be achieved by the digital signal stored in such a recording medium.

According to the present disclosure, the computer program or the digital signal may be transmitted via, for instance, data broadcasting or a network typified by electric telecommunication lines, wireless or wired communication lines, and the Internet.

The present disclosure may be a computer system which includes a microprocessor and a memory, the memory may have stored therein the computer program, and the microprocessor may operate in accordance with the computer program.

Another independent computer system may implement the program or the digital signal which has been delivered thereto being stored in the recording medium or the program or the digital signal delivered thereto via the network or the like.

(5) The above embodiments and the above variations may be combined.

Although the above is a description of exemplary embodiments, the scope of the claims of the present application is not limited to those embodiments. Without departing from novel teaching and advantages of a subject matter described in the appended claims, various modifications may be made to the above embodiments, and constituent elements in the above embodiments may be arbitrarily combined to achieve another embodiment, which is understood with ease by a person skilled in the art. Therefore, such modifications and other embodiments are also included in the present disclosure.

Industrial Applicability

The present disclosure can be used for information communication devices and others, and in particular for information communication devices, for instance, which are used for a method for communication between mobile terminals and home electric appliances, the mobile terminals including a smartphone, a tablet terminal, a mobile phone, a smart watch, and a head mount display, the home electric appliances including an air-conditioner, a lighting device, a rice cooker, a television, a recorder, and a projector.

The invention claimed is:

1. An information communication method for performing visible light communication, the information communication method comprising:
   (a) determining whether conflict over use of a light receiver which detects light will occur between a first program for performing visible light communication using the light receiver and a second program for performing processing different from the visible light communication, using the light receiver;
   (b) notifying a user of the light receiver that the conflict will occur if it is determined that the conflict will occur;
   (c) permitting one of the first program and the second program to use the light receiver in response to an operation by the user; and
   (d) causing, by the first program, a computer to execute visible light communication according to light detected by the light receiver if the first program is permitted to use the light receiver.

2. The information communication method according to claim 1,
   wherein in the notifying, a selection screen for selecting one of the first program and the second program which use the light receiver is further displayed, and
   in the performing, if one of the first program and the second program is selected in response to an operation on the selection screen by the user, the selected one of the first program and the second program is permitted to use the light receiver.

3. The information communication method according to claim 2,
   wherein in the notifying, the selection screen is displayed which includes information indicating whether the first program runs in background and whether the second program runs in background.

4. The information communication method according to claim 1,
   wherein the light receiver includes a first light receiver and a second light receiver,
   in the performing, the first light receiver is assigned to one of the first program and the second program in response to the operation by the user, and
   in the causing, the first program causes the computer to execute visible light communication according to light detected by the first light receiver if the first light receiver is assigned to the first program.

5. The information communication method according to claim 1,
   wherein in the causing, data is obtained by executing the visible light communication,
   the information communication method further comprising:
   (e) displaying an application selection screen for selecting one of plural application programs for which the obtained data is usable; and
   (f) if one of the plural application programs is selected in response to an operation on the application selection screen by the user, causing, by the selected one of the application programs, the computer to execute processing performed using the data.

6. The information communication method according to claim 1, further comprising:
   (g) performing processing of receiving a request to distribute information from a requester;
   (h) distributing the requested information as associated information associated with a signal received through the visible light communication performed by the first program; and
   (i) performing information processing for charging the requester according to the distribution of the information.

7. An information communication device which performs visible light communication, the information communication device comprising:
   a determiner configured to determine whether conflict over use of a light receiver configured to detect light will occur between a first program for performing visible light communication using the light receiver and a second program for performing processing different from the visible light communication, using the light receiver;
   a notifier configured to notify a user of the light receiver that the conflict will occur if it is determined that the conflict will occur;
   a conflict settler configured to permit one of the first program and the second program to use the light receiver in response to an operation by the user; and
   a visible light communicator configured to cause, according to the first program, a computer to execute visible light communication according to light detected by the light receiver if the first program is permitted to use the light receiver.

8. A non-transitory computer readable recording medium storing communication control program for performing visible light communication, the communication control program causing a computer to execute:
   determining whether conflict over use of a light receiver which detects light will occur between a first program for performing visible light communication using the light receiver and a second program for performing processing different from the visible light communication, using the light receiver;
   notifying a user of the light receiver that the conflict will occur if it is determined that the conflict will occur; and
   permitting one of the first program and the second program to use the light receiver in response to an operation by the user,
   wherein the first program causes a computer to execute visible light communication according to light detected by the light receiver if the first program is permitted to use the light receiver.

9. An information communication method for performing visible light communication, the information communication method comprising:
- (a) capturing images of plural subjects each of which transmits a signal by changing luminance, with an image sensor which is a light receiver;
- (b) displaying a captured image which includes the images of the plural subjects;
- (c) determining whether a terminal device which includes the image sensor has been shaken; and
- (d) causing, by a program, a computer to receive the signals transmitted by the plural subjects and perform visible light communication according to the received signals, wherein, in the displaying,
- an information notification image generated according to a signal from one of the plural subjects among the signals transmitted by the plural subjects and received, and showing information regarding the subject is superimposed on the captured image in a state where the information notification image is associated with the image of the subject, and
- if it is determined that the terminal device has been shaken, another information notification image generated according to a signal from another one of the plural subjects which is in a direction in which the terminal device has been shaken, and showing information regarding the other subject is superimposed on the captured image in a state where the other information notification image is associated with the image of the other subject.

10. An information communication device which performs visible light communication, the information communication device comprising:
- an image capture configured to capture images of plural subjects each of which transmits a signal by changing luminance, with an image sensor which is a light receiver;
- a display configured to display a captured image which includes the images of the plural subjects;
- a determiner configured to determine whether a terminal device which includes the image sensor has been shaken; and
- a visible light communicator configured to cause, according to a program, a computer to receive the signals transmitted by the plural subjects and perform visible light communication according to the received signals, wherein the display,
- superimposes an information notification image generated according to a signal from one of the plural subjects among the signals transmitted by the plural subjects and received, and showing information regarding the subject on the captured image in a state where the information notification image is associated with the image of the subject, and
- if it is determined that the terminal device has been shaken, superimposes another information notification image generated according to a signal from another one of the plural subjects which is in a direction in which the terminal device has been shaken, and showing information regarding the other subject on the captured image in a state where the other information notification image is associated with the image of the other subject.

11. A non-transitory computer readable recording medium storing a communication control program for performing visible light communication, the communication control program causing a computer to execute:
- (a) capturing images of plural subjects each of which transmits a signal by changing luminance, with an image sensor which is a light receiver;
- (b) displaying a captured image which includes the images of the plural subjects;
- (c) determining whether a terminal device which includes the image sensor has been shaken; and
- (d) causing, by a program, a computer to receive the signals transmitted by the plural subjects and perform visible light communication according to the received signals, wherein in the displaying,
- an information notification image generated according to a signal from one of the plural subjects among the signals transmitted by the plural subjects and received, and showing information regarding the subject is superimposed on the captured image in a state where the information notification image is associated with the image of the subject, and
- if it is determined that the terminal device has been shaken, another information notification image generated according to a signal from another one of the plural subjects which is in a direction in which the terminal device has been shaken, and showing information regarding the other subject is superimposed on the captured image in a state where the other information notification image is associated with the image of the other subject.

* * * * *